(12) United States Patent
Cotruvo, Jr. et al.

(10) Patent No.: US 12,492,451 B2
(45) Date of Patent: Dec. 9, 2025

(54) METAL-BINDING PROTEIN AND USE THEREOF

(71) Applicant: The Penn State Research Foundation, University Park, PA (US)

(72) Inventors: Joseph A. Cotruvo, Jr., State College, PA (US); Joseph A. Mattocks, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 972 days.

(21) Appl. No.: 17/272,624

(22) PCT Filed: Sep. 5, 2019

(86) PCT No.: PCT/US2019/049652
§ 371 (c)(1),
(2) Date: Mar. 1, 2021

(87) PCT Pub. No.: WO2020/051274
PCT Pub. Date: Mar. 12, 2020

(65) Prior Publication Data
US 2021/0189521 A1 Jun. 24, 2021

Related U.S. Application Data

(60) Provisional application No. 62/727,114, filed on Sep. 5, 2018.

(51) Int. Cl.
| | |
|---|---|
| C07K 14/195 | (2006.01) |
| C22B 3/22 | (2006.01) |
| C22B 3/42 | (2006.01) |
| C22B 59/00 | (2006.01) |
| C22B 60/02 | (2006.01) |

(52) U.S. Cl.
CPC ............ *C22B 60/02* (2013.01); *C07K 14/195* (2013.01); *C22B 3/22* (2013.01); *C22B 3/42* (2013.01); *C22B 59/00* (2013.01); *Y10S 530/81* (2013.01)

(58) Field of Classification Search
CPC ......... C22B 59/00; C22B 3/18; C07K 14/195; C07C 211/54; C07C 215/50; C07C 229/16; B01D 15/3804; B01D 15/3828
USPC ...................................................... 530/400
See application file for complete search history.

(56) References Cited

U.S. PATENT DOCUMENTS

| | | |
|---|---|---|
| 5,665,865 A | 9/1997 | Lerner et al. |
| 2014/0141044 A1 | 5/2014 | Dana-Farber et al. |

FOREIGN PATENT DOCUMENTS

| | | |
|---|---|---|
| CN | 105612426 A | 5/2016 |
| WO | 9116912 A1 | 11/1991 |
| WO | 03014373 A2 | 2/2003 |
| WO | 2010/099536 A2 | 9/2010 |
| WO | 2015/021143 A1 | 2/2015 |
| WO | 2017/216384 A1 | 12/2017 |

OTHER PUBLICATIONS

Kisselev L., (Structure, 2002, vol. 10: 8-9.*
Witkowski et al., (Biochemistry 38:11643-11650, 1999.*
Whisstock et al., (Quarterly Reviews of Biophysics 2003, vol. 36 (3): 307-340.*
Devos et al., (Proteins: Structure, Function and Genetics, 2000, vol. 41: 98-107.*
Vuilleumier et al., "Conserved hypothetical protein; putative exported protein [Methylorubrum extorquens AM1]," GenBank: ACS39628. 1, Jan. 31, 2014.
Maniccia, A.W., et al., Inverse tuning of metal binding affinity and protein stability by altering charged coordination residues in designed calcium binding proteins, PMC Biophysics, Dec. 21, 2009, vol. 2, No. 11, pp. 1-16.
Deblonde, G.J., et al., Receptor recognition of transferrin bound to lanthanides and actinides: a discriminating step in cellular acquisition of f-block metals, Metallomics: Integrated Biometal Science, Jun. 2013, vol. 5, No. 6, pp. 619-626.
Kolobynina, K.G., et al., Emerging roles of the single EF-hand Ca2+ sensor tescalcin in the regulation of gene expression, cell growth and differentiation, Journal of Cell Science, Sep. 8, 2016, vol. 129, No. 19, pp. 3533-3540.
Bagdanov, Jr., A., et al., Design of metal-binding green fluorescent protein variants, Biochimica et Biophysica Acta. Apr. 1, 1998, vol. 1397, No. 1, pp. 56-64.
Wang, J., et al., A Single Molecular Probe for Multi-analyte (Cr3+, Al3+ and Fe3+) in Aqueous and its Biological Application, Chemical Communications, Sep. 2014, vol. 50, No. 82, pp. 1-10.
Xue et al., "Protein MRI contrast agent with unprecedented metal selectivity and sensitivity for liver cancer imaging," Proc. Natl. Acad. Sci. U.S.A., May 13, 2015, 112(21) 6607-6612.

* cited by examiner

*Primary Examiner* — Robert B Mondesi
*Assistant Examiner* — Mohammad Y Meah
(74) *Attorney, Agent, or Firm* — Hodgson Russ LLP

(57) ABSTRACT

A metal-binding protein having a high selective affinity for certain trivalent cations and/or tetravalent cations derived from, for example, rare earth elements or ions thereof such as lanthanide elements and actinides or ions thereof as well as from hafnium and zirconium elements or compounds thereof is disclosed as well as sensors including same and methods for capturing and separating such trivalent cations and/or tetravalent cations using the metal-binding protein.

18 Claims, 17 Drawing Sheets

Specification includes a Sequence Listing.

MAFRLSSAVL LAA-LVAAPA-Y A-APTTTKVD IAAFDPDKDG TIDLKEALAA GSAAFDKLDP
DKDGTLDAKE LKGRVSEADL KKLDPDNDGT LDKKEYLAAV EAQFKAANPD NDGTIDAREL
ASPAGSALVN LIRGENLYFQ GHHHHHH

SEQUENCE LISTING

```
<160> NUMBER OF SEQ ID NOS: 119

<210> SEQ ID NO 1
<211> LENGTH: 133
<212> TYPE: PRT
<213> ORGANISM: Methylorubrum extorquens

<400> SEQUENCE: 1

Met Ala Phe Arg Leu Ser Ser Ala Val Leu Ala Ala Leu Val Ala
1               5                   10                  15

Ala Pro Ala Tyr Ala Ala Pro Thr Thr Thr Lys Val Asp Ile Ala
                20                  25                  30

Ala Phe Asp Pro Asp Lys Asp Gly Thr Ile Asp Leu Lys Glu Ala Leu
                35                  40                  45

Ala Ala Gly Ser Ala Ala Phe Asp Lys Leu Asp Pro Asp Lys Asp Gly
            50                  55                  60

Thr Leu Asp Ala Lys Glu Leu Lys Gly Arg Val Ser Glu Ala Asp Leu
65                  70                  75                  80

Lys Lys Leu Asp Pro Asp Asn Asp Gly Thr Leu Asp Lys Lys Glu Tyr
                85                  90                  95

Leu Ala Ala Val Glu Ala Gln Phe Lys Ala Ala Asn Pro Asp Asn Asp
                100                 105                 110

Gly Thr Ile Asp Ala Arg Glu Leu Ala Ser Pro Ala Gly Ser Ala Leu
            115                 120                 125

Val Asn Leu Ile Arg
        130

<210> SEQ ID NO 2
<211> LENGTH: 402
<212> TYPE: DNA
<213> ORGANISM: Methylorubrum extorquens

<400> SEQUENCE: 2
atggcgttcc gcctctcctc tgccgttctg ctcgctgcgc tcgtcgccgc tccggcctac      60
gccgccccga cgacgaccac gaaggtcgat atcgccgcct tcgatccgga caaggacggc     120
acgatcgatc tgaaggaggc cctggccgcc ggctccgctg ccttcgacaa gctcgatccg     180
gataaggacg gcacgctcga cgctaaggag ctgaagggcc gcgtcagcga ggccgacctc     240
aagaagctcg acccggacaa cgacggcacc ctcgacaaga aggaatacct tgccgccgtc     300
gaggcgcagt tcaaggccgc taacccggac aacgacggca ccatcgacgc tagggaattg     360
gccagcccgg ccggttcggc cctggtcaat ctgatccgct aa                       402
```

```
<210> SEQ ID NO 3
<211> LENGTH: 12
<212> TYPE: PRT
<213> ORGANISM: Artificial Sequence
<220> FEATURE:
<223> OTHER INFORMATION: EF Hand Motif
<220> FEATURE:
<221> NAME/KEY: MISC_FEATURE
<222> LOCATION: (1)..(1)
<223> OTHER INFORMATION: X is D or N.
<220> FEATURE:
<221> NAME/KEY: MISC_FEATURE
<222> LOCATION: (2)..(2)
<223> OTHER INFORMATION: X is any canonical amino acid
<220> FEATURE:
<221> NAME/KEY: MISC_FEATURE
<222> LOCATION: (3)..(3)
<223> OTHER INFORMATION: X is D or N
<220> FEATURE:
<221> NAME/KEY: MISC_FEATURE
<222> LOCATION: (4)..(4)
<223> OTHER INFORMATION: X is any canonical amino acid
<220> FEATURE:
<221> NAME/KEY: MISC_FEATURE
<222> LOCATION: (5)..(5)
<223> OTHER INFORMATION: X is D or N
<220> FEATURE:
<221> NAME/KEY: MISC_FEATURE
<222> LOCATION: (6)..(11)
<223> OTHER INFORMATION: X is any canconical amino acid
<220> FEATURE:
<221> NAME/KEY: MISC_FEATURE
<222> LOCATION: (12)..(12)
<223> OTHER INFORMATION: X is any D or E

<400> SEQUENCE: 3

Xaa Xaa Xaa Xaa Xaa Xaa Xaa Xaa Xaa Xaa Xaa Xaa
1               5                   10

<210> SEQ ID NO 4
<211> LENGTH: 1749
<212> TYPE: DNA
<213> ORGANISM: Methylorubrum extorquens

<400> SEQUENCE: 4
atggtgagca agggcgagga gctgttcacc ggggtggtgc ccatcctggt cgagctggac      60
ggcgacgtaa acggccacag gttcagcgtg tccggcgagg gcgagggcga tgccacctac     120
ggcaagctga ccctgaagtt catctgcacc accggcaagc tgcccgtgcc ctggcccacc     180
ctcgtgacca ccctgaccty gggcgtgcag tgcttcagcc gctacccsga ccacatgaag     240
cagcacgact tcttcaagtc cgccatgccc gaaggctacg tccaggagcg taccatcttc     300
ttcaaggacg acggcaacta caagacccgc gccgaggtga agttcgaggg cgacaccctg     360
gtgaaccgca tcgagctgaa gggcatcgac ttcaaggagg acggcaacat cctggggcac     420
aagctggagt acaactacat cagccacaac gtctatatca ccgccgacaa gcagaagaac     480
ggcatcaagg cccacttcaa gatccgccac aacatcgagg acggcagcgt gcagctcgcc     540
gaccactacc agcagaacac ccccatcggc gacggccccg tgctgctgcc cgacaaccac     600
tacctgagca cccagtccgc cctgagcaaa gaccccaacg agaagcgcga tcacatggtc     660
ctgctggagt tcgtgaccgc cgcccgcatg ccaactacga ctaccaaagt tgatatcgcg     720
gcgtttgacc cggacaaaga tggaccatcg atctgaaag aggctttggc ggcaggttcc     780
gcggccttcg acaagttgga cccggataaa gatggtactc tggacgccaa agagctgaag     840
ggccgcgtgt ctgaggcaga ccttaagaag ctggaccctg acaatgacgg aacgctggac     900
```

```
aagaaagagt acttagcagc ggtagaggca cagtttaagg ccgctaaccc tgacaacgat    960
ggcactattg acgcccgtga acttgcaagc ccagcggggt cggccctggt caacttaatt   1020
cgtgagctca tggtgagcaa gggcgaggag ctgttcaccg gggtggtgcc catcctggtc   1080
gagctggacg gcgacgtaaa cggccacaag ttcagcgtgt ccggcgaggg cgagggcgat   1140
gccacctacg gcaagctgac cctgaagttc atctgcacca ccggcaagct gcccgtgccc   1200
tggcccaccc tcgtgaccac cttcggctac ggcctgatgt gcttcgcccg ctaccccgac   1260
cacatgaagc agcacgactt cttcaagtcc gccatgcccg aaggctacgt ccaggagcgc   1320
accatcttct tcaaggacga cggcaactac aagacccgcg ccgaggtgaa gttcgagggc   1380
gacaccctgg tgaaccgcat cgagctgaag ggcatcgact tcaaggagga cggcaacatc   1440
ctggggcaca agctggagta caactacaac agccacaacg tctatatcat ggccgacaag   1500
cagaagaacg gcatcaaggt gaacttcaag atccgccaca acatcgagga cggcagcgtg   1560
cagctcgccg accactacca gcagaacacc cccatcggcg acggccccgt gctgctgccc   1620
gacaaccact acctgagcta ccagtccgcc ctgagcaaag accccaacga gaagcgcgat   1680
cacatggtcc tgctggagtt cgtgaccgcc gccgggatca ctctcggcat ggacgagcta   1740
tacaagtaa                                                           1749

<210> SEQ ID NO 5
<211> LENGTH: 1749
<212> TYPE: DNA
<213> ORGANISM: Methylorubrum extorquens

<400> SEQUENCE: 5
atggtgagca agggcgagga gctgttcacc ggggtggtgc ccatcctggt cgagctggac     60
ggcgacgtaa acgccacag gttcagcgtg tccggcgagg gcgagggcga tgccacctac    120
ggcaagctga ccctgaagtt catctgcacc accggcaagc tgcccgtgcc ctggcccacc    180
ctcgtgacca ccctgacctg gggcgtgcag tgcttcagcc gctaccccga ccacatgaag    240
cagcacgact tcttcaagtc cgccatgccc gaaggctacg tccaggagcg taccatcttc    300
ttcaaggacg acggcaacta caagacccgc gccgaggtga agttcgaggg cgacaccctg    360
gtgaaccgca tcgagctgaa gggcatcgac ttcaaggagg acggcaacat cctggggcac    420
aagctggagt acaactacat cagccacaac gtctatatca ccgccgacaa gcagaagaac    480
ggcatcaagg cccacttcaa gatccgccac aacatcgagg acggcagcgt gcagctcgcc    540
gaccactacc agcagaacac ccccatcggc gacggccccg tgctgctgcc cgacaaccac    600
tacctgagca cccagtccgc cctgagcaaa gaccccaacg agaagcgcga tcacatggtc    660
ctgctggagt tcgtgaccgc cgcccgcatg ccaactacga ctaccaaagt tgatatcgcg    720
gcgtttgacg cggacaaaga tggaccatc gatctgaaag aggctttggc ggcaggttcc    780
gcggccttcg acaagttgga cgcggataaa gatggtactc tggacgccaa agagctgaag    840
ggccgcgtgt ctgaggcaga ccttaagaag ctggacgctg acaatgacgg aaccctggac    900
aagaaagagt acttagcagc ggtagaggca cagtttaagg ccgctaacgc tgacaacgat    960
ggcactattg acgcccgtga acttgcaagc ccagcggggt cggccctggt caacttaatt   1020
cgtgagctca tggtgagcaa gggcgaggag ctgttcaccg gggtggtgcc catcctggtc   1080
gagctggacg gcgacgtaaa cggccacaag ttcagcgtgt ccggcgaggg cgagggcgat   1140
gccacctacg gcaagctgac cctgaagttc atctgcacca ccggcaagct gcccgtgccc   1200
```

```
tggcccaccc tcgtgaccac cttcggctac ggcctgatgt gcttcgcccg ctaccccgac    1260
cacatgaagc agcacgactt cttcaagtcc gccatgcccg aaggctacgt ccaggagcgc    1320
accatcttct tcaaggacga cggcaactac aagacccgcg ccgaggtgaa gttcgagggc    1380
gacaccctgg tgaaccgcat cgagctgaag ggcatcgact tcaaggagga cggcaacatc    1440
ctggggcaca agctggagta caactacaac agccacaacg tctatatcat ggccgacaag    1500
cagaagaacg gcatcaaggt gaacttcaag atccgccaca acatcgagga cggcagcgtg    1560
cagctcgccg accactacca gcagaacacc cccatcggcg acggccccgt gctgctgccc    1620
gacaaccact acctgagcta ccagtccgcc ctgagcaaag accccaacga aaagcgcgat    1680
cacatggtcc tgctggagtt cgtgaccgcc gccgggatca ctctcggcat ggacgagcta    1740
tacaagtaa                                                           1749
```

<210> SEQ ID NO 6

<400> SEQUENCE: 6

000

<210> SEQ ID NO 7

<400> SEQUENCE: 7

000

<210> SEQ ID NO 8
<211> LENGTH: 13
<212> TYPE: PRT
<213> ORGANISM: Artificial Sequence
<220> FEATURE:
<223> OTHER INFORMATION: TEV-cleavable His tag

<400> SEQUENCE: 8

```
Gly Glu Asn Leu Tyr Phe Gln His His His His His His
1               5                   10
```

<210> SEQ ID NO 9

<400> SEQUENCE: 9

000

<210> SEQ ID NO 10

<400> SEQUENCE: 10

000

<210> SEQ ID NO 11
<211> LENGTH: 461
<212> TYPE: DNA
<213> ORGANISM: Artificial Sequence
<220> FEATURE:
<223> OTHER INFORMATION: Codon-optimized, C-terminal TEV and His6 sites

<400> SEQUENCE: 11

```
aatacatatg gcgtttcgtt tgagcagtgc cgtgttatta gctgcgcttg tagcagctcc    60
ggcgtatgcc gcgccaacta cgactaccaa agttgatatc gcggcgtttg acccggacaa   120
agatgggacc atcgatctga aagaggcttt ggcggcaggt tccgcggcct tcgacaagtt   180
ggacccggat aaagatggta ctctggacgc caaagagctg aagggccgcg tgtctgaggc   240
```

```
agaccttaag aagctggacc ctgacaatga cggaaccctg acaagaaag  agtacttagc      300 agcggtagag gcacagttta aggccgctaa ccctgacaac gatggcacta ttgacgcccg      360
tgaacttgca agcccagcgg ggtcggccct ggtcaactta attcgtggtg aaaacctgta      420
ttttcagggc catcatcacc atcatcacta agaattctat t                         461
```

<210> SEQ ID NO 12
<211> LENGTH: 380
<212> TYPE: DNA
<213> ORGANISM: Artificial Sequence
<220> FEATURE:
<223> OTHER INFORMATION: Codon-optimized, N-terminal TEV site, His6 tag
      from pET28a

<400> SEQUENCE: 12

```
aatacatatg gaaaacctgt attttcaggg cgcgccaact acgactacca aagttgatat      60
cgcggcgttt gacccggaca agatgggac catcgatctg aaagaggctt tggcggcagg      120
ttccgcggcc ttcgacaagt tggacccgga taaagatggt actctggacg ccaaagagct      180
gaagggccgc gtgtctgagg cagaccttaa gaagctggac cctgacaatg acggaaccct      240
ggacaagaaa gagtacttag cagcggtaga ggcacagttt aaggccgcta accctgacaa      300
cgatggcact attgacgccc gtgaacttgc aagcccagcg gggtcggccc tggtcaactt      360
aattcgttaa gaattctatt                                                 380
```

<210> SEQ ID NO 13
<211> LENGTH: 16
<212> TYPE: PRT
<213> ORGANISM: Methylorubrum extorquens

<400> SEQUENCE: 13

Arg Glu Leu Ala Ser Pro Ala Gly Ser Ala Leu Val Asn Leu Ile Arg
1               5                   10                  15

<210> SEQ ID NO 14
<211> LENGTH: 14
<212> TYPE: PRT
<213> ORGANISM: Methylorubrum extorquens

<400> SEQUENCE: 14

Lys Glu Ala Leu Ala Ala Gly Ser Ala Ala Phe Asp Lys Leu
1               5                   10

<210> SEQ ID NO 15
<211> LENGTH: 15
<212> TYPE: PRT
<213> ORGANISM: Methylorubrum extorquens

<400> SEQUENCE: 15

Lys Ala Ala Asn Pro Asp Asn Asp Gly Thr Ile Asp Ala Arg Glu
1               5                   10                  15

<210> SEQ ID NO 16
<211> LENGTH: 15
<212> TYPE: PRT
<213> ORGANISM: Methylorubrum extorquens

<400> SEQUENCE: 16

Lys Lys Leu Asp Pro Asp Asn Asp Gly Thr Leu Asp Lys Lys Glu
1               5                   10                  15

<210> SEQ ID NO 17

-continued

```
<211> LENGTH: 26
<212> TYPE: PRT
<213> ORGANISM: Methylorubrum extorquens

<400> SEQUENCE: 17

Lys Glu Ala Leu Ala Ala Gly Ser Ala Ala Phe Asp Lys Leu Asp Pro
1               5                   10                  15

Asp Lys Asp Gly Thr Leu Asp Ala Lys Glu
            20                  25

<210> SEQ ID NO 18
<211> LENGTH: 9
<212> TYPE: PRT
<213> ORGANISM: Methylorubrum extorquens

<400> SEQUENCE: 18

Arg Val Ser Glu Ala Asp Leu Lys Lys
1               5

<210> SEQ ID NO 19
<211> LENGTH: 14
<212> TYPE: PRT
<213> ORGANISM: Methylorubrum extorquens

<400> SEQUENCE: 19

Lys Leu Asp Pro Asp Lys Asp Gly Thr Leu Asp Ala Lys Glu
1               5                   10

<210> SEQ ID NO 20

<400> SEQUENCE: 20

000

<210> SEQ ID NO 21
<211> LENGTH: 32
<212> TYPE: DNA
<213> ORGANISM: Artificial Sequence
<220> FEATURE:
<223> OTHER INFORMATION: Primer

<400> SEQUENCE: 21
ataacatatg gcgccaacta cgactaccaa ag                               32

<210> SEQ ID NO 22
<211> LENGTH: 34
<212> TYPE: DNA
<213> ORGANISM: Artificial Sequence
<220> FEATURE:
<223> OTHER INFORMATION: Primer

<400> SEQUENCE: 22
aatagaattc ttaacgaatt aagttgacca gggc                             34

<210> SEQ ID NO 23
<211> LENGTH: 28
<212> TYPE: DNA
<213> ORGANISM: Artificial Sequence
<220> FEATURE:
<223> OTHER INFORMATION: Primer

<400> SEQUENCE: 23
ataacatatg catcatcacc atcatcac                                    28

<210> SEQ ID NO 24
```

<211> LENGTH: 22
<212> TYPE: DNA
<213> ORGANISM: Artificial Sequence
<220> FEATURE:
<223> OTHER INFORMATION: Primer

<400> SEQUENCE: 24
gcgccaacta cgactaccaa ag        22

<210> SEQ ID NO 25
<211> LENGTH: 34
<212> TYPE: DNA
<213> ORGANISM: Artificial Sequence
<220> FEATURE:
<223> OTHER INFORMATION: Primer

<400> SEQUENCE: 25
ataagaattc ttagtgatga tggtgatgat gacg        34

<210> SEQ ID NO 26
<211> LENGTH: 22
<212> TYPE: DNA
<213> ORGANISM: Artificial Sequence
<220> FEATURE:
<223> OTHER INFORMATION: Primer

<400> SEQUENCE: 26
aattaagttg accagggccg ac        22

<210> SEQ ID NO 27
<211> LENGTH: 20
<212> TYPE: DNA
<213> ORGANISM: Artificial Sequence
<220> FEATURE:
<223> OTHER INFORMATION: Primer

<400> SEQUENCE: 27
taatacgact cactataggg        20

<210> SEQ ID NO 28
<211> LENGTH: 19
<212> TYPE: DNA
<213> ORGANISM: Artificial Sequence
<220> FEATURE:
<223> OTHER INFORMATION: Primer

<400> SEQUENCE: 28
gctagttatt gctcagcgg        19

<210> SEQ ID NO 29

<400> SEQUENCE: 29

000

<210> SEQ ID NO 30

<400> SEQUENCE: 30

000

<210> SEQ ID NO 31
<211> LENGTH: 37
<212> TYPE: DNA
<213> ORGANISM: Artificial Sequence
<220> FEATURE:
<223> OTHER INFORMATION: Primer

<400> SEQUENCE: 31
ataagcatgc caactacgac taccaaagtt gatatcg                          37

<210> SEQ ID NO 32
<211> LENGTH: 31
<212> TYPE: DNA
<213> ORGANISM: Artificial Sequence
<220> FEATURE:
<223> OTHER INFORMATION: Primer

<400> SEQUENCE: 32
aatagagctc acgaattaag ttgaccaggg c                                31

<210> SEQ ID NO 33
<211> LENGTH: 20
<212> TYPE: DNA
<213> ORGANISM: Artificial Sequence
<220> FEATURE:
<223> OTHER INFORMATION: Primer

<400> SEQUENCE: 33
atgccatagc atttttatcc                                             20

<210> SEQ ID NO 34
<211> LENGTH: 18
<212> TYPE: DNA
<213> ORGANISM: Artificial Sequence
<220> FEATURE:
<223> OTHER INFORMATION: Primer

<400> SEQUENCE: 34
gatttaatct gtatcagg                                               18

<210> SEQ ID NO 35
<211> LENGTH: 18
<212> TYPE: DNA
<213> ORGANISM: Artificial Sequence
<220> FEATURE:
<223> OTHER INFORMATION: Primer

<400> SEQUENCE: 35
caaccactac ctgagcac                                               18

<210> SEQ ID NO 36

<400> SEQUENCE: 36

000

<210> SEQ ID NO 37

<400> SEQUENCE: 37

000

<210> SEQ ID NO 38

<400> SEQUENCE: 38

000

<210> SEQ ID NO 39

<400> SEQUENCE: 39

000

<210> SEQ ID NO 40

<400> SEQUENCE: 40

000

<210> SEQ ID NO 41
<211> LENGTH: 113
<212> TYPE: PRT
<213> ORGANISM: Methylorubrum extorquens

<400> SEQUENCE: 41

```
Pro Thr Thr Thr Thr Lys Val Asp Ile Ala Ala Phe Asp Pro Asp Lys
 1               5                  10                  15

Asp Gly Thr Ile Asp Leu Lys Glu Ala Leu Ala Ala Gly Ser Ala Ala
             20                  25                  30

Phe Asp Lys Leu Asp Pro Asp Lys Asp Gly Thr Leu Asp Ala Lys Glu
         35                  40                  45

Leu Lys Gly Arg Val Ser Glu Ala Asp Leu Lys Lys Leu Asp Pro Asp
     50                  55                  60

Asn Asp Gly Thr Leu Asp Lys Lys Glu Tyr Leu Ala Ala Val Glu Ala
 65                  70                  75                  80

Gln Phe Lys Ala Ala Asn Pro Asp Asn Asp Gly Thr Ile Asp Ala Arg
                 85                  90                  95

Glu Leu Ala Ser Pro Ala Gly Ser Ala Leu Val Asn Leu Ile Arg Glu
            100                 105                 110

Leu
```

<210> SEQ ID NO 42
<211> LENGTH: 106
<212> TYPE: PRT
<213> ORGANISM: Artificial Sequence
<220> FEATURE:
<223> OTHER INFORMATION: LanM-delta30

<400> SEQUENCE: 42

```
Asp Ile Ala Ala Phe Asp Pro Asp Lys Asp Gly Thr Ile Asp Leu Lys
 1               5                  10                  15

Glu Ala Leu Ala Ala Gly Ser Ala Ala Phe Asp Lys Leu Asp Pro Asp
             20                  25                  30

Lys Asp Gly Thr Leu Asp Ala Lys Glu Leu Lys Gly Arg Val Ser Glu
         35                  40                  45

Ala Asp Leu Lys Lys Leu Asp Pro Asp Asn Asp Gly Thr Leu Asp Lys
     50                  55                  60

Lys Glu Tyr Leu Ala Ala Val Glu Ala Gln Phe Lys Ala Ala Asn Pro
 65                  70                  75                  80

Asp Asn Asp Gly Thr Ile Asp Ala Arg Glu Leu Ala Ser Pro Ala Gly
                 85                  90                  95

Ser Ala Leu Val Asn Leu Ile Arg Glu Leu
            100                 105
```

<210> SEQ ID NO 43
<211> LENGTH: 88
<212> TYPE: PRT
<213> ORGANISM: Artificial Sequence
<220> FEATURE:
<223> OTHER INFORMATION: LanM-delta48

```
<400> SEQUENCE: 43

Leu Ala Ala Gly Ser Ala Ala Phe Asp Lys Leu Asp Pro Asp Lys Asp
1               5                   10                  15

Gly Thr Leu Asp Ala Lys Glu Leu Lys Gly Arg Val Ser Glu Ala Asp
            20                  25                  30

Leu Lys Lys Leu Asp Pro Asp Asn Asp Gly Thr Leu Asp Lys Lys Glu
        35                  40                  45

Tyr Leu Ala Ala Val Glu Ala Gln Phe Lys Ala Ala Asn Pro Asp Asn
50                  55                  60

Asp Gly Thr Ile Asp Ala Arg Glu Leu Ala Ser Pro Ala Gly Ser Ala
65                  70                  75                  80

Leu Val Asn Leu Ile Arg Glu Leu
                85

<210> SEQ ID NO 44
<211> LENGTH: 104
<212> TYPE: PRT
<213> ORGANISM: Artificial Sequence
<220> FEATURE:
<223> OTHER INFORMATION: LanM- deltaN108-E119_GSG

<400> SEQUENCE: 44

Pro Thr Thr Thr Thr Lys Val Asp Ile Ala Ala Phe Asp Pro Asp Lys
1               5                   10                  15

Asp Gly Thr Ile Asp Leu Lys Glu Ala Leu Ala Ala Gly Ser Ala Ala
            20                  25                  30

Phe Asp Lys Leu Asp Pro Asp Lys Asp Gly Thr Leu Asp Ala Lys Glu
        35                  40                  45

Leu Lys Gly Arg Val Ser Glu Ala Asp Leu Lys Lys Leu Asp Pro Asp
50                  55                  60

Asn Asp Gly Thr Leu Asp Lys Lys Glu Tyr Leu Ala Ala Val Glu Ala
65                  70                  75                  80

Gln Phe Lys Ala Ala Gly Ser Gly Leu Ala Ser Pro Ala Gly Ser Ala
                85                  90                  95

Leu Val Asn Leu Ile Arg Glu Leu
                100

<210> SEQ ID NO 45
<211> LENGTH: 98
<212> TYPE: PRT
<213> ORGANISM: Artificial Sequence
<220> FEATURE:
<223> OTHER INFORMATION: LanM- deltaN108-E125_GSG

<400> SEQUENCE: 45

Pro Thr Thr Thr Thr Lys Val Asp Ile Ala Ala Phe Asp Pro Asp Lys
1               5                   10                  15

Asp Gly Thr Ile Asp Leu Lys Glu Ala Leu Ala Ala Gly Ser Ala Ala
            20                  25                  30

Phe Asp Lys Leu Asp Pro Asp Lys Asp Gly Thr Leu Asp Ala Lys Glu
        35                  40                  45

Leu Lys Gly Arg Val Ser Glu Ala Asp Leu Lys Lys Leu Asp Pro Asp
50                  55                  60

Asn Asp Gly Thr Leu Asp Lys Lys Glu Tyr Leu Ala Ala Val Glu Ala
65                  70                  75                  80

Gln Phe Lys Ala Ala Gly Ser Gly Ser Ala Leu Val Asn Leu Ile Arg
                85                  90                  95
```

Glu Leu

<210> SEQ ID NO 46
<211> LENGTH: 100
<212> TYPE: PRT
<213> ORGANISM: Artificial Sequence
<220> FEATURE:
<223> OTHER INFORMATION: LanM- deltaN108-E125_GGSGG

<400> SEQUENCE: 46

Pro Thr Thr Thr Thr Lys Val Asp Ile Ala Ala Phe Asp Pro Asp Lys
1               5                   10                  15

Asp Gly Thr Ile Asp Leu Lys Glu Ala Leu Ala Ala Gly Ser Ala Ala
            20                  25                  30

Phe Asp Lys Leu Asp Pro Asp Lys Asp Gly Thr Leu Asp Ala Lys Glu
        35                  40                  45

Leu Lys Gly Arg Val Ser Glu Ala Asp Leu Lys Lys Leu Asp Pro Asp
    50                  55                  60

Asn Asp Gly Thr Leu Asp Lys Lys Glu Tyr Leu Ala Ala Val Glu Ala
65                  70                  75                  80

Gln Phe Lys Ala Ala Gly Gly Ser Gly Gly Ser Ala Leu Val Asn Leu
                85                  90                  95

Ile Arg Glu Leu
            100

<210> SEQ ID NO 47
<211> LENGTH: 81
<212> TYPE: PRT
<213> ORGANISM: Artificial Sequence
<220> FEATURE:
<223> OTHER INFORMATION: LanM- delta48_ deltaN108-E119_GGSGG

<400> SEQUENCE: 47

Leu Ala Ala Gly Ser Ala Ala Phe Asp Lys Leu Asp Pro Asp Lys Asp
1               5                   10                  15

Gly Thr Leu Asp Ala Lys Glu Leu Lys Gly Arg Val Ser Glu Ala Asp
            20                  25                  30

Leu Lys Lys Leu Asp Pro Asp Asn Asp Gly Thr Leu Asp Lys Lys Glu
        35                  40                  45

Tyr Leu Ala Ala Val Glu Ala Gln Phe Lys Ala Ala Gly Gly Ser Gly
    50                  55                  60

Gly Leu Ala Ser Pro Ala Gly Ser Ala Leu Val Asn Leu Ile Arg Glu
65                  70                  75                  80

Leu

<210> SEQ ID NO 48
<211> LENGTH: 283
<212> TYPE: PRT
<213> ORGANISM: Artificial Sequence
<220> FEATURE:
<223> OTHER INFORMATION: Bioluminescent LaMP2

<400> SEQUENCE: 48

Met Val Phe Thr Leu Glu Asp Phe Val Gly Asp Trp Arg Gln Thr Ala
1               5                   10                  15

Gly Tyr Asn Leu Asp Gln Val Leu Glu Gln Gly Gly Val Ser Ser Leu
            20                  25                  30

Phe Gln Asn Leu Gly Val Ser Val Thr Pro Ile Gln Arg Ile Val Leu
        35                  40                  45

```
Ser Gly Glu Asn Gly Leu Lys Ile Asp Ile His Val Ile Pro Tyr
     50                  55                  60

Glu Gly Leu Ser Gly Asp Gln Met Gly Gln Ile Glu Lys Ile Phe Lys
65                  70                  75                  80

Val Val Tyr Pro Val Asp Asp His His Phe Lys Val Ile Leu His Tyr
                 85                  90                  95

Gly Thr Leu Val Ile Asp Gly Val Thr Pro Asn Met Ile Asp Tyr Phe
                100                 105                 110

Gly Arg Pro Tyr Glu Gly Ile Ala Val Phe Asp Gly Lys Lys Ile Thr
                115                 120                 125

Val Thr Gly Thr Leu Trp Asn Gly Asn Lys Ile Ile Asp Glu Arg Leu
130                 135                 140

Ile Asn Pro Asp Gly Ser Leu Leu Phe Arg Val Thr Ile Asn Gly Val
145                 150                 155                 160

Thr Gly Trp Arg Leu Ala Glu Arg Ile Leu Ala Pro Thr Thr Thr Thr
                165                 170                 175

Lys Val Asp Ile Ala Ala Phe Asp Pro Asp Lys Asp Gly Thr Ile Asp
                180                 185                 190

Leu Lys Glu Ala Leu Ala Ala Gly Ser Ala Ala Phe Asp Lys Leu Asp
            195                 200                 205

Pro Asp Lys Asp Gly Thr Leu Asp Ala Lys Glu Leu Lys Gly Arg Val
            210                 215                 220

Ser Glu Ala Asp Leu Lys Leu Asp Pro Asp Asn Asp Gly Thr Leu
225                 230                 235                 240

Asp Lys Lys Glu Tyr Leu Ala Ala Val Glu Ala Gln Phe Lys Ala Ala
                245                 250                 255

Asn Pro Asp Asn Asp Gly Thr Ile Asp Ala Arg Glu Leu Ala Ser Pro
            260                 265                 270

Ala Gly Ser Ala Leu Val Asn Leu Ile Arg Cys
            275                 280

<210> SEQ ID NO 49
<211> LENGTH: 760
<212> TYPE: PRT
<213> ORGANISM: Artificial Sequence
<220> FEATURE:
<223> OTHER INFORMATION: Bioluminescent LaMP3

<400> SEQUENCE: 49

Met Val Phe Thr Leu Glu Asp Phe Val Gly Asp Trp Arg Gln Thr Ala
1               5                   10                  15

Gly Tyr Asn Leu Asp Gln Val Leu Glu Gln Gly Gly Val Ser Ser Leu
            20                  25                  30

Phe Gln Asn Leu Gly Val Ser Val Thr Pro Ile Gln Arg Ile Val Leu
        35                  40                  45

Ser Gly Glu Asn Gly Leu Lys Ile Asp Ile His Val Ile Ile Pro Tyr
    50                  55                  60

Glu Gly Leu Ser Gly Asp Gln Met Gly Gln Ile Glu Lys Ile Phe Lys
65                  70                  75                  80

Val Val Tyr Pro Val Asp Asp His His Phe Lys Val Ile Leu His Tyr
                85                  90                  95

Gly Thr Leu Val Ile Asp Gly Val Thr Pro Asn Met Ile Asp Tyr Phe
                100                 105                 110

Gly Arg Pro Tyr Glu Gly Ile Ala Val Phe Asp Gly Lys Lys Ile Thr
                115                 120                 125
```

```
Val Thr Gly Thr Leu Trp Asn Gly Asn Lys Ile Ile Asp Glu Arg Leu
    130                 135                 140

Ile Asn Pro Asp Gly Ser Leu Leu Phe Arg Val Thr Ile Asn Gly Val
145                 150                 155                 160

Thr Gly Trp Arg Leu Ala Glu Arg Ile Leu Ala Pro Thr Thr Thr Thr
                165                 170                 175

Lys Val Asp Ile Ala Ala Phe Asp Pro Asp Lys Asp Gly Thr Ile Asp
                180                 185                 190

Leu Lys Glu Ala Leu Ala Ala Gly Ser Ala Ala Phe Asp Lys Leu Asp
            195                 200                 205

Pro Asp Lys Asp Gly Thr Leu Asp Ala Lys Glu Leu Lys Gly Arg Val
210                 215                 220

Ser Glu Ala Asp Leu Lys Lys Leu Asp Pro Asp Asn Asp Gly Thr Leu
225                 230                 235                 240

Asp Lys Lys Glu Tyr Leu Ala Ala Val Glu Ala Gln Phe Lys Ala Ala
                245                 250                 255

Asn Pro Asp Asn Asp Gly Thr Ile Asp Ala Arg Glu Leu Ala Ser Pro
                260                 265                 270

Ala Gly Ser Ala Leu Val Asn Leu Ile Arg Glu Leu Met Val Ser Lys
            275                 280                 285

Gly Glu Glu Val Ile Lys Glu Phe Met Arg Phe Lys Val Arg Met Glu
    290                 295                 300

Gly Ser Met Asn Gly His Glu Phe Glu Ile Glu Gly Glu Gly Glu Gly
305                 310                 315                 320

Arg Pro Tyr Glu Gly Thr Gln Thr Ala Lys Leu Lys Val Thr Lys Gly
                325                 330                 335

Gly Pro Leu Pro Phe Ala Trp Asp Ile Leu Ser Pro Gln Phe Met Tyr
                340                 345                 350

Gly Ser Lys Ala Tyr Val Lys His Pro Ala Asp Ile Pro Asp Tyr Lys
            355                 360                 365

Lys Leu Ser Phe Pro Glu Gly Phe Lys Trp Glu Arg Val Met Asn Phe
    370                 375                 380

Glu Asp Gly Gly Leu Val Thr Val Thr Gln Asp Ser Ser Leu Gln Asp
385                 390                 395                 400

Gly Thr Leu Ile Tyr Lys Val Lys Met Arg Gly Thr Asn Phe Pro Pro
                405                 410                 415

Asp Gly Pro Val Met Gln Lys Lys Thr Met Gly Trp Glu Ala Ser Thr
                420                 425                 430

Glu Arg Leu Tyr Pro Arg Asp Gly Val Leu Lys Gly Glu Ile His Gln
            435                 440                 445

Ala Leu Lys Leu Lys Asp Gly Gly His Tyr Leu Val Glu Phe Lys Thr
450                 455                 460

Ile Tyr Met Ala Lys Lys Pro Val Gln Leu Pro Gly Tyr Tyr Tyr Val
465                 470                 475                 480

Asp Thr Lys Leu Asp Ile Thr Ser His Asn Glu Asp Tyr Thr Ile Val
                485                 490                 495

Glu Gln Tyr Glu Arg Ser Glu Gly Arg His His Leu Phe Leu Gly His
            500                 505                 510

Gly Thr Gly Ser Thr Gly Ser Gly Ser Gly Thr Ala Ser Ser Glu
    515                 520                 525

Asp Asn Asn Met Ala Val Ile Lys Glu Phe Met Arg Phe Lys Val Arg
530                 535                 540

Met Glu Gly Ser Met Asn Gly His Glu Phe Glu Ile Glu Gly Glu Gly
```

```
                545                 550                 555                 560
    Glu Gly Arg Pro Tyr Glu Gly Thr Gln Thr Ala Lys Leu Lys Val Thr
                    565                 570                 575
    Lys Gly Gly Pro Leu Pro Phe Ala Trp Asp Ile Leu Ser Pro Gln Phe
                    580                 585                 590
    Met Tyr Gly Ser Lys Ala Tyr Val Lys His Pro Ala Asp Ile Pro Asp
                    595                 600                 605
    Tyr Lys Lys Leu Ser Phe Pro Glu Gly Phe Lys Trp Glu Arg Val Met
                    610                 615                 620
    Asn Phe Glu Asp Gly Gly Leu Val Thr Val Thr Gln Asp Ser Ser Leu
    625                 630                 635                 640
    Gln Asp Gly Thr Leu Ile Tyr Lys Val Lys Met Arg Gly Thr Asn Phe
                    645                 650                 655
    Pro Pro Asp Gly Pro Val Met Gln Lys Lys Thr Met Gly Trp Glu Ala
                    660                 665                 670
    Ser Thr Glu Arg Leu Tyr Pro Arg Asp Gly Val Leu Lys Gly Glu Ile
                    675                 680                 685
    His Gln Ala Leu Lys Leu Lys Asp Gly Gly His Tyr Leu Val Glu Phe
                    690                 695                 700
    Lys Thr Ile Tyr Met Ala Lys Lys Pro Val Gln Leu Pro Gly Tyr Tyr
    705                 710                 715                 720
    Tyr Val Asp Thr Lys Leu Asp Ile Thr Ser His Asn Glu Asp Tyr Thr
                    725                 730                 735
    Ile Val Glu Gln Tyr Glu Arg Ser Glu Gly Arg His His Leu Phe Leu
                    740                 745                 750
    Tyr Gly Met Asp Glu Leu Tyr Lys
                    755                 760

<210> SEQ ID NO 50

<400> SEQUENCE: 50

000

<210> SEQ ID NO 51
<211> LENGTH: 12
<212> TYPE: PRT
<213> ORGANISM: Artificial Sequence
<220> FEATURE:
<223> OTHER INFORMATION: EF Hand

<400> SEQUENCE: 51

Asp Pro Asp Lys Asp Gly Thr Ile Asp Leu Lys Glu
1               5                   10

<210> SEQ ID NO 52
<211> LENGTH: 12
<212> TYPE: PRT
<213> ORGANISM: Artificial Sequence
<220> FEATURE:
<223> OTHER INFORMATION: EF Hand

<400> SEQUENCE: 52

Asp Pro Asp Lys Asp Gly Thr Leu Asp Ala Lys Glu
1               5                   10

<210> SEQ ID NO 53
<211> LENGTH: 12
<212> TYPE: PRT
<213> ORGANISM: Artificial Sequence
```

```
<220> FEATURE:
<223> OTHER INFORMATION: EF Hand

<400> SEQUENCE: 53

Asp Pro Asp Lys Asp Gly Thr Leu Asp Ala Lys Glu
1               5                   10

<210> SEQ ID NO 54
<211> LENGTH: 12
<212> TYPE: PRT
<213> ORGANISM: Artificial Sequence
<220> FEATURE:
<223> OTHER INFORMATION: EF Hand

<400> SEQUENCE: 54

Asn Pro Asp Lys Asp Gly Thr Ile Asp Ala Arg Glu
1               5                   10

<210> SEQ ID NO 55
<211> LENGTH: 12
<212> TYPE: PRT
<213> ORGANISM: Artificial Sequence
<220> FEATURE:
<223> OTHER INFORMATION: EF Hand

<400> SEQUENCE: 55

Asn Lys Asp Asn Asp Asp Ser Leu Glu Ile Ala Glu
1               5                   10

<210> SEQ ID NO 56
<211> LENGTH: 12
<212> TYPE: PRT
<213> ORGANISM: Artificial Sequence
<220> FEATURE:
<223> OTHER INFORMATION: EF Hand

<400> SEQUENCE: 56

Asp Ile Asp Lys Asp Gly Arg Val Ser Val Glu Glu
1               5                   10

<210> SEQ ID NO 57
<211> LENGTH: 12
<212> TYPE: PRT
<213> ORGANISM: Artificial Sequence
<220> FEATURE:
<223> OTHER INFORMATION: EF Hand

<400> SEQUENCE: 57

Asp Lys Asp Asn Asp Gly Thr Leu Asp Arg Glu Glu
1               5                   10

<210> SEQ ID NO 58
<211> LENGTH: 12
<212> TYPE: PRT
<213> ORGANISM: Artificial Sequence
<220> FEATURE:
<223> OTHER INFORMATION: EF Hand

<400> SEQUENCE: 58

Asp Lys Asn Gly Asp Gly Phe Ile Asp Lys Glu Glu
1               5                   10

<210> SEQ ID NO 59

<400> SEQUENCE: 59

000
```

<210> SEQ ID NO 60

<400> SEQUENCE: 60

000

<210> SEQ ID NO 61
<211> LENGTH: 8
<212> TYPE: PRT
<213> ORGANISM: Artificial Sequence
<220> FEATURE:
<223> OTHER INFORMATION: Cleavage site

<400> SEQUENCE: 61

Gly Glu Asn Leu Tyr Phe Gln Gly
1               5

<210> SEQ ID NO 62

<400> SEQUENCE: 62

000

<210> SEQ ID NO 63

<400> SEQUENCE: 63

000

<210> SEQ ID NO 64

<400> SEQUENCE: 64

000

<210> SEQ ID NO 65

<400> SEQUENCE: 65

000

<210> SEQ ID NO 66

<400> SEQUENCE: 66

000

<210> SEQ ID NO 67

<400> SEQUENCE: 67

000

<210> SEQ ID NO 68

<400> SEQUENCE: 68

000

<210> SEQ ID NO 69

<400> SEQUENCE: 69

000

<210> SEQ ID NO 70

```
<400> SEQUENCE: 70

000

<210> SEQ ID NO 71

<400> SEQUENCE: 71

000

<210> SEQ ID NO 72

<400> SEQUENCE: 72

000

<210> SEQ ID NO 73

<400> SEQUENCE: 73

000

<210> SEQ ID NO 74

<400> SEQUENCE: 74

000

<210> SEQ ID NO 75

<400> SEQUENCE: 75

000

<210> SEQ ID NO 76

<400> SEQUENCE: 76

000

<210> SEQ ID NO 77

<400> SEQUENCE: 77

000

<210> SEQ ID NO 78

<400> SEQUENCE: 78

000

<210> SEQ ID NO 79

<400> SEQUENCE: 79

000

<210> SEQ ID NO 80

<400> SEQUENCE: 80

000

<210> SEQ ID NO 81

<400> SEQUENCE: 81
```

000

<210> SEQ ID NO 82

<400> SEQUENCE: 82

000

<210> SEQ ID NO 83

<400> SEQUENCE: 83

000

<210> SEQ ID NO 84

<400> SEQUENCE: 84

000

<210> SEQ ID NO 85

<400> SEQUENCE: 85

000

<210> SEQ ID NO 86

<400> SEQUENCE: 86

000

<210> SEQ ID NO 87

<400> SEQUENCE: 87

000

<210> SEQ ID NO 88

<400> SEQUENCE: 88

000

<210> SEQ ID NO 89

<400> SEQUENCE: 89

000

<210> SEQ ID NO 90

<400> SEQUENCE: 90

000

<210> SEQ ID NO 91

<400> SEQUENCE: 91

000

<210> SEQ ID NO 92

<400> SEQUENCE: 92

000

-continued

<210> SEQ ID NO 93

<400> SEQUENCE: 93

000

<210> SEQ ID NO 94

<400> SEQUENCE: 94

000

<210> SEQ ID NO 95

<400> SEQUENCE: 95

000

<210> SEQ ID NO 96

<400> SEQUENCE: 96

000

<210> SEQ ID NO 97

<400> SEQUENCE: 97

000

<210> SEQ ID NO 98

<400> SEQUENCE: 98

000

<210> SEQ ID NO 99

<400> SEQUENCE: 99

000

<210> SEQ ID NO 100

<400> SEQUENCE: 100

000

<210> SEQ ID NO 101

<400> SEQUENCE: 101

000

<210> SEQ ID NO 102

<400> SEQUENCE: 102

000

<210> SEQ ID NO 103

<400> SEQUENCE: 103

000

```
<210> SEQ ID NO 104
<400> SEQUENCE: 104
000

<210> SEQ ID NO 105
<400> SEQUENCE: 105
000

<210> SEQ ID NO 106
<400> SEQUENCE: 106
000

<210> SEQ ID NO 107
<400> SEQUENCE: 107
000

<210> SEQ ID NO 108
<400> SEQUENCE: 108
000

<210> SEQ ID NO 109
<400> SEQUENCE: 109
000

<210> SEQ ID NO 110
<400> SEQUENCE: 110
000

<210> SEQ ID NO 111
<400> SEQUENCE: 111
000

<210> SEQ ID NO 112
<400> SEQUENCE: 112
000

<210> SEQ ID NO 113
<400> SEQUENCE: 113
000

<210> SEQ ID NO 114
<400> SEQUENCE: 114
000

<210> SEQ ID NO 115
```

<400> SEQUENCE: 115

000

<210> SEQ ID NO 116
<211> LENGTH: 13
<212> TYPE: PRT
<213> ORGANISM: Methylorubrum extorquens

<400> SEQUENCE: 116

Lys Glu Tyr Leu Ala Ala Val Glu Ala Gln Phe Lys Ala
1               5                   10

<210> SEQ ID NO 117
<211> LENGTH: 19
<212> TYPE: PRT
<213> ORGANISM: Methylorubrum extorquens

<400> SEQUENCE: 117

Lys Val Asp Ile Ala Ala Phe Asp Pro Asp Lys Asp Gly Thr Ile Asp
1               5                   10                  15

Leu Lys Glu

<210> SEQ ID NO 118
<211> LENGTH: 106
<212> TYPE: PRT
<213> ORGANISM: Artificial Sequence
<220> FEATURE:
<223> OTHER INFORMATION: LanM- deltaN108-E119_GGSGG

<400> SEQUENCE: 118

Pro Thr Thr Thr Thr Lys Val Asp Ile Ala Ala Phe Asp Pro Asp Lys
1               5                   10                  15

Asp Gly Thr Ile Asp Leu Lys Glu Ala Leu Ala Ala Gly Ser Ala Ala
                20                  25                  30

Phe Asp Lys Leu Asp Pro Asp Lys Asp Gly Thr Leu Asp Ala Lys Glu
            35                  40                  45

Leu Lys Gly Arg Val Ser Glu Ala Asp Leu Lys Lys Leu Asp Pro Asp
        50                  55                  60

Asn Asp Gly Thr Leu Asp Lys Lys Glu Tyr Leu Ala Ala Val Glu Ala
65                  70                  75                  80

Gln Phe Lys Ala Ala Gly Gly Ser Gly Gly Leu Ala Ser Pro Ala Gly
                85                  90                  95

Ser Ala Leu Val Asn Leu Ile Arg Glu Leu
            100                 105

<210> SEQ ID NO 119
<211> LENGTH: 149
<212> TYPE: PRT
<213> ORGANISM: Homo sapiens

<400> SEQUENCE: 119

Met Ala Asp Gln Leu Thr Glu Glu Gln Ile Ala Glu Phe Lys Glu Ala
1               5                   10                  15

Phe Ser Leu Phe Asp Lys Asp Gly Asp Gly Thr Ile Thr Thr Lys Glu
                20                  25                  30

Leu Gly Thr Val Met Arg Ser Leu Gly Gln Asn Pro Thr Glu Ala Glu
            35                  40                  45

Leu Gln Asp Met Ile Asn Glu Val Asp Ala Asp Gly Asn Gly Thr Ile
        50                  55                  60

-continued

```
Asp Phe Pro Glu Phe Leu Thr Met Met Ala Arg Lys Met Lys Asp Thr
65                  70                  75                  80

Asp Ser Glu Glu Glu Ile Arg Glu Ala Phe Arg Val Phe Asp Lys Asp
                85                  90                  95

Gly Asn Gly Tyr Ile Ser Ala Ala Glu Leu Arg His Val Met Thr Asn
                100                 105                 110

Leu Gly Glu Lys Leu Thr Asp Glu Glu Val Asp Glu Met Ile Arg Glu
        115                 120                 125

Ala Asp Ile Asp Gly Asp Gly Gln Val Asn Tyr Glu Glu Phe Val Gln
        130                 135                 140

Met Met Thr Ala Lys
145
```

METAL-BINDING PROTEIN AND USE THEREOF

CROSS-REFERENCE TO RELATED APPLICATION

This application claims the benefit U.S. Provisional Application 62/727,114 filed on Sep. 5, 2018, the entire disclosure of which is hereby incorporated by reference herein.

SEQUENCE LISTING

The instant application contains a Sequence Listing, which is submitted in .txt format and is hereby incorporated by reference in its entirety. Said .txt file is named "074339_00205_ST25.txt", was created on Aug. 19, 2024, and is 35,904 bytes in size.

TECHNICAL FIELD

The present disclosure relates to metal-binding protein, and in particular to a protein with a selective affinity for rare earth elements.

BACKGROUND

Rare earth elements (REEs) comprise the lanthanides (Lns), yttrium, and scandium. These elements, particularly the Lns, are in high demand as key components in technologies such as permanent magnets, electric and hybrid car batteries, lasers, phosphors, and smartphones. However, the breadth of the applications of these elements is contrasted with the existence of relatively few economically viable mineable deposits and the difficulty of Ln extraction from ores and other feedstocks. The insolubility of REE salts and similarity of their chemical properties requires harsh, environmentally harmful, and laborious methods for accessing, recycling, and separating them.

The technological importance of REEs and the challenges associated with their acquisition have inspired bioengineering methods for more facile and environmentally friendly REE isolation. Whereas some plants and microbes have long been known to accumulate these metals, only recently has it been established that Lns play an essential biological role, in catalytic activity of certain pyrroloquinoline quinone (PQQ)-dependent alcohol dehydrogenase enzymes, especially methanol dehydrogenases (MDHs). These observations provide the possibility of learning from biology in designing new, effective methods for REE sensing, capture, and separations.

Thus, the identification and characterization of proteins that can selectively bind lanthanides may enable their uses in these capacities.

SUMMARY OF THE DISCLOSURE

An advantage of the present disclosure includes a metal-binding protein, which has a high selective affinity certain trivalent and/or tetravalent cations over non-trivalent and non-tetravalent cations. In some aspects, the metal binding protein has a high selective affinity (e.g., at least 1000 times, such as at least $10^4$, $10^5$, $10^6$, or greater) for trivalent cations and/or tetravalent cations from, e.g., a rare earth element, compounds or salt thereof, or an actinide element, compounds or salt thereof, over non-trivalent and/or non-tetravalent cations such as bivalent cations from, e.g., a group II element compound or salt thereof. Such bivalent cations include for example, calcium cations. In an embodiment, the metal-binding protein has an affinity for a lanthanide ion that is at least 1000 times, such as at least $10^4$, $10^5$, $10^6$, or $10^7$ times, an affinity of the metal-binding protein for divalent ions such as, for example, calcium ions. In an embodiment, the metal-binding protein has an affinity for an actinide ion that is at least 1000 times, such as at least $10^4$, $10^5$, $10^6$, or $10^7$ times, an affinity of the metal-binding protein for divalent ions such as, for example, calcium ions. In an embodiment, the metal-binding protein does not occur in nature. In embodiment, the metal-binding protein comprises a non-natural tag such as, for example, a $His_6$ tag. Advantageously, the metal-binding proteins of the present disclosure can be purified to at least 70%, such as at least 75%, 80%, 85%, 90%, 95% pure form.

Embodiments of the present disclosure include, for example, individually or in combination, wherein the metal-binding protein comprises a sequence having at least 80% identity, such as, for example, at least 85%, 90%, 92%, 95%, 97%, 98%, 99% or 100% identity, to the sequence of SEQ ID NO: 1. In other embodiments, the metal-binding proteins is not natural and/or comprises a non-natural tag such as, for example, a $His_6$ tag.

Another aspect of the present disclosure includes an isolated metal-binding protein comprising at least 2 EF hand motifs comprising a sequence of SEQ ID NO: 3, wherein adjacent EF hand motifs are separated by 10-15 amino acids. Embodiments of the present disclosure include, for example, individually or in combination, wherein the adjacent EF hand motifs are separated by 11, 12, or 13 amino acids. In some embodiments, the isolated metal-binding protein can comprise 2, 3, or 4 EF hand motifs, at least one of the EF hand motifs comprises at least 3 carboxylate residues, and at least 2 adjacent EF hand motifs are separated by 10-15 amino acid residues, e.g., separated by 12-13 amino acid residues. In other embodiments, the metal-binding proteins is not natural and/or comprises a non-natural tag such as, for example, a $His_6$ tag.

Another aspect of the present disclosure includes an isolated metal-binding protein encoded by a nucleotide comprising a sequence having at least 80% identity to the sequence of SEQ ID NO: 2. Embodiments of the present disclosure include, for example, individually or in combination, wherein the nucleotide comprises a sequence with at least 85%, 90%, 93%, 95%, 97%, 98%, 99% or 100% identity to the sequence of SEQ ID NO: 2. In other embodiments, the metal-binding proteins is not natural and/or comprises a non-natural tag such as, for example, a $His_6$ tag.

Another aspect of the present disclosure includes a sensor for sensing presence of certain trivalent and/or tetravalent cations over non-trivalent and non-tetravalent cations such as one or more trivalent cations from, e.g., a rare earth element, compound or salt thereof, or an actinide element, compound or salt thereof, such as lanthanide ions. The sensor includes a metal-binding protein having a high selective affinity for tri- and/or tetravalent cations from, e.g., a rare earth element, compound or salt thereof, or an actinide element, compound or salt thereof, over non-trivalent and non-tetravalent cations such as bivalent cations from, e.g., a group II element (e.g., calcium compounds or its salt). In an embodiment, the sensor further includes a first fluorescent protein and a second fluorescent protein, the second fluorescent protein having an excitation wavelength substantially identical to an emission wavelength of the first fluorescent protein.

Another aspect of the present disclosure includes a method for separating trivalent cations or tetravalent cations over non-trivalent cations or non-tetravalent cations from a medium, e.g., a solution, a suspension, or a colloid. The method includes contacting a medium containing a tri or tetravalent cation with a metal-binding protein to bind the tri or tetravalent cation. In some embodiments, the tri- or tetravalent cations are selected from the group consisting of tri- or tetravalent cations from one or more rare earth elements, compounds or salt thereof (e.g. a lanthanide or a salt thereof) or from one or more actinides, compounds thereof, or salts thereof, or from a combination of rare earths and actinides. The metal-binding protein can have a high selective affinity for trivalent cations over non-trivalent cations. In addition, or as an alternative, the metal-binding protein can have a high selective affinity for tetravalent cations over non-tetravalent cations. The method can also include separating the metal-binding protein to which trivalent cations and/or tetravalent cations have bound (e.g., a lanthanide (3+) ion) from the medium; and optionally separating the trivalent and/or tetravalent cations from the metal-binding protein.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
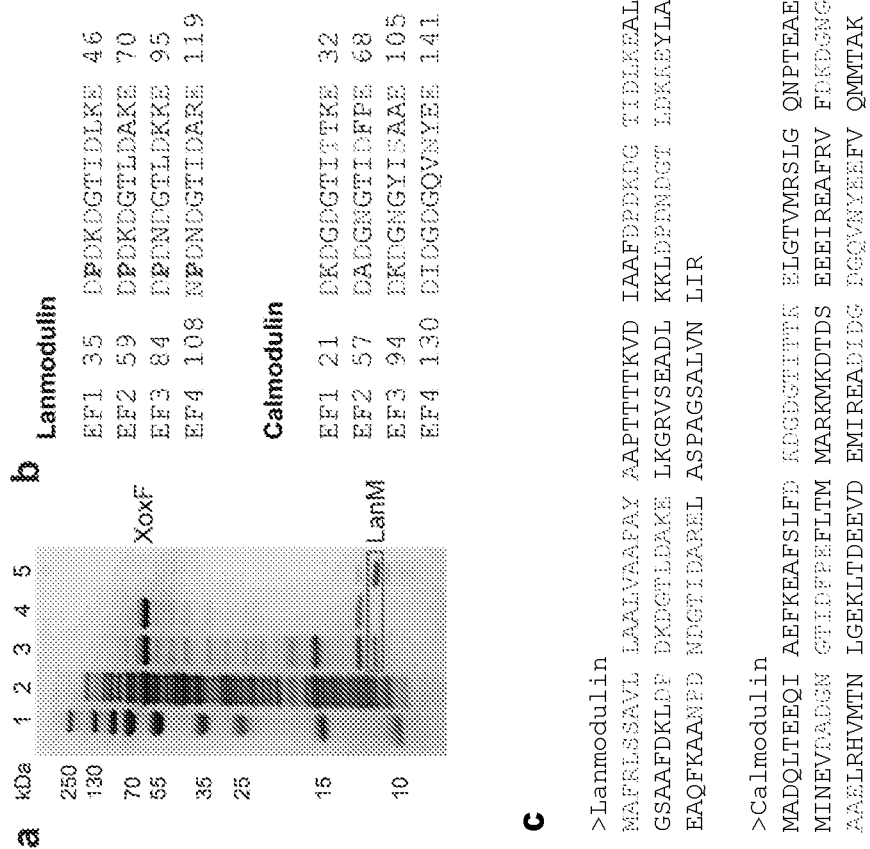
FIG. 1A shows SDS-PAGE analysis of XoxF purification and copurifying band (lanmodulin).
FIG. 1B shows sequences of EF hands of LanM and of human CaM (as a representative canonical EF hand-containing protein).
FIG. 1C shows comparison of the amino acid sequences of *M. extorquens* AM1 LanM (SEQ ID NO: 1) and *H. sapiens* calmodulin (SEQ ID NO:119).

The present disclosure relates to a metal-binding protein that has a high selective affinity for certain trivalent and/or tetravalent cations over non-trivalent and non-tetravalent cations. In particular, the metal-binding proteins of the present disclosure can have a high selective affinity for trivalent cations over non-trivalent cations. In addition, or as an alternative, the metal-binding protein can have a high selective affinity for tetravalent cations over non-tetravalent cations. Metal-binding proteins disclosed herein have an affinity for tri- and/or tetravalent cations from, e.g., a rare earth element, compound or salt thereof, or an actinide element, compound or salt thereof, that is at least 1000-fold higher than that for non-trivalent cations and/or tetravalent cations such as a bivalent cation from e.g., a group II element (such as calcium), compound or salt thereof. Metal-binding proteins disclosed herein can also have a high affinity for tetravalent cations from hafnium and zirconium elements, compounds and salts thereof. In an embodiment, such metal-binding proteins can have an affinity for a lanthanide ion or an actinide ion versus calcium ions, compounds or salts that is at least $10^3$, $10^4$, $10^5$, $10^6$, $10^7$ or greater. In an embodiment, the metal-binding protein does not occur in nature. In embodiment, the metal-binding protein comprises a non-natural tag such as, for example, a $His_6$ tag. Advantageously, such metal binding proteins can be included as a sensor for detecting a presence of a rare earth or an actinide element having high selectivity for rare-earth or actinide elements.

During efforts to characterize Ln-dependent methanol dehydrogenase (Ln-MDH) from *Methylorubrum extorquens* AM1, XoxF, a $Ln^{III}$-binding protein that co-purified with the Ln-MDH was identified. This protein, which has been named lanmodulin (LanM), for lanthanide-modulated protein, contains metal coordination motifs (EF hands) traditionally associated with nanomolar-to millimolar-affinity $Ca^{II}$ binding. However, LanM responds to Ln" μs and rare earths with up to 100 million-fold conformational selectivity (or even more) over $Ca^{II}$. Among other things, the present disclosure describes the identification, purification and isolation of LanM, its rare earth element binding characteristics, and the molecular basis of its binding and conformational selectivity for rare earth elements over other metal ions, such as $Ca^{II}$. FIG. 1C shows the amino acid sequences of LanM and human (*H. sapiens*) calmodulin (CaM). Advantageously, an isolated metal-binding protein includes a sequence that is at least 80% identical to SEQ ID NO: 1 (LanM) such as at least 82%, 85%, 87%, 90%, 92%, 95%, 99% or 100% identical to SEQ ID NO: 1. For example, in an embodiment, the isolated metal-binding protein has a sequence of SEQ ID NO: 1 with the first 21 amino acid residues removed. In addition, or as an alternative, the isolated metal-binding protein comprises certain motifs with certain spacing between pairs of the motifs that can exhibit similar properties to LanM, as described in more detail elsewhere herein. For example, an isolated metal-binding protein comprising carboxylate residues at the $9^{th}$ position of the EF hands and a similar number of amino acids between each predicted EF loop as in LanM will have properties similar to LanM. In an embodiment, such a metal-binding protein does not occur in nature. In another embodiment, the metal-binding protein comprises a non-natural tag such as, for example, a $His_6$ tag. Advantageously, the metal-binding proteins of the present disclosure can be purified to at least 70%, such as at least 75%, 80%, 85%, 90%, 95% pure form.

A polypeptide having an amino acid sequence at least, for example, about 95% "identical" to a reference an amino acid sequence, e.g., SEQ ID NO:1, etc. is understood to mean that the amino acid sequence of the polypeptide is identical to the reference sequence except that the amino acid sequence may include up to about five modifications per each 100 amino acids of the reference amino acid sequence. In other words, to obtain a peptide having an amino acid sequence at least about 95% identical to a reference amino acid sequence, up to about 5% of the amino acid residues of the reference sequence may be deleted or substituted with another amino acid or a number of amino acids up to about 5% of the total amino acids in the reference sequence may be inserted into the reference sequence. These modifications of the reference sequence may occur at the N-terminus or C-terminus positions of the reference amino acid sequence or anywhere between those terminal positions, interspersed either individually among amino acids in the reference sequence or in one or more contiguous groups within the reference sequence.

As used herein, "identity" is a measure of the identity of nucleotide sequences or amino acid sequences compared to a reference nucleotide or amino acid sequence. In general, the sequences are aligned so that the highest order match is obtained. "Identity" per se has an art-recognized meaning and can be calculated using well known techniques. While there are several methods to measure identity between two polynucleotide or polypeptide sequences, the term "identity" is well known to skilled artisans (Carillo (1988) J. Applied Math. 48, 1073). Examples of computer program methods to determine identity and similarity between two sequences include, but are not limited to, GCG program package (Devereux (1984) Nucleic Acids Research 12, 387), BLASTP, ExPASy, BLASTN, FASTA (Atschul (1990) J. Mol. Biol. 215, 403) and FASTDB. Examples of methods to determine identity and similarity are discussed in Michaels (2011) Current Protocols in Protein Science, Vol. 1, John Wiley & Sons.

In one embodiment of the present invention, the algorithm used to determine identity between two or more polypeptides is BLASTP. In another embodiment of the present invention, the algorithm used to determine identity between two or more polypeptides is FASTDB, which is based upon the algorithm of Brutlag (1990) Comp. App. Biosci. 6, 237-245). In a FASTDB sequence alignment, the query and reference sequences are amino sequences. The result of sequence alignment is in percent identity. In one embodiment, parameters that may be used in a FASTDB alignment of amino acid sequences to calculate percent identity include, but are not limited to: Matrix=PAM, k-tuple-2, Mismatch Penalty=1, Joining Penalty=20, Randomization Group Length=0, Cutoff Score=1, Gap Penalty-5, Gap Size Penalty 0.05, Window Size=500 or the length of the subject amino sequence, whichever is shorter.

If the reference sequence is shorter or longer than the query sequence because of N-terminus or C-terminus additions or deletions, but not because of internal additions or deletions, a manual correction can be made, because the FASTDB program does not account for N-terminus and C-terminus truncations or additions of the reference sequence when calculating percent identity. For query sequences truncated at the N- or C-termini, relative to the reference sequence, the percent identity is corrected by calculating the number of residues of the query sequence that are N- and C-terminus to the reference sequence that are not matched/aligned, as a percent of the total bases of the query sequence. The results of the FASTDB sequence alignment determine matching/alignment. The alignment percentage is then subtracted from the percent identity, calculated by the above FASTDB program using the specified parameters, to arrive at a final percent identity score. This corrected score can be used for the purposes of determining how alignments "correspond" to each other, as well as percentage identity. Residues of the reference sequence that extend past the N- or C-termini of the query sequence may be considered for the purposes of manually adjusting the percent identity score. That is, residues that are not matched/aligned with the N- or C-termini of the comparison sequence may be counted when manually adjusting the percent identity score or alignment numbering.

For example, a 90 amino acid residue query sequence is aligned with a 100 residue reference sequence to determine percent identity. The deletion occurs at the N-terminus of the query sequence and therefore, the FASTDB alignment does not show a match/alignment of the first 10 residues at the N-terminus. The 10 unpaired residues represent 10% of the reference sequence (number of residues at the N- and C-termini not matched/total number of residues in the reference sequence) so 10% is subtracted from the percent identity score calculated by the FASTDB program. If the remaining 90 residues were perfectly matched (100% alignment) the final percent identity would be 90% (100% alignment-10% unmatched overhang). In another example, a 90 residue query sequence is compared with a 100 reference sequence, except that the deletions are internal deletions. In this case the percent identity calculated by FASTDB is not manually corrected, since there are no residues at the N- or C-termini of the subject sequence that are not matched/aligned with the query. In still another example, a 110 amino acid query sequence is aligned with a 100 residue reference sequence to determine percent identity. The addition in the query occurs at the N-terminus of the query sequence and therefore, the FASTDB alignment may not show a match/alignment of the first 10 residues at the N-terminus. If the remaining 100 amino acid residues of the query sequence have 95% identity to the entire length of the reference sequence, the N-terminal addition of the query would be ignored and the percent identity of the query to the reference sequence would be 95%.

In another aspect, the disclosure provides deletion variants wherein one or more amino acid residues in the metal-binding protein are removed. Deletions can be effected at one or both termini of the modified metal-binding protein, or with removal of one or more non-terminal amino acid residues of the modified metal-binding protein. Deletion variants, therefore, include all fragments of the modified metal-binding protein.

Within the confines of the disclosed percent identity, the invention also relates to substitution variants of disclosed polypeptides of the invention. Substitution variants include those polypeptides wherein one or more amino acid residues of truncated metal-binding protein are removed and replaced with alternative residues. In one aspect, the substitutions are conservative in nature; however, the invention embraces substitutions that are also non-conservative. Conservative substitutions for this purpose may be defined as set out in the tables below. Amino acids can be classified according to physical properties and contribution to secondary and tertiary protein structure. A conservative substitution is recognized in the art as a substitution of one amino acid for another amino acid that has similar properties. Exemplary conservative substitutions are set out in below.

TABLE 18

Conservative Substitutions

| Side Chain Characteristic | Amino Acid |
| --- | --- |
| Aliphatic | |
| Non-polar | Gly, Ala, Pro, Iso, Leu, Val |
| Polar-uncharged | Cys, Ser, Thr, Met, Asn, Gln |
| Polar-charged | Asp, Glu, Lys, Arg |
| Aromatic | His, Phe, Trp, Tyr |
| Other | Asn, Gln, Asp, Glu |

Alternatively, conservative amino acids can be grouped as described in Lehninger (1975) Biochemistry, Second Edition; Worth Publishers, pp. 71-77, as set forth below.

TABLE 19

Conservative Substitutions

| Side Chain Characteristic | Amino Acid |
| --- | --- |
| Non-polar (hydrophobic) | |
| Aliphatic: | Ala, Leu, Iso, Val, Pro |
| Aromatic: | Phe, Trp |
| Sulfur-containing: | Met |
| Borderline: | Gly |
| Uncharged-polar | |
| Hydroxyl: | Ser, Thr, Tyr |
| Amides: | Asn, Gln |
| Sulfhydryl: | Cys |
| Borderline: | Gly |
| Positively Charged (Basic): | Lys, Arg, His |
| Negatively Charged (Acidic): | Asp, Glu |

And still other alternative, exemplary conservative substitutions are set out below.

TABLE 20

Conservative Substitutions

| Original Residue | Exemplary Substitution |
| --- | --- |
| Ala (A) | Val, Leu, Ile |
| Arg (R) | Lys, Gln, Asn |
| Asn (N) | Gln, His, Lys, Arg |
| Asp (D) | Glu |
| Cys (C) | Ser |
| Gln (Q) | Asn |
| Glu (E) | Asp |
| His (H) | Asn, Gln, Lys, Arg |
| Ile (I) | Leu, Val, Met, Ala, Phe |
| Leu (L) | Ile, Val, Met, Ala, Phe |
| Lys (K) | Arg, Gln, Asn |
| Met (M) | Leu, Phe, Ile |
| Phe (F) | Leu, Val, Ile, Ala |
| Pro (P) | Gly |
| Ser (S) | Thr |
| Thr (T) | Ser |
| Trp (W) | Tyr |
| Tyr (Y) | Trp, Phe, Thr, Ser |
| Val (V) | Ile, Leu, Met, Phe, Ala |

Methanol dehydrogenases (MDHs), found in methylotrophic bacteria, are soluble, periplasmic enzymes that catalyze the oxidation of methanol to formaldehyde, a key metabolic step enabling methanol to serve as the sole carbon source for growth, thereby playing a critical role in the global carbon cycle. The most extensively characterized MDHs require a $Ca^{II}$ ion for activity, but recent work has demonstrated the presence of specifically $Ln^{III}$-dependent MDHs (Ln-MDHs, XoxF) in several organisms, with the enzymes from the model methylotroph, *Methylorubrum extorquens*, and *Methylacidiphilum fumariolicum* SolV being best characterized. In cases in which genes encoding both systems are present, such as *M. extorquens*, expression of the Ca-MDH is repressed in the presence of $Ln^{III}$s, with a strict requirement for early $Ln^{III}$s (La—Nd, and to a lesser extent, Sm). The specific incorporation of $Ln^{III}$ instead of $Ca^{II}$ into the Ln-MDH active site is of great interest from a chemical perspective, given the similar ionic radii of $Ca^{II}$ to the biologically relevant early $Ln^{III}$s, the nearly identical metal coordination environments in the two classes of MDHs, and the significantly greater environmental abundance of Ca versus Lns.

LanM (SEQ ID NO: 1), which was previously uncharacterized, has been identified as a protein that partially co-purified with XoxF when isolated from *M. extorquens* cells. Like XoxF, LanM is a periplasmic protein, and it is conserved in many methylotroph genomes. It exhibits a strong conformational response to all rare earth metals, e.g., $La^{III}$ to $Lu^{III}$ and $Y^{III}$, at picomolar concentrations, whereas it only responds to $Ca^{II}$ at near-millimolar concentrations. The protein also responds to the other rare earth metal, $Sc^{III}$($K_d$ not determined, but <μM). This result is surprising, as LanM contains metal coordination motifs (EF hands) traditionally associated with high-affinity (nanomolar to micromolar) $Ca^{III}$ binding. The analysis herein suggests that some of this $10^8$-fold selectivity for $Ln^{III}$ over $Ca^{II}$ is attributable to Pro residues found in each of LanM's EF hands. Other aspects of the protein, such as the presence of carboxylate residues at the 9th position of each EF hand, and the fusion of adjacent EF hands, also contribute to lanthanide or actinide trivalent cation recognition by the EF hand motif and thus by homologous proteins. For example, replacing the Pro residues with Ala increases conformational response for $Ca^{II}$ by at least 100-fold.

An uncharacterized protein, LanM, co-purifies with XoxF. XoxF was purified from *M. extorquens* AM1 cells grown in the presence of 1 μM $LaCl_3$ and methanol as sole carbon source. The protein was purified by ammonium sulfate precipitation, cation exchange chromatography, and size exclusion chromatography (SEC) to high purity (FIG. 1A), and a specific activity of 22 μmol/min/mg at 23° C. (Table 7). After the cation exchange step, we were struck by the prominence of several co-eluting low-molecular weight bands that had not been noted previously. These bands were analyzed by in-gel trypsin digestion, liquid chromatography, and mass spectrometry; one of them, at 12 kDa (FIG. 1A), corresponded to a hypothetical protein, MexAM1_META1p1786 (LanM), based on 9 unique peptides representing 75% of the protein sequence (Table 1).

ExaF, the only Ln-containing proteins previously characterized in *M. extorquens*, also reside.

FIG. 1 shows purification and sequence analysis of lanmodulin (LanM), showing that it is a novel EF hand-containing protein. A) SDS-PAGE analysis of XoxF purification and copurifying band. Lane 1: Molecular weight marker. Lane 2: *M. extorquens* crude extract. Lane 3: XoxF after cation exchange chromatography (highlighted band was excised and analyzed by mass spectrometry, revealing LanM). Lane 4: Purified XoxF. Lane 5: Heterologously expressed and purified LanM. B) Sequences of the EF hands of LanM (SEQ ID NO: 1) and of human CaM (as a representative canonical EF hand-containing protein). In CaM, residues providing sidechain CaII ligation are shown in red, and residues involved in a hydrogen bonding network to a metal-coordinated water molecule are shown in green; in LanM, aligning residues are shown in blue, and the unique Pro residues are bolded in purple. C) Comparison of the amino acid sequences of *M. extorquens* AM1 LanM and *H. sapiens* calmodulin. In both sequences, the EF hand metal coordination motifs are shown in red. In LanM, the signal peptide is in blue. Note that LanM's predicted EF hand loops possess shorter sequences between each EF hand (12 residues between EF1/2 and EF3/4, and 13 residues between EF2/3) compared with calmodulin (24 residues between EF1/2 and 25 residues between EF2/3 and EF3/4). In calmodulin (and canonical EF hands in general), each EF hand comprises a helix-loop-helix motif with a 9-residue entering helix, 9-residue loop, and 11-residue exiting helix. With only 12-13 residues between each EF hand coordination motif, the typical EF hand helix-loop-helix structure may only be possible with fusion of the entering and exiting helices, suggesting a novel fold for LanM as shown by the NMR solution structure of Y(III)-bound LanM.

TABLE 1

| Peptide (position) | -10 IgP | Mass | Error, ppm | Observed m/z | SEQ ID NO: |
|---|---|---|---|---|---|
| K.EYLAAVEAQFK.A (95-105) | 101.66 | 1267.6448 | 0.3 | 634.8298 | 11 |
| K.VDIAAFDPDKDGTIDLK.E (29-45) | 93.45 | 1831.9203 | -1.8 | 916.9658 | 12 |
| R. ELASPAGSALVNLIR (119-133) | 89.99 | 1509.8514 | 0.4 | 755.9333 | 13 |
| K.EALAAGSAAFDK.L (46-57) | 87.81 | 1149.5665 | 0.7 | 575.791 | 14 |
| K.AANPDNDGTIDAR.E (106-118) | 68.82 | 1328.5956 | 0.1 | 665.3051 | 15 |
| K.KLDPDNDGTLDKK.E (82-94) | 61.78 | 1457.7361 | -0.7 | 486.919 | 16 |
| K.EALAAGSAAFDKLDPDKDGTLDAK.E (46-69) | 61.25 | 2418.1914 | -0.2 | 807.0709 | 17 |
| R.VSEADLK.K (75-81) | 50.41 | 760.3967 | 1.3 | 381.2061 | 18 |
| K.LDPDKDGTLDAK.E (58-69) | 41.56 | 1286.6354 | 1.1 | 429.8862 | 19 |

LanM co-purified with XoxF in two independent purifications. Densitometric analysis of the LanM and XoxF gel bands indicates ~1:1 LanM:XoxF (monomer) after normalization for protein molecular weight. On separation of LanM from XoxF in a final size exclusion chromatography (SEC) step (FIG. 2), MALDI-MS analysis on the intact protein gave a molecular mass of 11759.574 Da, consistent with cleavage of the predicted signal peptide to yield Ala22 as the N-terminal residue (expected mass: 11757.0 Da). This result indicates that LanM is localized to the *M. extorquens* periplasm, where both XoxF and the ethanol dehydrogenase Table 1 above provides peptide position and data. LanM peptides identified from in-gel digestion and nanoLC-$MS^2$ analysis of ~12-kDa protein band co-purifying with XoxF following SP Fast Flow chromatography. Nine unique peptides representing 75% of the full-length protein sequence (100/133 residues) were identified by the PEAKS DB search algorithm with confidence scores-10logP ≥30.1 (protein confidence score-101gP ≥20) which corresponds to 0.9% false discovery rate (FDR).

Figure 2:
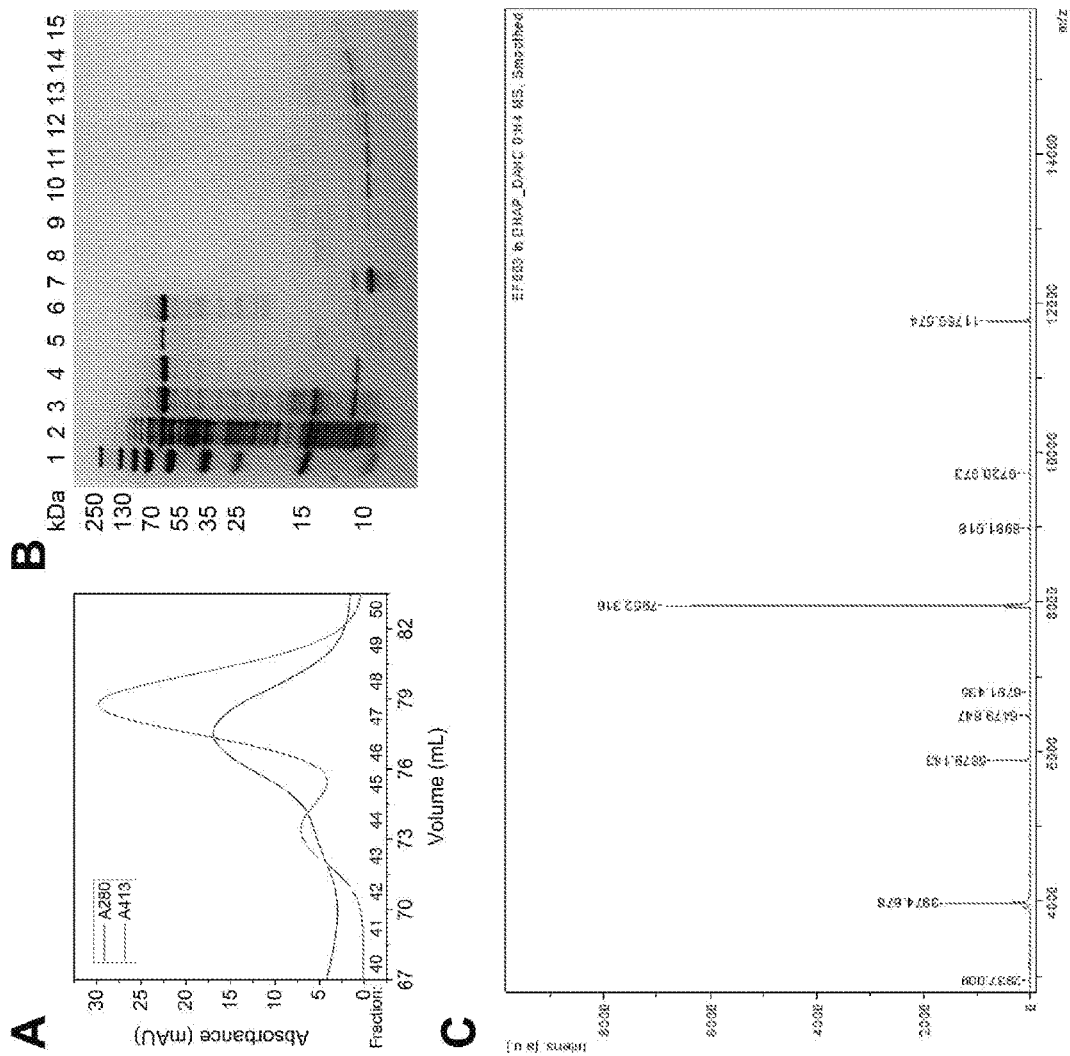
FIG. 2A shows partial elution profile (67-83.5 mL, fractions 40-50, 1.5 mL/fraction) for Superdex S75 chromatography of XoxF following SP FF chromatography.
FIG. 2B shows SDS-PAGE analysis of a purification of XoxF from *M. extorquens*, illustrating co-purification and separation of LanM.
FIG. 2C shows a linear MALDI-TOF mass spectrum of fraction 44 (lane 10 in B), with peak at 11759.574 Da corresponding to LanM.

FIG. 2 shows a partial elution profile (67-83.5 mL, fractions 40-50, 1.5 mL/fraction) for Superdex S75 chromatography of XoxF following SP FF chromatography. LanM elutes in this region. Fractions 44-46 contain the most intense bands corresponding to LanM; the retention time of 73-77.5 mL correlates with that of purified La$^{III}$-LanM-His on the same column, suggesting that LanM is isolated from M. extorquens in a La$^{III}$-bound form. B) SDS-PAGE analysis of purifications of XoxF from M. extorquens, showed co-purification and separation of LanM. Lane 1: Molecular weight marker. Lanes 2-4:XoxF (purification #1) soluble lysate, after SP FF column, and after S75 column. Lanes 5-6:XoxF (purification #2) after SP FF column and S75. Lane 7: LanM (His$_6$ tag cleaved using TEV protease), 4 μg. Lanes 8-15: from purification #2, S75 fractions 42-49 (5 L each). FIG. 2C shows a linear MALDI-TOF mass spectrum of fraction 44 (lane 10 in B), with peak at 11759.574 Da corresponding to LanM. Peaks at 7952.316 and 3974.678 appear to be m/z=+1 and +2 peaks for an unknown hemoprotein (but not XoxG or cytochrome CH) given the UV-visible features of these fractions.

The amino acid sequence of LanM was intriguing because of its four carboxylate-rich EF hand motifs (FIG. 1B). Although many classes of Ca$^{II}$-binding EF hand-containing proteins have been characterized in the literature, there are no characterized homologs of LanM in terms of overall sequence or function. Therefore, here we discuss salient features of LanM in the context of EF-hand proteins in general. The ubiquitous eukaryotic Ca$^{II}$-binding protein, calmodulin (CaM), is referred to here as a representative example of this diverse protein family, due to certain shared properties of these two proteins, as well as the extensive characterization of Ca$^{II}$ and Ln$^{III}$ binding and metal ion-linked conformational changes in CaM. However, it is noted that there are also clear differences between CaM and LanM in structure and function.

EF hands are structural motifs consisting of a metal-binding loop flanked by two α helices, and they are frequently found in pairs, conferring cooperativity of metal ion binding. For example, CaM comprises two pairs of EF hands, which cooperatively bind 4 Ca$^{II}$ ions, inducing a conformational change to promote binding to target proteins. In most EF hands, the Ca$^{II}$ ions are 7-coordinate: the 1$^{st}$, 3$^{rd}$, 5$^{th}$, and 12$^{th}$ positions of the motif provide side chain oxygen ligands, the 7th position provides a main-chain carbonyl oxygen, and the 9$^{th}$ position either directly coordinates the Ca$^{II}$ or, more typically, hydrogen bonds to a coordinated solvent molecule (FIG. 1B). EF hands also bind Ln$^{III}$s, often slightly more tightly than Ca$^{II}$ (e.g., ~1 nM for Tb$^{III}$-CaM vs. ~1 μM for Ca$^{II}$-CaM), although Ln$^{II}$ binding is not physiologically relevant for these proteins.

LanM's EF hands possess several unique features relative to canonical EF hands. First, LanM retains all of the metal-binding Asp and Asn residues present in typical EF hands but also features an Asp residue in the 9$^{th}$ position in each of its EF hands, whereas Asp is encountered at this position in roughly one-third of EF hand sequences. An Asp residue at position 9 has been shown in a model EF hand to contribute ~2 orders of magnitude selectivity for Ln$^{III}$ over Ca$^{II}$. Second, Asn is rarely if ever observed at the first position in functional EF hands, as it is in EF-hand 4 (EF4) in LanM. Third, all of LanM's EF hands also possess a Pro residue at the 2$^{nd}$ position, a highly uncommon feature of EF hands in general, and encountered in only <0.5% of EF hands of predicted CaMs and CaM-like proteins. Finally, LanM features unusually short sequences between each EF hand loop (12-13 residues) instead of the 24-25 residues present in canonical EF hands (FIG. 1C). Each of these unusual EF hand features is reflected in LanM's metal-binding properties, characterized below, and suggest principles for highly selective rare earth element recognition.

Purification and characterization of LanM. LanM was expressed in E. coli for biochemical characterization. We initially expressed the full-length LanM protein (residues 1-133), including the native signal peptide, heterologously in E. coli with a C-terminal tobacco etch virus (TEV) protease cleavage sequence followed by a His$_6$ tag. Whereas periplasmic extraction and affinity purification of this protein was successful (FIG. 3), confirming LanM's periplasmic localization, yield was low (<1 mg/L culture). As LanM contains no Cys residues in its sequence and therefore would be unlikely to require localization to the periplasm for proper folding, we sought to achieve higher protein yield via cytosolic expression. We removed the codons for the signal peptide and expressed residues 22-133, the native form in M. extorquens, following a protease-cleavable His$_6$ tag (wt-LanM). This construct enabled purification of significantly higher quantities of LanM (15 mg/L culture). The N-terminal His$_6$ purification tag that was removed prior to biochemical assays, yielding the wt protein. LanM was also purified as a cytosolic construct with an N-terminal or C-terminal His$_6$ tag without the cleavable linker (His-LanM and LanM-His, respectively). The biophysical properties of wt-LanM, His-LanM, and LanM-His were similar (FIG. 4), and LanM-His was used for most experiments.

Figures 3A, 3B:
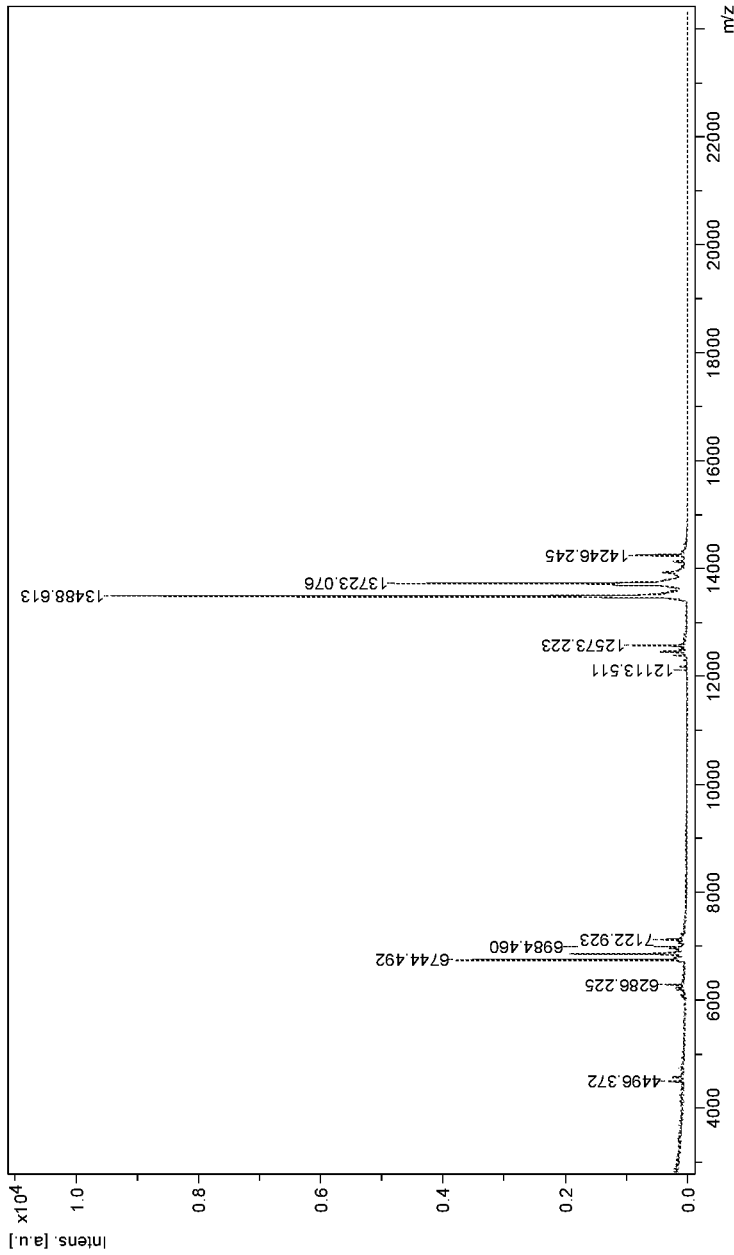
FIG. 3A shows a linear MALDI-TOF mass spectrum of purified LanM-TEV-His after Superose 75 chromatography.
FIG. 3B shows predicted amino acid sequence of full-length LanM with C-terminal TEV-cleavable $His_6$ tag (GENLYFQHHHHHH) (SEQ ID NO: 8), and observed cleavage sites when expressed in *E. coli*.

FIG. 3 shows characterization of LanM-TEV-His by MALDI-MS. A) A linear MALDI-TOF mass spectrum of fractions 9 and 10 (pooled) from Superose S75 chromatography. The expected masses of protein cleaved before L14, Y20, and A22 are 14245.70, 13723.07, and 13488.81 Da, respectively, as calculated by the ExPASy ProtParam tool (https://web.expasy.org/protparam/). The latter mass is that predicted by SignalP4.0. B) Predicted amino acid sequence of full-length LanM with C-terminal TEV-cleavable His$_6$ tag (GENLYFQHHHHHH) (SEQ ID NO: 8), used for this analysis. The observed signal peptide cleavage sites, based on MS analysis, are indicated by dashes.

Figure 4A:
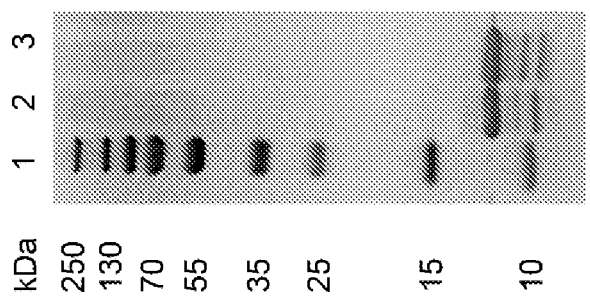
FIG. 4A shows SDS-PAGE analysis of purified His-LanM and LanM-His.
Figure 4B:
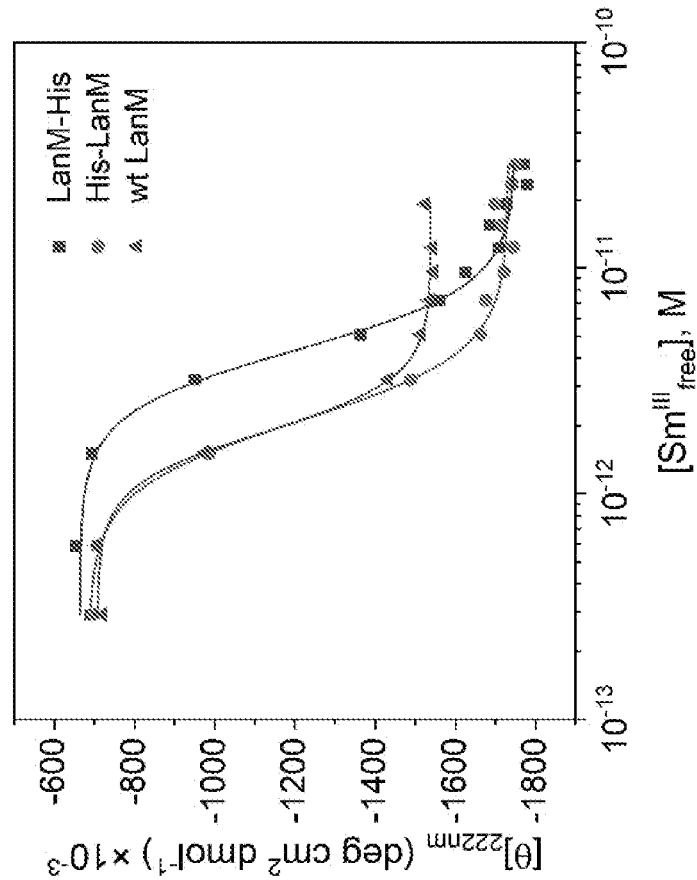
FIG. 4B shows determination of $K_{ds}$ of complexes of wt LanM, LanM-His, and His-LanM (15 μM each protein), with $Sm^{III}$, monitored by CD spectroscopy.

FIG. 4 shows comparison of His-LanM, LanM-His, and wt LanM. FIG. 4A: Gel of purified His-LanM and LanM-His. Lane 1: molecular weight marker; lane 2: His-LanM (2 μg); lane 3: LanM-His (2 μg). The minor lower molecular weight bands on the gel may be different conformations of LanM resulting from adventitious metal binding, as LanM elutes as a single peak by Superdex 75 chromatography, and only minor impurities are observed by mass spectrometry. FIG. 4B: Determination of K$_{dS}$ of complexes of wt LanM, LanM-His, and His-LanM (15 μM each protein), with Sm$^{III}$, monitored by CD spectroscopy. Sm$^{III}$ concentrations were buffered using EDDS as described in the Methods. The data were fitted to the Hill equation with a single set of sites, yielding K$_{dS}$ of 1.9 pM (wt LanM), 4.3 pM (LanM-His), and 2.1 pM (His-LanM), all with Hill slopes ~3.

Figure 7A:
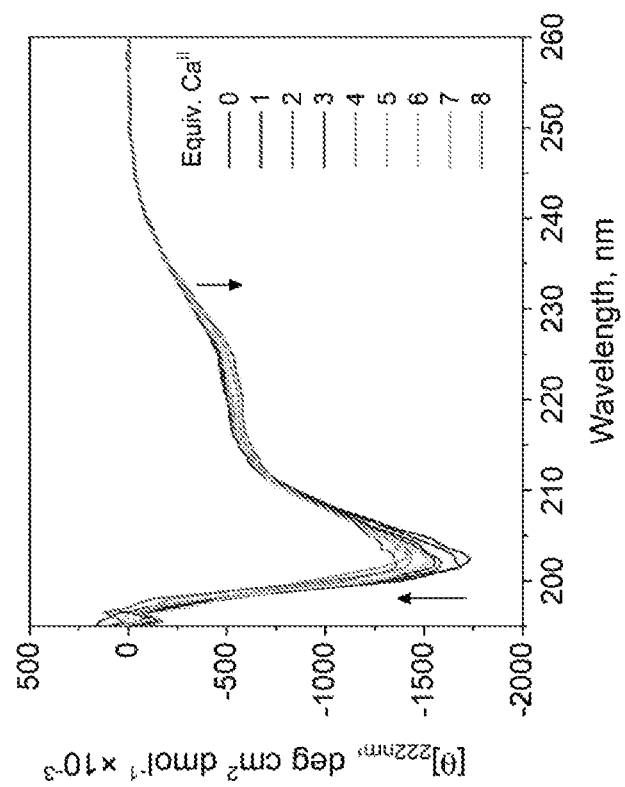
FIGS. 7A and 7B shows complete far-UV CD spectra for titration of (A) wt LanM (20 μM) with $Ca^{II}$ (0-160 μM and 0-5 mM) and (B)$_{20}$ μM LanM-His with 0-5 mM $Ca^{II}$.

During purification, we noted that apo-LanM migrates on an SEC column with an anomalous apparent molecular weight (46 kDa), which shifts to the expected ~15 kDa upon incubation with La$^{III}$ (Table 2). Whereas this result may suggest oligomerization of the apoprotein, further characterization instead suggests that the apoprotein exhibits little defined structure: the far-UV circular dichroism (CD) spectrum of apo-LanM, with a prominent band at 203 nm, is consistent with an irregular structure with little helical character (FIG. 5A). The low helical content of apo-LanM is surprising and rare for an EF hand-containing protein, as the two α helices of each EF hand are typically present in both apo and metallated states. Remarkably, all Ln$^{II}$ ions (La—Lu, excepting Pm; and Y), resulted in a ~200% increase in the molar ellipticity at 222 nm, [θ] 222 nm, up to ~4 Ln$^{III}$/LanM (FIG. 5B), characteristic of increased a helicity and concomitant with reduction in spectral features associated with a random coil. The stoichiometry of 4 LnII/LanM is anticipated based on the presence of 4 EF hands. Based on a mean residue ellipticity of −30000 deg cm$^2$ dmol$^-$ 1 for a fully a-helical protein, LanM's mean residue ellipticity with metal bound of −16000 suggests ~50% helical character in that state. This degree of helicity of the holoprotein, but not the apoprotein, is consistent with that calculated by disorder and secondary structure prediction algorithms (e.g. Pondr and Jpred), suggesting that helical structure is being suppressed in the apo state. Addition of up to 8 equiv. (160 μM) Ca$^{II}$ led to only minimal increase in helical character (FIG. 7A). Therefore, LanM displays a conformational change from a largely disordered state to an ordered one, in a highly Ln$^{III}$-selective manner.

Table 2 below provides evidence that wt LanM and LanM (4P→4A) undergo a large conformational change upon metal binding as well as for differences in wt vs. mutant structure in the apo state. LanM or LanM (4P→4A) (100 μL ~1.7 mM protein, apo or pre-incubated with 4 equiv. LaCl$_3$) was loaded onto a HiLoad 16/600 Superdex S75 column (120 mL volume) using a 100 μL loop. The column was pre-equilibrated and run in 20 mM MOPS, 20 mM KCl, 5 mM acetate, pH 7.0 (with 1 mM EDTA added for apoprotein experiments), at a flow rate of 0.75 mL/min. Protein was detected by A280 nm. The elution times for the LanM or LanM (4P→4A) peaks are reported below. The column was calibrated using the GE Gel Filtration Calibration Kit LMW, from which apparent molecular weights were calculated.

TABLE 2

| Protein | Elution volume (mL) | Apparent molecular weight (kDa) |
|---|---|---|
| LanM, apo | 59.8 ± 0.4 | 46.1 |
| LanM, 4 equiv. La$^{III}$ | 76.3 ± 0.2 | 15.1 |
| LanM(4P→4A), apo | 62.1 ± 0.7 | 39.4 |
| LanM(4P→4A), 4 equiv. La$^{III}$ | 76.0 ± 0.3 | 15.4 |

Figure 5:
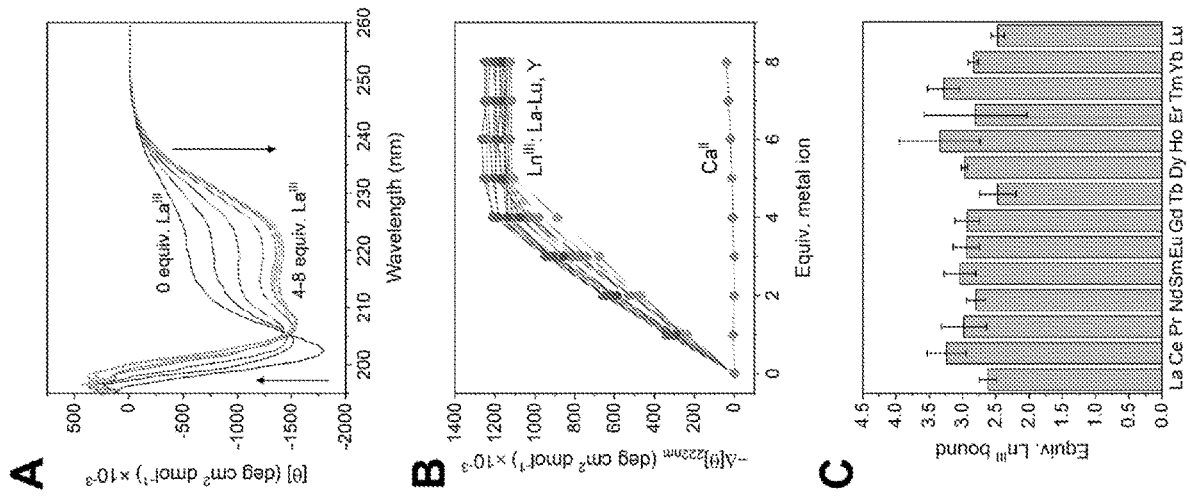
FIG. 5A shows CD spectra of LanM (20 μM) in the presence of 0-8 equiv. $La^{III}$.
FIG. 5B shows magnitude of molar ellipticity change for CD titrations of LanM (20 μM) with 0-8 equiv. $Ln^{III}$ ions ($La^{III}$—$Lu^{III}$ and $Y^{III}$) and with $Ca^{II}$.
FIG. 5C shows stoichiometry of $Ln^{III}$ binding to LanM as monitored by competitive titrations of LanM (5 μM) in the presence of xylenol orange (7 μM).

FIG. 5 shows LanM undergoes a conformational change selectively in the presence of Ln$^{III}$ FIG. 5A: CD spectra of LanM (20 μM) in the presence of 0-8 equiv. La$^{III}$. FIG. 5B: Magnitude of molar ellipticity change for CD titrations of LanM (20 μM) with 0-8 equiv. Ln$^{II}$ ions (La$^{III}$—Lu$^{III}$, excepting Pm$^{III}$, as well as Y$^{III}$) and with Ca$^{II}$. FIG. 5C shows the stoichiometry of LnIII binding to LanM as monitored by competitive titrations of LanM (5 μM) in the presence of xylenol orange (7 μM).

Figure 7B:
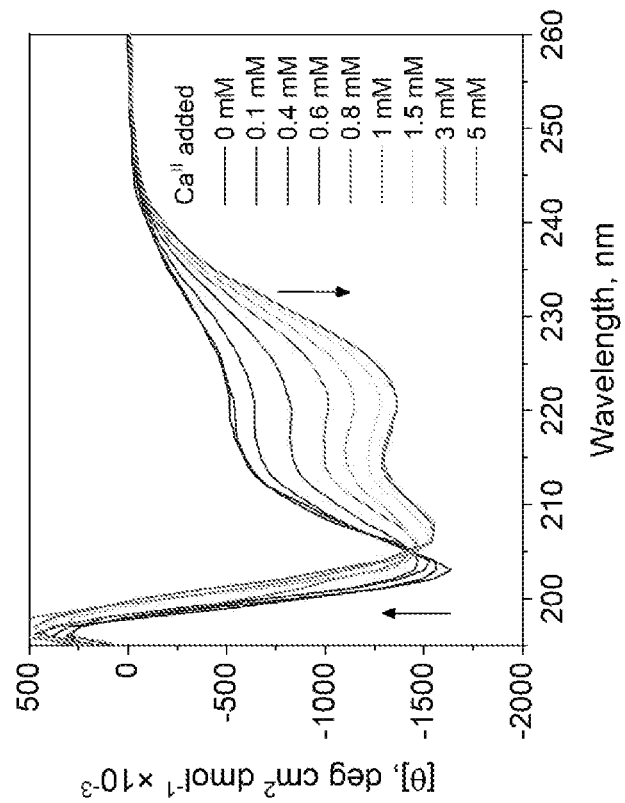

FIG. 7 shows complete far-UV CD spectra for titration of (A)$_{20}$ μM wt-LanM with 0-160 μM Ca$^{II}$ and (B)$_{20}$ μM LanM-His with 0-5 mM Ca$^{II}$. The spectra have been corrected for the volume change upon addition of Ca$^{II}$ to the cuvette. Note in both titrations that the helical feature at 222 nm does not start to develop until >100 μM (5 equiv.) Ca$^{II}$ have been added. The data in (B) are representative of the titration curve shown in FIG. 10B.

The extinction coefficient of purified LanM was determined to be 1400 M$^{-1}$ cm$^{-1}$ at 275 nm. In early experiments, we noted that this extinction coefficient exhibited a dependence on the presence of Lns. Titration of LanM with La$^{III}$ led to a shift in its UV-visible absorption spectrum, with sharp peaks growing in at 280 and 287 nm (FIG. 6A, 6B). Four equiv. La$^{III}$ were required to yield the maximal absorbance change. On the basis of assignment of similar absorption bands in other proteins to a hydrogen bond involving the hydroxyl group of Tyr residues, we suggest that these bands reflect a similar transition of LanM's sole Tyr residue, Y96, directly following EF3. The sensitivity of the UV-vis absorption spectrum of Y96 to Lns, as well as the proximity of Y96 to EF3 in primary sequence, suggested that we might be able to monitor metal binding and/or conformational changes in LanM by Tyr fluorescence measurements. Indeed, the fluorescence emission of Y96 ($\Delta_{ex}$=278 nm) was quenched by ~70% by addition of ~4 equiv. Ln$^{III}$ (e.g., La$^{III}$ and Gd$^{III}$ in FIG. 6C). Using buffered metal solutions, the $K_{d,app}$ for La$^{III}$ was determined. Unlike the CD titration data (see below), the fluorescence titration data could be fitted well to a single phase, with $K_{d,app}$=14±3 pM and n=3.2±0.2. This $K_{d,app}$ value is remarkably similar to that of the minor, and slight lower-affinity, binding event visible in CD titrations, suggesting that Tyr fluorescence may be reporting specifically on the second of two metal-induced conformational changes in LanM.

Figure 6:
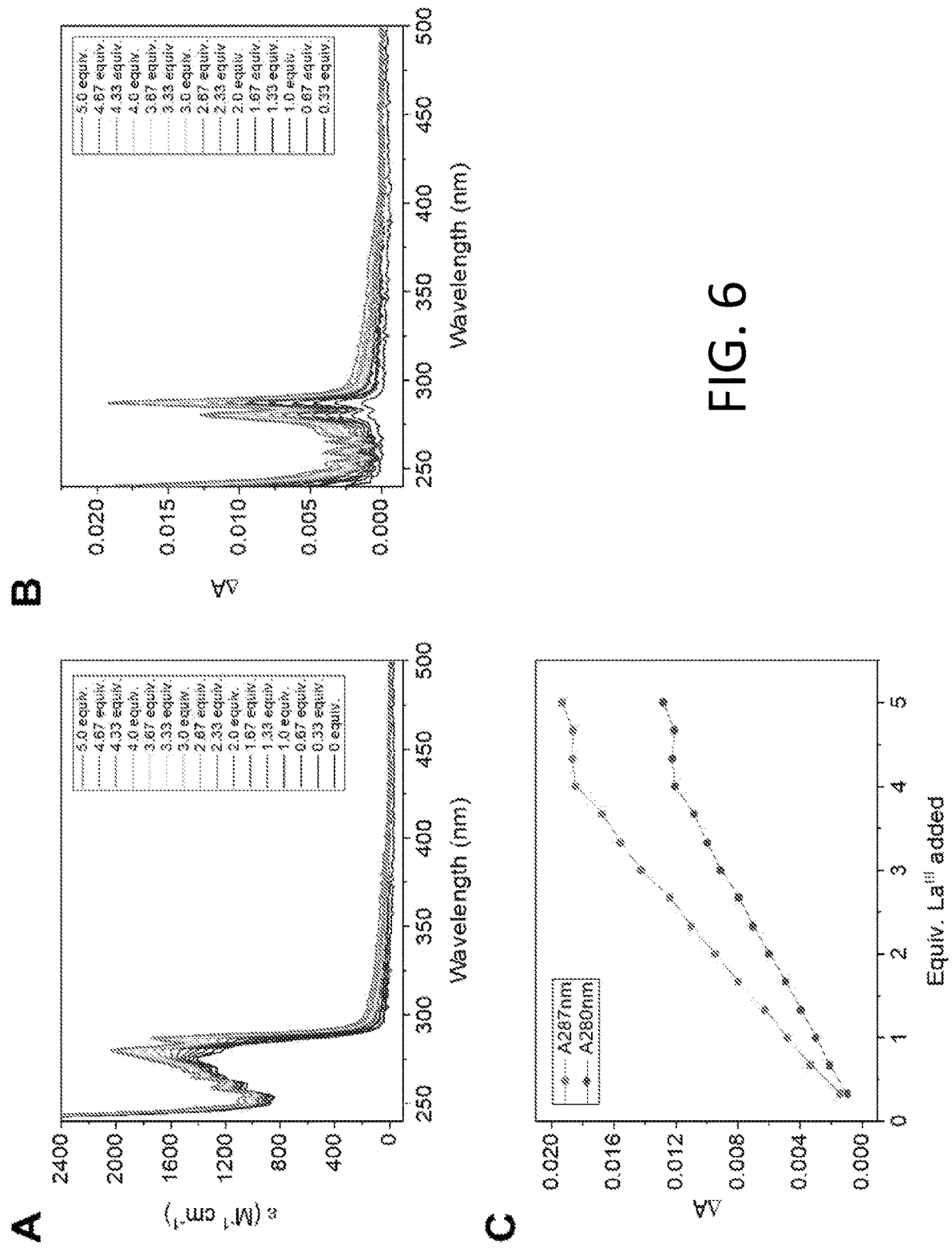
FIG. 6A shows UV-visible spectra (normalized to extinction coefficient) of LanM in the presence of various concentrations of $La^{III}$.
FIG. 6B shows difference spectra from the titration, demonstrating two sharp absorption features at 280 and 287 nm.
FIG. 6C shows that plots of A280 nm and A287 nm for the titration demonstrate an endpoint at 4 equiv. $La^{III}$/LanM.

FIG. 6 shows that the UV-vis absorption spectrum of LanM is altered in titrations with LaII. ApoLanM-His (15 μM) in chelexed 20 mM MOPS, 100 mM KCl, 10 mM acetate, pH 7.0, was titrated with a solution of 5 mM LaCl$_3$ in the same buffer. FIG. 6A: Spectra, normalized to extinction coefficient. The calculated extinction coefficient for holo-LanM is $\varepsilon_{280\ nm}$=2000 M$^{-1}$ cm$^{-1}$. FIG. 6B: Difference spectra from the titration, demonstrating two sharp absorption features at 280 and 287 nm. These difference spectra are nearly identical to difference spectra of native insulin vs. a tryptic digest releasing a peptide containing Tyr26, ribonuclease at pH 6.94 vs. at pH 1.91, and unfolding of E. coli L-asparaginase. In the former two cases, experiments suggested differences in hydrogen bonding to the Tyr hydroxyl group were responsible for the observation of the bands. FIG. 6C: Plots of A$_{280nm}$ and A$_{287nm}$ for the titration demonstrate an endpoint at 4 equiv. La$^{III}$/LanM.

Figure 8:
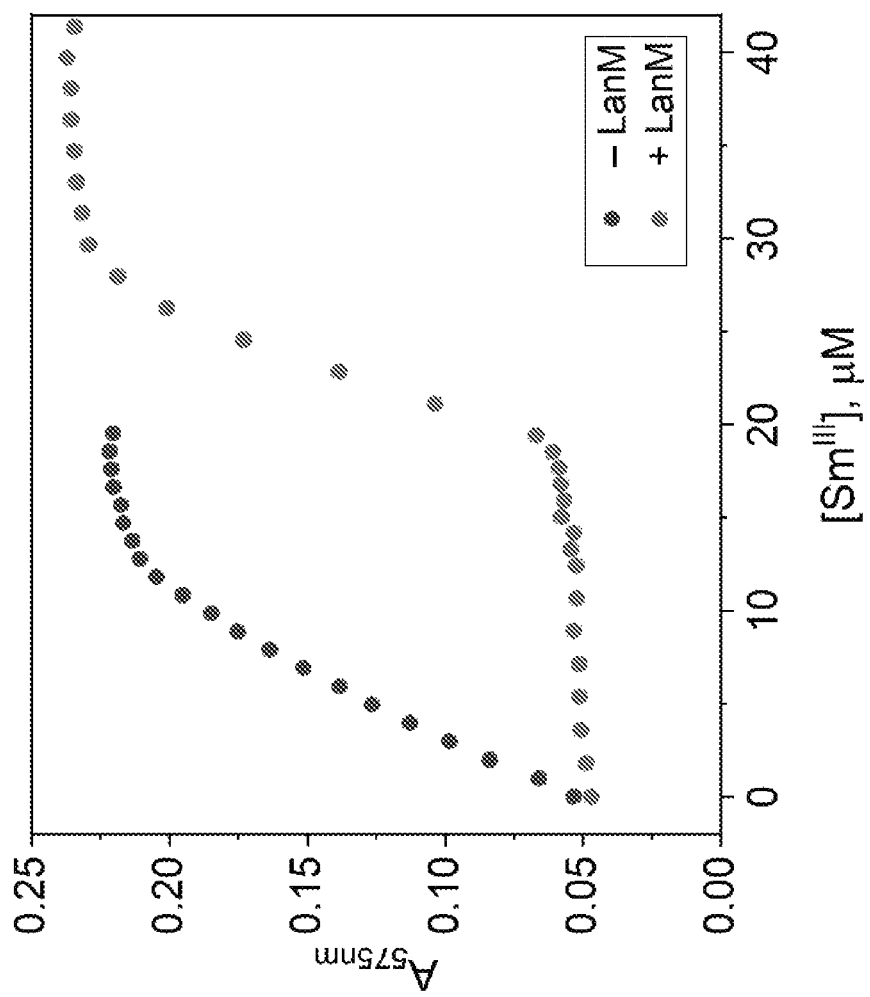
FIG. 8 shows representative titration of xylenol orange with $Ln^{III}$ (in this case, $Sm^{III}$) in the presence and absence of 6 μM LanM.

In order to probe approximate metal affinities of these four sites in LanM, competition assays were carried out using a colorimetric probe, xylenol orange (XO). When LanM was included in titrations of XO with Ln$^{II}$, the increase in absorbance at ~575 nm associated with Ln$^{III}$—XO complex formation was completely inhibited until 2.9±0.3 equiv. Ln$^{III}$ were added (FIG. 5C, FIG. 8; average for all Ln$^{III}$s). It is proposed that this stoichiometry can be reconciled with the 4 sites observed in our CD titrations and 4 EF hands in LanM by noting the Asn at the 1st position in EF4 (Asn108). Asp is the consensus 1st residue in functional EF hands, and substitution with Asn would be expected to destabilize EF hand structure and impair metal binding, suggesting that EF4 is the lowest affinity site for Ln$^{III}$ binding (on the order of XO's K$_d$ for Ln$^{III}$ ions, ~1-10 μM) and therefore not observed in the XO titrations. This proposal is also supported by the NMR solution structure of Y$^{III}$-bound LanM (FIG. 17A).

FIG. 8 shows representative titration of xylenol orange with Ln$^{II}$ (in this case, SmCl$_3$) in the presence and absence of LanM. The concentration of LanM in the experiment was 6.0 μM. The endpoint was taken to be when A575 nm had risen by 10% of the total increase observed (here, at 19.4 μM Sm$^{II}$, or 3.2 equiv. metal), suggesting saturation of tight binding sites on LanM. For example, NMR solution structure of Y$^{III}$-LanM indicates that metal coordination by EF4 is weak.

Figure 17:
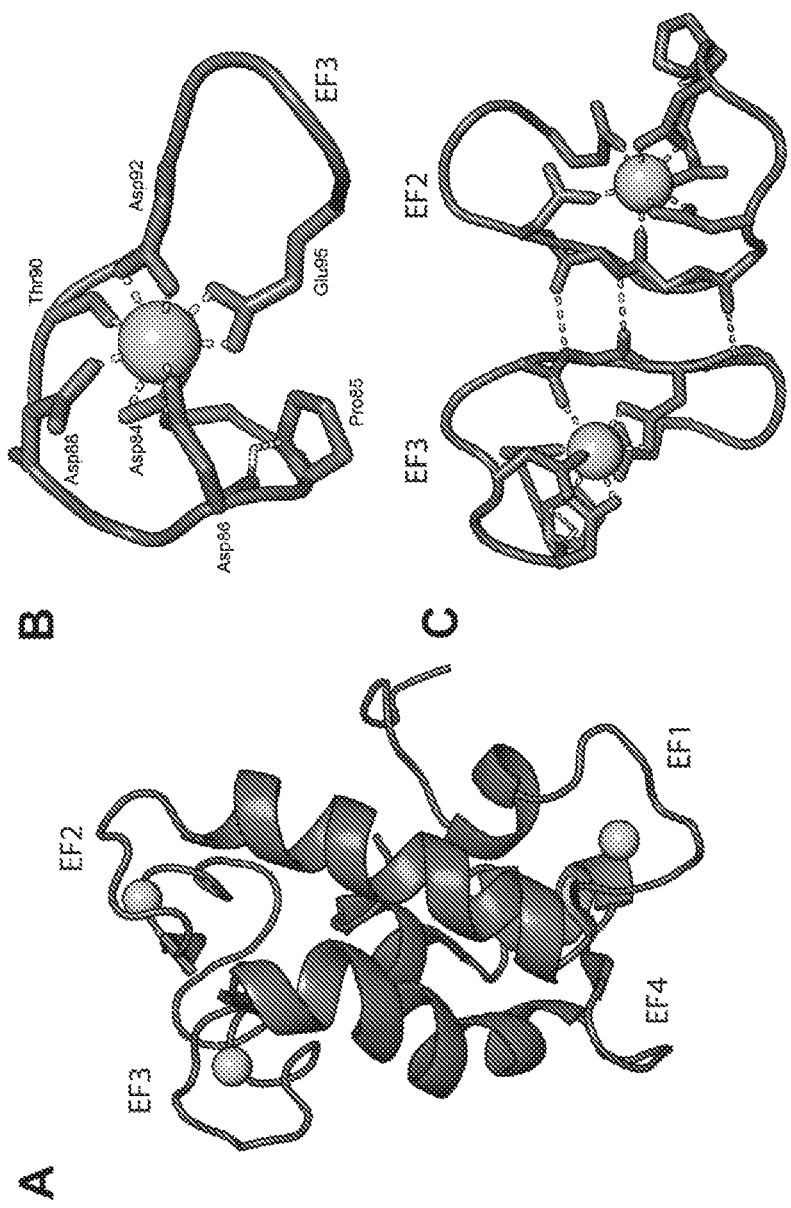
FIGS. 17A, 17B and 17C show structures of Y(III)-bound LanM.

FIG. 17 shows the NMR solution structure of Y$^{III}$-LanM (PDB code 6MI5). FIG. 17A shows the overall structure. Y$^{III}$ ions are in cyan and EF-loops are shown in gray. Intermediate exchange on the NMR timescale suggests that metal coordination by EF4 is weak. FIG. 17B: Detail of $Y^{III}$ coordination in LanM (EF3), with coordinating residues and the $N_{i+1}$—H ... $N_i$ hydrogen bond involving the Pro shown. FIG. 17C: The hydrogen bonding connectivity of the EF2/3 pair illustrates the importance of cooperativity in rare earth recognition.

LanM exhibits 100 million-fold selectivity for $Ln^{III}$ over $Ca^{II}$. In order to investigate $Ln^{III}$ binding to the 3 tight binding sites, we used metal chelators, ethylene glycol-bis (β-aminoethyl ether)-N,N,N',N'-tetraacetic acid (EGTA) and ethylenediamine N,N'-disuccinic acid (EDDS), to buffer $Ln^{III}$ concentrations in the low picomolar range and monitored the metal-dependent conformational change by CD spectroscopy (Table 3). EDDS was found to be a suitable chelator for all $Ln^{III}$'s except for $La^{II}$, for which EGTA was used. The full increase in [θ] 222 nm observed in stoichiometric titrations (FIG. 5B) was also seen in these buffered titrations, suggesting that the binding events monitored at picomolar free metal concentrations accounted for LanM's full conformational change. The [θ] 222 nm data were fitted to a minimal binding model, the Hill equation, to provide basic information on approximate apparent $K_d$ ($K_{d,app}$) values and cooperativity (Table 3). In all cases, titrations yielded $K_{d,app}$s in the low picomolar range, with Hill coefficients (n) of 3.2 ±1.3 (average for all Lns tested), indicating cooperativity in the metal-induced conformational change. We observed a slight asymmetry in the titration curves for all $Ln^{III}$s (FIG. 10A), suggestive of the presence of two sets of sites (also supported by titrations monitoring the intrinsic fluorescence of LanM's sole Tyr residue, Y96). However, only in the case of $La^{III}$ were the two sets of sites sufficiently resolved to give acceptable errors in fitting; therefore, we report fits to a binding model with one set of sites for all $Ln^{II}$ other than $La^{III}$. Interestingly, the $Ln^{III}$'s that induce LanM's conformational change at lowest concentration, $La^{III}$—$Sm^{III}$ (FIG. 9), are also the only Lns that induce expression from the xoxF1 promoter and activate *M. extorquens* XoxF in vivo, perhaps suggesting that LanM may be involved in discrimination between early and late Lns in cells.

Figure 9:
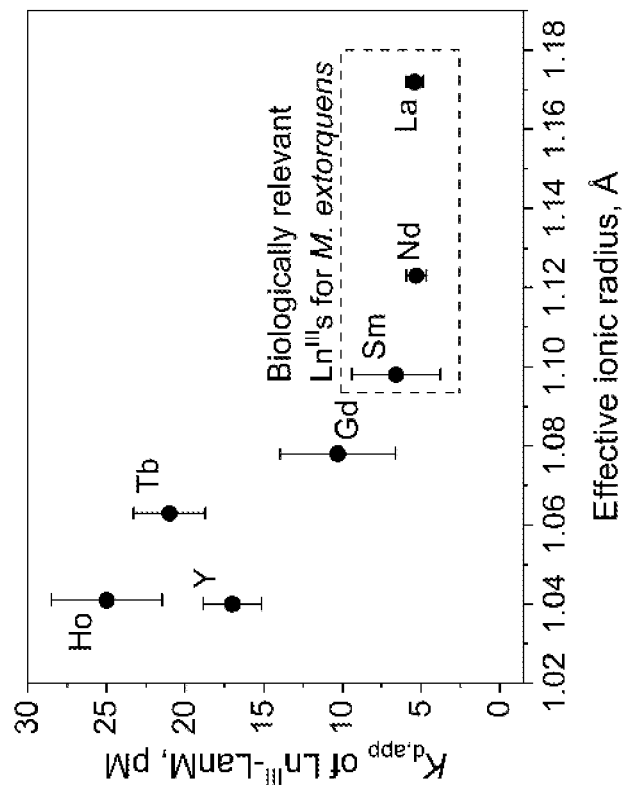
FIG. 9 shows $K_{d,app}$ values for various $Ln^{III}$-LanM complexes (Ln=La, Nd, Sm, Gd, Tb, Ho, Y) plotted against effective ionic radius.

FIG. 9 shows $K_{d,app}$ values for $Ln^{III}$-LanM complexes (Ln=La, Nd, Sm, Gd, Tb, Ho, Y) plotted versus effective ionic radius.

Figure 10:
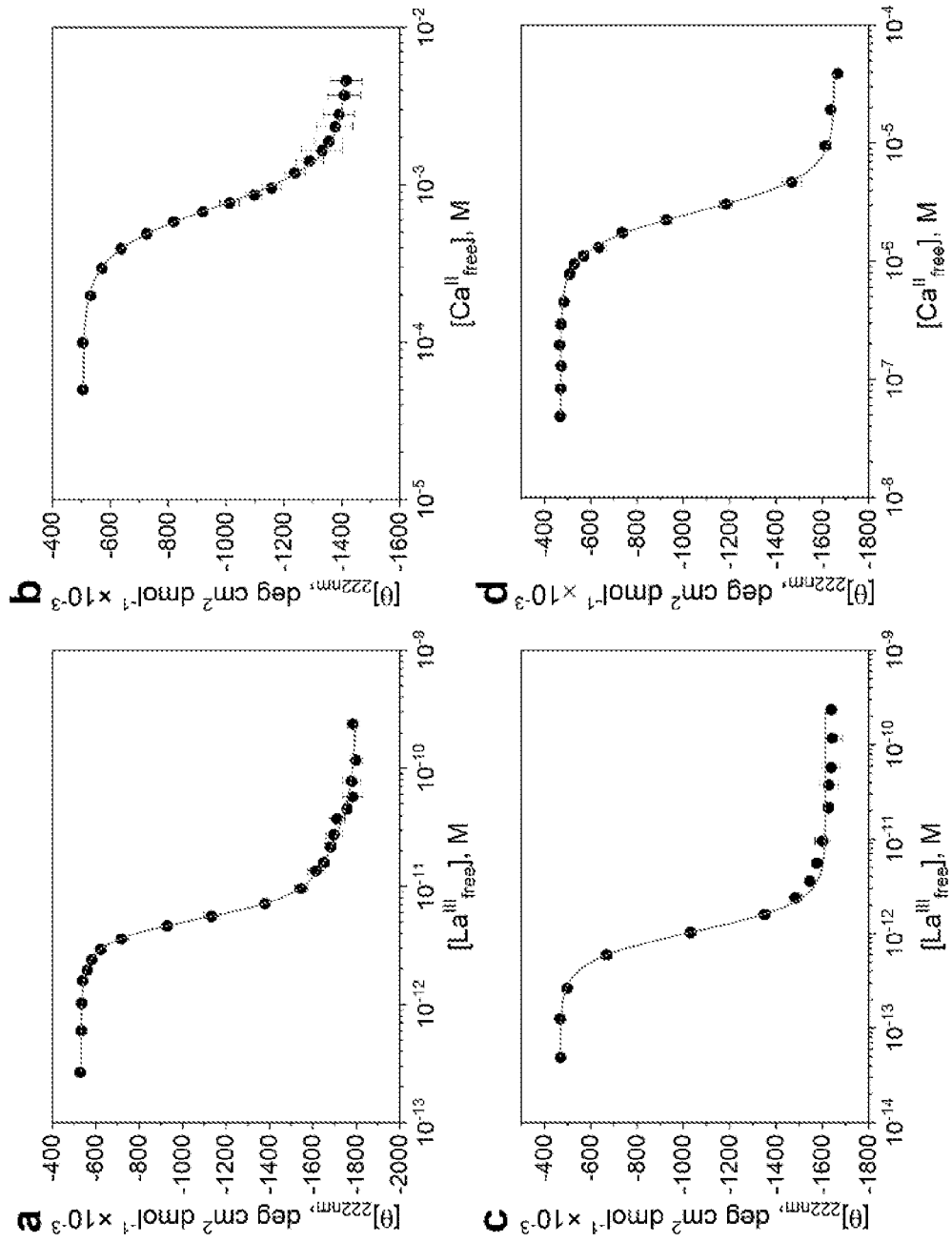
FIGS. 10A, 10B, 10C and 10D show CD titrations of LanM and LanM (4P-4A) with $La^{III}$ and $Ca^{II}$ for apparent $K_d$ determination. Points have been fitted (red lines) to a cooperative binding model (Hill equation) with one or two (in the case of $La^{III}$ binding to wt protein) set of sites, with parameters given in Table 3.

FIG. 10 shows that LanM exhibits $10^8$-fold selectivity for early $Ln^{III}$s over CaII, which is altered by substitution of LanM's EF-hand Pro residues. $[θ]_{222nm}$ was monitored at various chelator-buffered free metal ion concentrations using CD spectroscopy, and data were fitted to the Hill equation to determine $K_{d,app}$ (Table 3). FIG. 15A: $La^{III}$-LanM. FIG. 15B: $Ca^{II}$-LanM (unbuffered $Ca^{II}$). FIG. 15C: $La^{III}$-LanM (4P→4A). FIG. 15D: $Ca^{II}$-LanM (4P→4A).

By contrast with the LnIII's, LanM's response to $Ca^{II}$ was so weak that $Ca^{II}$ titrations were carried out with unbuffered $Ca^{II}$. $Ca^{II}$ induces a similar change in CD spectrum as the Ln's, although somewhat smaller in magnitude and with a $K_{d,app}$ of 710±30 μM and n=3.0±0.2 (FIG. 10B, Table 3). Therefore, LanM exhibits a remarkable ~$10^8$-fold selectivity in its conformational response to $Ln^{III}$ over $Ca^{II}$. This selectivity is substantially greater than in other characterized EF hand-containing proteins; for example, CaM only exhibits ~103-fold selectivity for $Tb^{III}$ over CaII, and the EF hand of the wt *E. coli* galactose binding protein (Gln at position 9) exhibits <10-fold selectivity over $Ln^{II}$ "'s and only 100- to 200-fold selectivity when an Asp or Glu is substituted at position 9.

Mutation of LanM's conserved Pro residues restores $Ca^{II}$ response at lower concentrations. Because our CD-derived $K_{d,app}$ values reflect a conformational change and not necessarily an intrinsic $K_d$ for metal binding, we assessed $Ca^{II}$ binding by isothermal titration calorimetry (ITC) (Table 4). Both binding and conformational changes potentially contribute to ITC isotherms, but the experiment was carried out at 40 μM LanM, far below the $K_{d,app}$ for CaII, to minimize the contribution from the conformational change. The best fit to our data was obtained using a model with 2 sets of non-interacting sites, with an endothermic phase with $K_d$=2.5 μM and 2.8±0.4 sites, and an exothermic phase with $K_d$=40 μM and 7.2±0.9 sites. While further analysis is necessary to develop a complete model, our interpretation of these results is that $Ca^{II}$ initially binds to 3 EF hands (perhaps EF1-3) without inducing a conformational change, followed by multiple further binding events that trigger the conformational response. Therefore, initial CaII binding

TABLE 3

Apparent $K_d$s, Hill coefficients (n), and changes in molar ellipticity at 222 nm (Δ[θ]) from fitted CD titrations of LanM and LanM(4P→4A) with $Ln^{III}$s and $Ca^{II}$. Uncertainties were determined by combining standard deviations from at least 3 independent titrations [2 for $Nd^{III}$-LanM(4P-4A)] and errors calculated as described. To the right of $Er^{III}$ in the periodic table, uncertainties in determining the endpoints of $Ln^{III}$-EDDS CD titrations were too great to reliably determine $K_d$s. Data for $La^{III}$ were fitted to two phases but the second phase was not well resolved for other metal ions.

| Protein | Metal ion | $K_d$ (M) | n | Δ[θ] (deg cm$^2$ dmol$^{-1}$ × 10$^{-3}$) |
|---|---|---|---|---|
| LanM | $La^{III}$ | (5.3 ± 0.6) × 10$^{-12}$ | 4.3 ± 0.2 | −1000 ± 50 |
|  |  | (1.7 ± 0.4) × 10$^{-11}$ | 1.5 ± 0.2 | −280 ± 50 |
|  | $Nd^{III}$ | (5.3 ± 0.6) × 10$^{-12}$ | 2.8 ± 0.4 | −1150 ± 70 |
|  | $Sm^{III}$ | (6.6 ± 2.8) × 10$^{-12}$ | 3.0 ± 0.5 | −1090 ± 60 |
|  | $Gd^{III}$ | (1.0 ± 0.4) × 10$^{-11}$ | 2.8 ± 0.4 | −1150 ± 80 |
|  | $Tb^{III}$ | (2.1 ± 0.2) × 10$^{-11}$ | 3.9 ± 0.6 | −1100 ± 60 |
|  | $Ho^{III}$ | (2.5 ± 0.4) × 10$^{-11}$ | 2.4 ± 0.5 | −1150 ± 90 |
|  | $Y^{III}$ | (1.7 ± 0.2) × 10$^{-11}$ | 3.4 ± 0.5 | −1110 ± 60 |
|  | $Ca^{II}$ | (7.1 ± 0.3) × 10$^{-4}$ | 3.0 ± 0.2 | −900 ± 10 |
| LanM 4P→4A | $La^{III}$ | (1.0 ± 0.1) × 10$^{-12}$ | 2.6 ± 0.2 | −1150 ± 40 |
|  | $Nd^{III}$ | (4.4 ± 0.5) × 10$^{-13}$ | 2.6 ± 0.2 | −1120 ± 30 |
|  | $Ca^{II}$ | (2.6 ± 0.3) × 10$^{-6}$ | 2.9 ± 0.2 | −1190 ± 10 | appears to be decoupled from the structural transition in wildtype (wt) LanM. In order to test whether this decoupling, to our knowledge not observed in other EF hand-containing proteins, might be associated with the unusual conserved Pro residues at the $2^{nd}$ position of LanM's EF hands ("Pro2"), we mutated all four Pro2 residues to Ala, a common residue at this position in canonical EF hands. SEC of this "4P→4A" variant suggested that the Pro→Ala mutations significantly alter the protein conformation in the apo, but not holo, state (Table 3). LanM (4P→4A) retained wt LanM's full molar ellipticity change to $Ln^{III}$s and CaII, but it displayed altered metal binding properties. Whereas LanM (4P→4A) responded to $La^{III}$ and $Nd^{III}$ at 5- to 10-fold lower concentrations than wt LanM in CD titrations (FIG. 10C, Table 3), the mutant responded to $Ca^{II}$ at 300-fold lower concentrations, with $K_{d,app}$=2.6±0.3 µM (FIG. 10D, Table 3). Interestingly, this value is similar to the $K_d$ measured by ITC for the first phase of $Ca^{II}$ binding to wt LanM. Unfortunately, our attempts to obtain an intrinsic $K_d$ for $Ca^{II}$-LanM (4P→4A) by ITC have been unsuccessful due to complex binding isotherms and contributions from conformational changes, and specialized methods such as flow dialysis will have to be pursued. Nevertheless, substitution of the Pro residues in LanM's EF hands clearly makes the protein significantly more conformationally sensitive to $Ca^{II}$.

TABLE 4

Thermodynamic parameters for $Ca^{II}$ binding to wt LanM, assessed by ITC. Conditions: 40 µM wt LanM in cell, 4.0 mM $Ca^{II}$ in syringe, buffer B, 25° C. Data were fitted to a binding model with two sets of non-interacting sites. $K_d$ ranges calculated from these $K_{dS}$: 1.6-5.7 µM (site 1), 28-60 µM (site 2).

| | $K_a$ (M$^{-1}$) | n | ΔH (kJ mol$^{-1}$) | ΔG (kJ mol$^{-1}$) | ΔS (J K$^{-1}$ mol$^{-1}$) |
|---|---|---|---|---|---|
| Site 1 | (4.1 ± 2.3) × 10$^5$ | 2.8 ± 0.4 | 1.4 ± 0.5 | −31.7 ± 11.4 | 111 ± 5 |
| Site 2 | (2.6 ± 0.9) × 10$^4$ | 7.2 ± 0.9 | −11.9 ± 3.2 | −25.0 ± 10.4 | 47 ± 14 |

LanM, a highly selective Ln-binding protein. Our characterization of LanM reveals that nature has adapted the ubiquitous $Ca^{II}$-binding framework of EF hands to bind LnII with high affinity and selectivity over $Ca^{II}$. While metal ion properties such as ionic radius and charge likely contribute, our data suggest that LanM does not so much suppress $Ca^{II}$ binding (compared with affinities of dedicated, $Ca^{II}$-binding EF hand-containing proteins) as it does suppress the conformational response resulting from that binding. It is presently unknown whether the same is true of $Ln^{III}$ binding to LanM, but because only picomolar $Ln^{III}$'s are needed to trigger the conformational change, this issue may be of lesser importance to the cell than whether CaII responsiveness is minimized, given the abundance of the latter ion. The detailed mechanism by which LanM's conserved Pro residues, as well as other features of its unusual EF hands, accomplish this feat is further discussed elsewhere herein.

In addition to the importance of LanM's Pro2 residues to the high selectivity of the protein's conformational response to $Ln^{III}$s over CaII, two other potential contributing factors are ionic radius and charge. LanM exhibits a slight preference for the larger early $Ln^{III}$ over smaller later ones (FIG. 9), with apparent $K_{dS}$ ranging from 5 pM for $La^{III}$ (effective ionic radius of 1.172 Å for coordination number 6, Table 6) to 25 pM for $Ho^{III}$ (1.041 Å), the smallest $Ln^{III}$ investigated in detail. The effective ionic radius of $Ca^{II}$ is well within this range (1.14 Å), similar to that of $Pr^{III}$. Therefore, whereas ionic radius may account for preferential response for one Ln over another, it seems to contribute little to LanM's selectivity for $Ln^{III}$s over $Ca^{II}$.

Similarly, a conformational selectivity for $Ln^{III}$ over $Ca^{II}$ of 10$^8$ (and a selectivity in terms of affinity of at least 10$^6$) is much greater than that of CaM (~10$^3$) or certain engineered EF-hand peptides (~50), indicating that the higher charge of $Ln^{III}$'s versus $Ca^{II}$ is also not sufficient to explain LanM's Ln selectivity. Studies of Falke and co-workers have shown that the presence of an Asp or Glu residue at position 9 of the EF hand (as occurs in all of LanM's EF hands) of an E. coli protein containing a single EF-hand increases $Tb^{III}$ binding affinity by 10- to 100-fold versus other amino acids at this position. Similarly, perhaps the closest precedent to $Ln^{III}$ coordination in LanM is the lanthanide binding tag (LBT), a $Ca^{II}$-binding EF hand engineered to coordinate luminescent $Ln^{III}$'s more selectively, which also possess a Glu residue at the 9$^{th}$ position of the EF hand, coordinated to the $Ln^{III}$ ion. However, LanM's $K_{d,app}$ values for Ln "µs are ~103-106-fold tighter than the $K_{dS}$ of the LBT (or any other coordination motif for Lns using biological ligands, to our knowledge) depending on the $Ln^{III}$ ion. Together, these literature precedents suggest that LanM's Asp at position 9 may contribute to the protein's high affinity for $Ln^{III}$s. Characterization of the 4D9N-LaMP1 variant (see below), which exhibits lower apparent $K_d$ for $Ca^{II}$ than wt but a higher apparent $K_d$ for $La^{III}$, supports this argument. Finally, the unusual structure of LanM (FIG. 17), with the fusion of adjacent EF hands allowing for substantial hydrophobic packing upon metal binding to the EF hands, likely also contributes to the high affinity of the protein for rare earths. These principles derived from our results have been used, as discussed elsewhere herein, to design LanM variants with increased or decreased selectivity for different lanthanides or actinides, and they can also be applied to yield other variants for binding of actinide ions such as, for example, uranium by suitably mutating appropriate amino acids. In other words, homologues of LanM can potentially be tailored to provide selectivity between different lanthanides or actinides.

TABLE 5

Primers used for cloning and sequencing

| Name | Sequence | SEQ ID NO: |
|---|---|---|
| LanM-NdeI-for | 5'-ATAACATATGGCGCCAA CTACGACTACCAAAG-3' | 21 |
| LanM-EcoRI-rev | 5'-AATAGAATTCTTAACGA ATTAAGTTGACCAGGGC-3' | 22 |
| | 5'-ATAACATATGCATCATC ACCATCATCAC | 23 |
| His-LanM-NdeI-for | GCGCCAACTACGACTACCAA AG-3' | 24 |
| LanM-His-EcoRI-rev | 5'-ATAAGAATTCTTAGTGA TGATGGTGATGATGACG | 25 |
| | AATTAAGTTGACCAGGGCCG AC-3' | 26 |

TABLE 5-continued

Primers used for cloning and sequencing

| | Sequence | SEQ ID NO: |
|---|---|---|
| Sequencing primers | | |
| T7P | 5'-TAATACGACTCACTATA GGG-3' | 27 |
| T7T | 5'-GCTAGTTATTGCTCAGC GG-3' | 28 |

Conservation of LanM in methylotrophs and physiological role of LanM. To date, Ln-containing enzymes have only been characterized in several methylotrophs and in *Pseudomonas putida*. BLAST analysis of the *P. putida* KT2440 genome found no LanM homologs but a putative EF-hand with a Pro2 residue (DPDEDGFTICGD) was identified in a predicted hybrid sensor histidine kinase/response regulator (locus WP_010954492); these observations motivate exploration of whether EF hands with Pro2 residues constitute Ln-selective coordination motifs in biology more generally, which may aid identification of new organisms that can utilize Lns for growth. More importantly, however, BLAST analysis using the LanM sequence as a query indicates that LanM-like genes with at least one EF hand containing the Pro2 signature are widespread in *Methylobacterium* and *Bradyrhizobium* genomes. One of those genes, c02050 from *Methylobacterium aquaticum* strain 22A, which has 59% sequence identity with LanM and contains two Pro2 motifs among its four EF hands, was very recently shown to be induced 5-fold in response to La$^{III}$ (consistent with the growth conditions from which LanM was identified. The encoded protein was not characterized and no evidence that it would bind Lns with such selectivity over Ca and other metals was presented.

In the *M. extorquens* genome, IanM is adjacent to META1p1785, encoding a putative TonB-dependent transporter. TonB-dependent systems often function in metal acquisition (e.g., Fe$^{III}$-citrate and Fe$^{III}$-siderophore uptake), and include an outer membrane transporter and a periplasmic binding protein that receives the cargo from the transporter. Indeed, the LanM-derived sensor LaMP1 has been used to show that these bacteria secrete a Ln-binding molecule (lanthanophore) to facilitate selective uptake of early Lns (La—Nd, and Sm to a lesser extent. Further work is necessary to define the physiological function of LanM, although its highly Ln$^{III}$-selective disorder-to-order transition points to a function in which it is critical to the cell that formation of an "active" structure occurs only in the presence of Ln$^{III}$.

TABLE 6

Effective ionic radii (crystal radii, Å) of Ln(III), Ca(II), and Y(III), for coordination numbers (CN) = 6-12.

| Element | CN = 6 | CN = 7 | CN = 8 | CN = 9 | CN = 10 | CN = 12 |
|---|---|---|---|---|---|---|
| Ca(II) | 1.14 | 1.20 | 1.26 | 1.32 | 1.37 | 1.48 |
| Y(III) | 1.040 | 1.10 | 1.159 | 1.215 | | |
| La(III) | 1.172 | 1.24 | 1.300 | 1.356 | 1.41 | 1.50 |
| Ce(III) | 1.15 | 1.21 | 1.283 | 1.336 | 1.39 | 1.48 |
| Pr(III) | 1.13 | | 1.266 | 1.319 | | |
| Nd(III) | 1.123 | | 1.249 | 1.303 | | 1.41 |
| Sm(III) | 1.098 | 1.16 | 1.219 | 1.272 | | 1.38 |
| Eu(III) | 1.087 | 1.15 | 1.206 | 1.260 | | |
| Gd(III) | 1.078 | 1.14 | 1.193 | 1.247 | | |
| Tb(III) | 1.063 | 1.12 | 1.18 | 1.235 | | |
| Dy(III) | 1.052 | 1.11 | 1.167 | 1.223 | | |
| Ho(III) | 1.041 | | 1.155 | 1.212 | 1.26 | |
| Er(III) | 1.030 | 1.085 | 1.144 | 1.202 | | |
| Tm(III) | 1.020 | | 1.134 | 1.192 | | |
| Yb(III) | 1.008 | 1.065 | 1.125 | 1.182 | | |
| Lu(III) | 1.001 | | 1.117 | 1.172 | | |

The highly Ln-selective conformational response of LanM strongly suggests that this protein is a member of the emerging "lanthanome" in methylotrophs, consisting of proteins and small molecules involved in regulation, uptake, trafficking, storage, and utilization of Lns in certain bacteria and possibly other organisms. Characterization of this network will not only enrich our understanding of the fundamental coordination chemistry of Ln ions; it will also inspire model complexes to probe the chemistry of biology's important Ln-catalyzed reactions, enable electrocatalytic applications of these enzymes, and inform efforts to engineer methylotrophs or proteins/small molecules produced by them (such as LanM itself) for more sustainable extraction and separation of these relatively inaccessible yet increasingly technologically useful elements, in addition to medical applications (e.g., Gd-bound LanM or derivatives as an MRI contrast agent, or radioactive Lu-bound LanM or derivatives as a radiopharmaceutical).

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

The disclosure that follows describes the experiments conducted for characterizing and measuring various properties of LanM. In these experiments, lanthanide salts (chloride or acetate) were at a minimum purity of 99.9% rare earth metal content. SmCl$_3$ was obtained from Alfa Aesar, TmCl$_3$ was from Strem, YCl$_3$ was from Acros, and all other Ln$^{III}$s were from Sigma-Aldrich. *Methylobacterium* (now *Methylorubrum*) *extorquens* (ATCC 14718, NCIB 9133) was obtained from the American Type Culture Collection. *M. extorquens* AM1 gene sequences and genome maps were obtained from BioCyc (https://biocyc.org). Primers and gBlocks were ordered from Integrated DNA Technologies (IDT). *E. coli* strains [5alpha and BL21 (DE3)] for cloning and recombinant protein expression, respectively, as well as cloning reagents (restriction enzymes, Q5 DNA polymerase, OneTaq DNA polymerase, T4 DNA ligase, and the HiFi Assembly Kit, KLD Enzyme Mix) were purchased from New England Biolabs. PCR cleanup and miniprep kits were from Qiagen and Omega Bio-tek, and gel extraction utilized the Zymoclean gel DNA recovery kit from Zymo Research. Ni-NTA resin was purchased from Qiagen and Thermo Scientific. Protein gel electrophoresis was carried out using either homemade or BioRad 4-20% gradient gels and a Biorad Mini-Protean apparatus, or Life Tech 16% Trisglycine gels and a mini gel apparatus. Automated protein chromatography used a GE Healthcare Biosciences Akta Pure fast protein liquid chromatography (FPLC) system. UV-visible absorption spectra were obtained on an Agilent Cary 60 UV-visible spectrophotometer using a quartz cuvette (Starna Cells). Well plate analyses were carried out using a Tecan Infinite M1000 Pro plate reader. Vector DNA sequences were verified by sequencing at the Huck Genomics Facility, and CD and Direct Detect measurements were carried out in the X-ray Crystallography and Automated Biological calorimetry Facility at Penn State. To minimize metal contamination, all buffers used for LanM experiments were treated with 10 g/L Chelex 100 (BioRad, 100-200 mesh) for >1 h, followed by pH re-adjustment, according to the manufacturer's protocol. All protein and metal solutions were made in 1.5 mL microcentrifuge tubes or 15 mL or 50 mL centrifuge tubes obtained from Sarstedt.

Experimental Techniques

Growth of *M. extorquens*. MP medium was prepared as described by Marx and coworkers, except that iron (as ferrous ammonium sulfate) was withheld from the C7-metals solution and added as a solid prior to autoclaving. The medium consisted of: 30 mM PIPES (pH 6.75), 1.45 mM $K_2HPO_4$, 1.88 mM $NaH_2PO_4$, 8 mM $(NH_4)_2SO_4$, 0.5 mM $MgCl_2$, 20 µM $CaCl_2$, 45.6 µM sodium citrate, 18 µM $(NH_4)_2Fe(SO4)_2$, 1.2 µM $ZnSO_4$, 1 µM $MnCl_2$, 14 µM $Na_2MoO_4$, 1 µM $CuSO_4$, 2 µM $CoCl_2$, and 0.33 µM $Na_2WO_4$, supplemented with 0.5% v/v methanol. All growths were carried out at 30° C. *M. extorquens* was streaked out from a glycerol stock onto MP medium/methanol-1.5% agar plates. A single colony was used to inoculate 3 mL MP media/0.5% methanol culture and grown for ~2 d with 200 rpm shaking in a 14-mL polypropylene culture tube (BD Falcon). The starter culture (2 mL) was used to inoculate 200 mL MP-methanol media supplemented with 1 µM $LaCl_3$, and cells were grown to an $OD_{600}$~0.8, at which point the culture was used to inoculate 4×2 L MP-methanol media containing 1 µM $LaCl_3$ in 6 L flasks to an $OD_{600}$~0.02. The cultures were grown to an $OD_{600}$ ~0.8-1.0. Cells were harvested by centrifugation at 7000 g, 4° C., 7 min and frozen at −80° C. Typical yield is ~1 g cell paste per L culture.

Purification of XoxF. All operations were performed at 4° C. The cell paste from an 8 L *M. extorquens* growth was resuspended in 5 mL/g 20 mM MES, pH 5.5 (Buffer A) and 1 Roche Complete mini protease inhibitor tablet per 10 mL. The suspension was passed twice through a French pressure cell at 14000 psi, and debris was pelleted by centrifugation at 30000×g for 20 min at 4° C. The supernatant was decanted and ammonium sulfate was added to 40% saturation (226 g/L at 4° C.) over ~15 min, with stirring. After 15 min further stirring, the suspension was centrifuged at 20000×g for 10 min at 4° C. The supernatant was decanted and ammonium sulfate was added to 80% saturation (an additional 258 g/L at 4° C.), followed by further stirring and centrifugation as above. The pellet after centrifugation was resuspended in a minimal volume (~4 mL) Buffer A, supplemented with 0.25 mM PMSF, and applied to a 2.5×16 cm (80 mL) Sephadex G50 column, pre-equilibrated in Buffer A with 0.25 mM PMSF. Fractions were collected by following the pale red protein band and protein-containing fractions were pooled based on $A_{280nm}$ using a plate reader. The pooled fractions were concentrated to 5 mL using an Amicon Ultra 10 kDa MWCO centrifugal filtration device and insoluble material was removed by centrifugation (14000×g, 2 min). The supernatant was loaded onto a HiPrep SP FF 16/10 column (20 mL column volume, CV), preequilibrated in Buffer A, on a GE Healthcare Akta Pure fast protein liquid chromatography (FPLC) system. The column was washed with 2 CV Buffer A and eluted with a gradient of 0-250 mM NaCl in Buffer A over 10 CV. Fractions (4 mL) were collected in peak fractionation mode, and chromatograms were collected at 280 nm, 346 nm (PQQ absorption), and 413 nm (cytochrome Soret band). The flow rate was 2 mL/min. Fractions were pooled based on activity using the dye-linked assay described in the Supporting Information (2-5 µL each fraction). Activity eluted with the 346 nm peak at ~110-150 mM NaCl. The pooled fractions were concentrated to 2 mL using an Amicon Ultra 30 kDa MWCO centrifugal filtration device and loaded to a HiLoad 16/600 Superdex 75 pg column (120 mL) in Buffer B (20 mM MOPS, 20 mM acetate, 100 mM KCl, pH 7.0). The column was run at 0.75 mL/min, collecting 1.5 mL fractions, and following absorbance at 280, 346, and 413 nm. XoxF eluted at ~48-53 mL and LanM eluted at 73-77 mL. Based on subsequent studies of the heterologously expressed protein, LanM's elution time suggests that it is bound to $La^{III}$, but the protein's purity was insufficient to assess this observation further. Fractions were pooled based on purity assessed by SDS-PAGE. XoxF was concentrated using a 30 kDa MWCO filtration device. The concentration of purified XoxF was determined using $\varepsilon_{280nm}=137$ $mM^{-1}$ $cm^{-1}$ (per monomer), obtained via the ExPASy ProtParam tool. The $A_{280nm}/A_{350nm}$ ratio was 10.2. For generation of the purification table (Table 7), the protein concentration in samples prior to the final chromatographic step was determined using the Pierce BCA Protein Assay Kit (Thermo) with bovine serum albumin as standard. The yield of XoxF was 2-3 mg from 8 L culture.

TABLE 7

Purification of XoxF from 8 L culture of *M. extorquens* cells, ~10 g cell paste

| Purification step | Protein (mg) | Total activity (U) | Specific activity (U/mg) | Percent recovery | Purification factor |
|---|---|---|---|---|---|
| Crude extract | 576 | 430 | 0.75 | 100 | 1 |
| 40% $(NH_4)_2SO_4$ supernatant | 316 | 389 | 1.2 | 91 | 1.6 |
| 40:80% $(NH_4)_2SO_4$* | 266 | 323 | 1.2 | 75 | 1.6 |
| G50 | 189 | 323 | 1.7 | 75 | 2.3 |
| SP FF | 3.9 | 85 | 22 | 20 | 29 |
| Superdex | 3.1 | 67 | 22 | 16 | 29 |

*Resuspension of pellet following addition of ammonium sulfate to 80% saturation and centrifugation Dye-linked activity assays. Activity of chromatography fractions and of purified XoxF was determined by reduction of 2,6-dichlorophenolindophenol (DCPIP) using phenazine thiosulfate (PES) as an electron acceptor, according to the method of Day and Anthony. Each assay mixture (485 µL) contained: 100 mM Tris, pH 9.0, 15 mM $NH_4Cl$, 1 mM phenazine ethosulfate (PES), and 100 µM DCPIP. Assays were performed at room temperature (23° C.) on a Cary 60 UV-visible spectrophotometer in Kinetics mode, monitoring at 600 nm. The assay sample (1-10 µL) was added to the mixture. A large amount of background activity was present, especially in crude samples; after several minutes (1-5 min), the $A_{600nm}$ reading stabilized and 10 µL 1 M (4.0% v/v) methanol was added to measure methanol-dependent activity. The slope measured ($\Delta AU/min$) was used to calculate enzyme activity, which is reported in units (U), where 1 U is defined as 1 µmol $O_2$ reduced per min between 15 and 30 s after starting reaction, corresponding to 1 µmol DCPIP reduced/min. The extinction coefficient for DCPIP in assay buffer was determined by dilution of an aqueous stock solution of ~3 mM DCPIP into 20 mM MOPS pH 7.0 (8600 nm=20600 $M^{-1}$ $cm^{-1}$ at pH 7.0) and into 100 mM Tris pH 9.0, followed by comparison of the absorbance values, yielding $\varepsilon_{600nm}$=22500 $M^{-1}$ $cm^{-1}$. Protein content in crude samples was determined by BCA assay.

Mass spectrometric analysis on gel sections to identify LanM.

a) Sample preparation, gel sections. Gel sections were diced using a clean razor blade into ~1 $mm^3$ pieces and washed 3 times with approximately 5 gel volumes of 50% acetonitrile (MeCN) containing 50 mM triethylammonium bicarbonate (TEAB) for 20 min at 37° C. Reduction of disulfides and alkylation of Cys residues was performed by incubating the gel sections in 200 mM TEAB containing 5 mM tris(2-carboxyethyl) phosphine hydrochloride (TCEP) for 30 min at 37° C. followed by a 15-min incubation in 50 mM TEAB, 100 mM iodoacetamide at 37° C. with mixing in an Eppendorf Thermomixer R. The reducing and alkylating reagents were removed; the gels were washed 3 times in 50% MeCN, 50 mM TEAB as described above and dehydrated in neat MeCN. Residual MeCN was removed in a Speedvac (Thermo).

b) Proteolysis. A 1 μg/uL stock solution of sequencing-grade trypsin (Thermo) in 1 mM aqueous HCl was diluted 100-fold with chilled 50 mM TEAB, and the dried gel pieces were allowed to completely re-hydrate in the protease solution. Excess protease solution was removed and a sufficient volume of 50 mM TEAB was added to cover the gel. Proteolysis was carried out overnight at 37° C., after which the TEAB solution was transferred to a new microcentrifuge tube. The peptides were extracted with three 50-uL volumes of 50% MeCN, 0.1% formic acid and one 50-μL volume of neat MeCN; and these solutions were combined with the TEAB solution and dried in the Speedvac. The dried peptides were reconstituted in 10 μL 2% MeCN, 0.1% formic acid for LC $MS^2$ analysis.

c) Nano-LC $MS^2$. The peptides were loaded onto an Acclaim PepMap100 trapping column (100 μm×2 cm, $C_{18}$, 5 μm, 100 Å, Thermo) at a flow rate of 5 μL/min using 2% aqueous MeCN, 0.1% formic acid as a mobile phase. The peptides were separated on an Acclaim PepMap RSLC column (75 μm×15 cm, $C_{18, 2}$ μm, 100 Å, Thermo) with a 30-min linear gradient of 2-35% MeCN in water containing 0.1% formic acid. The gradient was delivered by a Dionex Ultimate 3000 nano-LC system (Thermo) at 300 nL/min. Mass spectra were acquired on an LTQ Orbitrap Velos (Thermo) using an 'Nth order double play' method: full FT MS scan at R 60,000 followed by 10 ion-trap $MS^2$ scans on the most intense precursors with CID activation. Only the precursors with charge states 2 or higher were selected for $MS^2$; monoisotopic precursor selection was enabled, and the isolation window was 2 m/z. Polysiloxane signal at 445.120030 m/z was used as the lock mass; ion injection times and automatic gain control target values were set to default.

d) Data analysis. Mass spectra were analyzed using two different applications: Proteome Discoverer 1.3 (P.D. 1.3, Thermo) with SEQUEST search engine, and PEAKS Studio (Bioinformatics Solutions, bioinfor.com) with PEAKS DB and Spider search algorithms. In both applications, cysteine carbamidomethylation (+57.021) was selected as the static modification, and methionine oxidation (+15.995 m.u.) was selected as the dynamic modification; two missed cleavages were allowed; and the mass tolerances for precursors and fragments were set to 15 ppm and 0.5 Da respectively. The protein sequence database was compiled from the Uniprot reference proteome UP000009081, *Methylobacterium extorquens* (strain ATCC 14718/DSM 1338/JCM 2805/NCIMB 9133/AM1) containing 6233 sequences and a common contaminants database (299 sequences).

Construction, expression, and purification of C-terminally TEV/$His_6$-tagged LanM from the *E. coli* periplasm.

a) Cloning. *M. extorquens* AM1 META1p1786 was obtained as a 461-bp gBlock gene fragment containing a TEV protease cleavage site followed by a $His_6$ tag (GEN-LYFQGHHHHHH) (SEQ ID NO: 8) at the C-terminus, codon optimized for expression in *E. coli* using IDT's online codon optimization tool (Table 9). To prepare the insert, the gBlock (250 ng, 10 ng/μL) was digested with Nde1 and EcoRI-HF for 1 h, and the enzymes were inactivated by incubation at 65° C. for 20 min. pET-24a (2 μg, Table 8 for all plasmids used in this study) was digested with Nde1 and EcoRI-HF (20 U each) for 1 h, and following gel electrophoresis (1% agarose), the vector fragment was excised and purified using the Zymoclean Gel DNA Recovery Kit. The insert was ligated into the digested vector (5:1 insert: vector) using T4 DNA ligase according to the manufacturer's protocol. Transformants were screened for insert by colony PCR (OneTaq Quick-Load) and the correct insert was confirmed by DNA sequencing using primer T7P (Table 5 for all primers used in this study) at the Penn State Genomics Core Facility, yielding pET24a-LanM-TEV/His.

TABLE 9

DNA sequence for *M. extorquens* AM1 LanM (META1p1786) (SEQ ID NO: 2), and gBlocks for expression of LanM. The region encoding the signal peptide, Met1-Ala21, is shown in double underline, and the TEV protease recognition sequence and the $His_6$ tag are underlined.

>META1p1786 (SEQ ID NO: 2)
atgGCGTTCC GCCTCTCCTC TGCCGTTCTG CTCGCTGCGC
TCGTCGCCGC TCCGGCCTAC GCCGCCCCGA CGACGACCAC
GAAGGTCGAT ATCGCCGCCT TCGATCCGGA CAAGGACGGC
ACGATCGATC TGAAGGAGGC CCTGGCCGCC GGCTCCGCTG
CCTTCGACAA GCTCGATCCG GATAAGGACG GCACGCTCGA
CGCTAAGGAG CTGAAGGGCC GCGTCAGCGA GGCCGACCTC
AAGAAGCTCG ACCCGGACAA CGACGGCACC CTCGACAAGA
AGGAATACCT TGCCGCCGTC GAGGCGCAGT TCAAGGCCGC
TAACCCGGAC AACGACGGCA CCATCGACGC TAGGGAATTG
GCCAGCCCGG CCGGTTCGGC CCTGGTCAAT CTGATCCGCt
aa >Codon-optimized, C-terminal TEV and
$His_6$ sites (SEQ ID NO: 11)
aatacat<u>ATGGCGTTTCGTTTGAGCAGTGCCGTGTTATTAGCTGCGCTTG</u>
<u>TAGCAGCTCCGGCGTATGCC</u>GCGCCAACTACGACTACCAAAGTTGATATC
GCGGCGTTTGACCCGGACAAAGATGGGACCATCGATCTGAAAGAGGCTTT
GGCGGCAGGTTCCGCGGCCTTCGACAAGTTGGACCCGGATAAAGATGGTA
CTCTGGACGCCAAAGAGCTGAAGGGCCGCGTGTCTGAGGCAGACCTTAAG
AAGCTGGACCCTGACAATGACGGAACCCTGGAGAAGAAAGAGTACTTAGG
AGCGGTAGAGGCACAGTTTAAGGCCGCTAACCCTGACAACGATGGCACTA
TTGACGCCCGTGAACTTGCAAGCCCAGCGGGGTCGGCCCTGGTCAACTTA
ATTCGTGGTGAAAACCTGTATTTTCAGGGCCATCATCACCATCATCACTA
<u>Agaattctatt</u>

>Codon-optimized, N-terminal TEV site,
$His_6$ tag from pET28a (SEQ ID NO: 12)
aatacat<u>ATGGAAAACCTGTATTTTCAGGGCGCGCCAACTACGACTACCA</u>
AAGTTGATATCGCGGCGTTTGACCCGGACAAAGATGGGACCATCGATCTG
AAAGAGGCTTTGGCGGCAGGTTCCGCGGCCTTCGACAAGTTGGACCCGGA
TAAAGATGGTACTCTGGACGCCAAAGAGCTGAAGGGCCGCGTGTCTGAGG
CAGACCTTAAGAAGCTGGACCCTGACAATGACGGAACCCTGGACAAGAAA
GAGTACTTAGCAGCGGTAGAGGCACAGTTTAAGGCCGCTAACCCTGACGA
CGATGGCACTATTGACGCCCGTGAACTTGCAAGCCCAGCGGGGTCGGCCC
TGGTCAACTTAATTCGTTAAgaattctatt

TABLE 8

Plasmids used in this disclosure

| Name | Notes | Source |
|---|---|---|
| pET-24a | $Km^R$ | Novagen |
| pET-28a | $Km^R$ | Novagen |
| pET-24a-LanM-TEV/His | Expression of a TEV-cleavable, C-terminally $His_6$-tagged LanM, for isolation from periplasm | Present Disclosure |
| pET-28a-His/TEV-LanM | Cytosolic expression of LanM with an N-terminal, TEV-cleavable $His_6$ tag, to yield wt LanM | Present Disclosure |
| pET-24a-His-LanM | N-terminally $His_6$-tagged LanM, cytosolic expression | Present Disclosure |
| pET-24a-LanM-His | C-terminally $His_6$-tagged LanM, cytosolic expression | Present Disclosure |
| pET28a-His/TEV-LanM(4P→4A) | His/TEV-LanM with P36A/P60A/P85A/P109A | Present Disclosure |
| pET24a-LanM (4P→4A)-His | LanM-His with P36A/P60A/P85A/P109A | Present Disclosure | b) Expression. Chemically competent *E. coli* BL21 (DE3) cells were transformed with pET24a-LanM-TEV/His and plated on LB-agar plates containing 50 µg/mL kanamycin (Km) and grown at 37° C. A single colony was used to inoculate 7 mL of LB (50 µg/mL Km in all growth media), which was grown for ~16 h at 37° C. with shaking at 200 rpm. This culture was used to inoculate one 2 L culture (in a 6 L flask) of LB media supplemented with 0.5 mM $MgCl_2$ and 0.1 mM $CaCl_2$), and the culture was grown at 37° C. with shaking at 200 rpm. At $OD_{600nm}$ ~0.6, isopropyl B-D-1-thiogalactopyranoside (IPTG, Amresco) was added to a final concentration of 0.2 mM; after 3 h further incubation, the cells were pelleted by centrifugation for 7 min at 7000 × g, at 4° C., yielding ~2 g cell paste per L culture.

c) Purification. The cell paste was re-suspended in 40 mL/g of 30 mM Tris, 1 mM EDTA, 20% sucrose, pH 7.4 (Buffer C) and stirred for 20 min at room temperature. The suspension was centrifuged at 9000×g for 10 minutes at 4° C. The supernatant was decanted and the cell pellet was re-suspended in 20 mL 5 mM $MgSO_4$ per g of the original cell paste, with stirring for 20 min at 4° C., and the suspension was centrifuged at 9000×g for 10 min at 4° C. The supernatant was decanted and 0.05 volumes of 1.0 M Tris, pH 7.4 was added, along with solid NaCl to 100 mM. This solution was applied to a 0.7×1.0 cm (1.0 mL) Ni-NTA agarose column, pre-equilibrated in 50 mM sodium phosphate, 10 mM imidazole, 5% glycerol, pH 7.0 (Buffer D). The column was washed with 30 CV of Buffer D containing 100 mM NaCl and 0.25 mM phenylmethylsulfonyl fluoride (PMSF), followed by elution with 15 CV of 50 mM sodium phosphate, 250 mM imidazole, 5% glycerol, pH 7.0 (Buffer E). The eluted protein was concentrated to 1.5 mL using an Amicon Ultra 15 3-kDa MWCO centrifugal filtration device.

Higher molecular weight contaminants were removed and buffer exchanged into 20 mM MOPS, 100 mM KCl, 1 mM EDTA, pH 7.0 (Buffer F), by size-exclusion chromatography on a HiLoad 16/600 Superdex 75 pg column (GE Healthcare, 120 mL). After column equilibration at 1.0 mL/min, the protein was loaded onto the column using a 2-mL capillary loop, and the column was eluted with 1.2 CV Buffer F at 0.75 mL/min, with 1 mL fractions collected in peak fractionation mode (1 mAU threshold). LanM-TEV/His eluted at 54-63 mL. Protein-containing fractions were collected and analyzed by SDS-PAGE. Fractions were concentrated using an Amicon Ultra 3-KDa MWCO centrifugal filtration device and protein concentration was estimated using 8280 nm=1490 $M^{-1}$ $cm^{-1}$ (ExPASy ProtParam). The purification yielded ~1.4 mg LanM-TEV/His from 2 L cultured) Mass spectrometry on LanM-TEV/His. LanM-TEV/His (~100 µM, 100 µL) was exchanged into water using a 0.5 mL Zeba spin column (Thermo Fisher), according to the manufacturer's protocol. The intact protein was analyzed by MALDI-TOF MS in linear positive-ion mode on an Ultraflextreme mass spectrometer (Bruker Daltonics) at the Penn State Proteomics and Mass Spectrometry Facility.

Cloning of LanM for cytosolic expression. The soluble domain of *M. extorquens* AM1 META1p1786, lacking the N-terminal signal sequence and containing a TEV protease cleavage site (GENLYFQG) (SEQ ID NO: 61) was obtained as a 380-bp gBlock gene fragment, codon optimized for expression in *E. coli* using IDT's online codon optimization tool (Table 9). Following digestion with Nde1 and EcoRI, the gBlock was inserted into similarly digested pET-28a, and the correct insert confirmed by DNA sequencing using primer T7P at the Penn State Genomics Core Facility, yielding pET28a-His/TEV-LanM.

Expression and purification of His/TEV-LanM. Chemically competent *E. coli* BL21 (DE3) cells were transformed with pET28a-His/TEV-LanM and plated on LB-agar plates containing 50 µg/mL Km and grown at 37° C. A single colony was used to inoculate 100 mL of LB (50 µg/mL Km in all growth media), which was grown for ~16 h at 37° C. with shaking at 220 rpm. This culture (40 mL) was used to inoculate one 2 L culture (in a 6 L flask) of LB supplemented with 0.5 mM $MgCl_2$ and 0.1 mM $CaCl_2$), and the cultures were grown at 37° C. with shaking at 200 rpm. At $OD_{600nm}$ ~ 0.5, IPTG was added to a final concentration of 0.2 mM; after 3 h further incubation, the cells were pelleted by centrifugation for 7 min at 7000 × g, 4° C., yielding ~2.2 g cell paste per L culture. The cell pellet was frozen at −80° C.

All operations were performed at 4° C. The cell paste was resuspended in 5 mL/g of Buffer D containing 2 Roche Complete mini protease inhibitor tablets, 2 U/mL DNase, and 0.25 mM phenylmethanesulfonyl fluoride (PMSF). The suspension was passed twice through a French pressure cell at 14000 psi, and debris was pelleted by centrifugation at 30000×g for 20 min at 4° C. The supernatant was decanted and applied to a 1.5×2 cm (3.5 mL) Ni-NTA agarose column, pre-equilibrated in Buffer D. The column was washed with 20 CV Buffer D containing 100 mM NaCl, followed by elution with 10 CV Buffer E. The eluted protein was concentrated to ~10 mL using an Amicon Ultra 3-kDa MWCO centrifugal filter device. The $His_6$ tag and TEV recognition sequence were cleaved from 5 mL of the protein by 16 h incubation in 50 mM Tris, 5 mM dithiothreitol, 1 mM EDTA, pH 7.4, with 100 µL ~25 µM TEV protease (a gift from X. Zhang, Pennsylvania State University), in a total volume of 25 mL. The approximate protein concentration during digestion was 150 µM, based on &275 nm=2800 $M^{-1}$ $cm^{-1}$ (one Tyr residue is in the tag and one in the native protein sequence). The solution was then diluted to 125 mL with 50 mM Tris, pH 7.4 and passed through the same pre-equilibrated Ni-NTA column as above, and the column was washed with 1.5 CV of 50 mM Tris, pH 7.4. The pooled flowthrough and wash was concentrated to 1.5 mL by centrifugal filtration (Amicon Ultra 3 kDa MWCO).

Higher molecular weight contaminants were removed and buffer was exchanged into Buffer B by size-exclusion chromatography on a HiLoad 16/600 Superdex 75 pg column. After column equilibration, the protein sample was loaded using a 2 mL capillary loop, washed with 3 mL Buffer B, and eluted with 1 CV Buffer B at 0.75 mL/min, with 1.5 mL fractions collected (1 mAU threshold in peak fractionation mode). LanM-containing fractions (55-63 mL) were pooled based on $A_{280nm}$ and concentrated by centrifugal filtration to <3 mL. The protein was dialyzed overnight (~16 h) at room temperature against 500 mL Buffer B containing 5 g Chelex-100 (following stirring for 1 h and correction of the pH to 7.0) using a Slide-a-Lyzer dialysis cassette (MWCO 3500). Protein concentration was determined using δ275 nm=1400 $M^{-1}$ $cm^{-1}$, determined using an EMD Millipore Direct Detect instrument. The purification yielded ~15 mg/L culture. The resulting Chelex-treated buffer was used for all subsequent experiments except for XO titrations and $K_d$ determination using buffered metal solutions.

Thus, an aspect of the present disclosure includes an isolated metal-binding protein encoded by a nucleotide comprising a sequence having at least 80% identity to the sequence of SEQ ID NO: 2 (see Table 9). In an embodiment, the nucleotide includes a sequence with at least 85%, 90%, 93%, 95%, 97%, 98%, 99% or 100% identity to the sequence of SEQ ID NO: 2. For example, in an embodiment, the nucleotide comprises a sequence of SEQ ID NO: 2 with the first 21 nucleotides removed.

Construction and purification of His-tagged LanMs. Constructs with an N-terminal or C-terminal $His_6$ tag were generated by PCR amplification of the LanM gene in pET28a-His/TEV-LanM using primers His-LanM-NdeI-for, LanM-EcoRI-rev, LanM-NdeI-for, and LanM-His-EcoRI-rev. Following digestion with NdeI and EcoRI-HF, the inserts were ligated into a similarly digested pET24a, screened, and verified by sequencing. These proteins were expressed and purified analogously to His/TEV-LanM, except that the column used was 8 mL (1.5× 4.5 cm), no TEV digestion was necessary, and the buffer used for Superdex 75 chromatography was 20 mM MOPS, 20 mM KCl, 5 mM acetate, 1 mM EGTA, pH 7.0 (Buffer G). The purifications yielded 15 mg and 23 mg protein/L culture for His-LanM and LanM-His, respectively.

Competition assays using xylenol orange (XO). A cuvette contained 500 μL 20 mM MES-KOH, 20 mM acetate, 100 mM KCl, pH 6.1 (Buffer H, stirred with 10 g/L Chelex 100 for 1 h followed by pH adjustment), ~7 μM xylenol orange, and 0 or ~5 μM LanM, into which 0.5 or 1 μL aliquots of a 625-1250 μM solution of $LnCl_3$ in the same buffer were added. The cuvette was washed with 6 N HCl prior to each experiment to minimize the potential for metal contamination across experiments. For experiments utilizing protein, buffer and protein were pre-mixed and a spectrum acquired prior to addition of XO, in order to calculate the protein concentration in the cuvette. A spectrum between 240 and 800 nm was acquired after each addition of $LnCl_3$ stock until there was no further change in the $Ln^{III}$—XO absorption feature at ~575 nm (λmax was dependent on Ln in the experiment). The absorption at this wavelength, corrected for volume change of the solution, was plotted against metal ion concentration. The metal ion concentration at which $A=A_{initial}+0.1 (A_{final}-A_{initial})$, the point of 10% saturation of XO, was taken as an estimate of the point at which the tight binding sites on LanM were saturated.

Circular dichroism spectroscopy. Circular dichroism (CD) spectra of LanM were collected using a Jasco J-1500 CD spectrometer, thermostatted at 25° C., and a 1-mm pathlength quartz CD cuvette (Jasco J/0556). Samples were scanned from 260 to 200 nm, with the following instrument settings: 1 nm bandwidth, 0.5 nm data pitch, 50 nm/min scan rate, 4 s average time. Three scans were acquired and averaged for each condition. For stoichiometric titrations of LanM with all $Ln^{III}$ ions and $Ca^{II}$, the cuvette contained 20 μM LanM in 200 μL Chelex-treated Buffer B, into which 1-8 equiv. each metal ion (from a 1 mM solution in Buffer B) were titrated, and each spectrum was acquired. A buffer blank spectrum was subtracted from the sample spectra, and the spectra were corrected for volume change before plotting.

Preparation of Buffered $Ca^{II}$ Solutions a. Preparation of buffer stock. The buffer used for all buffered metal titrations was prepared as a 2× stock: 60 mM MOPS, 200 mM KCl, pH 7.2 (Buffer I). Solids were dissolved in 400 mL Milli-Q water and stirred at room temperature with 25 g Chelex 100 resin overnight. The pH of the resulting solution was adjusted to 7.2 and the bottle was filled to a final volume of 500 mL.

b. Preparation of $Ca^{II}$-EGTA "high-Ca" buffer. A concentrated stock of $Ca^{II}$-EGTA was prepared using a pH titration to monitor the relative amounts of $Ca^{II}$ and EGTA, adapted from the method of Tsien and Pozzan. In a 50 mL Sarstedt conical tube, EGTA (99%, 3.8415 g, 10.1 mmol) was dissolved in 15 mL Milli-Q water with 19 mmol (1.0661 g) KOH. $CaCl_2$) (1.397 g, ~ 9.5 mmol) was dissolved in this solution, and the pH was adjusted to 7.3. $CaCl_2$) (20 μL of 1 M, 0.02 mmol) was added to this solution, and the resulting change in pH was noted, and KOH (40 μL of 1 M, 0.04 mmol) was added to bring the pH back to the initial value. This process was repeated until the change in pH per addition of $CaCl_2$) was half of the initial value (9 additions or 180 μL of 1 M $CaCl_2$)). The pH of the solution was adjusted to 7.2 and the solution was brought to a final volume of 20.0 mL, resulting in 0.5 M $Ca^{II}$-EGTA stock (50×). The final $Ca^{II}$-EGTA buffer (20 mL) contained: 10 mL 2× Buffer I and 400 μL 50× $Ca^{II}$-EGTA stock (10 mM $Ca^{II}$-EGTA), brought to 20.0 mL with Milli-Q water.

c. Preparation of the "low-Ca" buffer (30 mM MOPS, 100 mM KCl, 10 mM EGTA, pH 7.2). This buffer was prepared by dissolving 0.07683 g of EGTA (99%, 0.2 mmol) with ~2 equivalents of KOH in 8 mL of Milli-Q water. Buffer I (10 mL) was added, and the solution was brought to pH 7.2 and adjusted to a final volume of 20 mL.

Preparation of buffered $Ln^{III}$-EDDS solutions. Ethylenediamine N,N'-disuccinic acid (EDDS) was obtained as a ~35% (~1 M) trisodium salt solution in water (Sigma). For the purpose of metal-protein $K_d$ determination, 1:1 metal:EDDS stock solutions were prepared by taking advantage of the change in the CD signal of the free ligand upon metal binding. Using Buffer H, water, and EDDS, a solution of 30 mM MOPS, 100 mM KCl, and (nominally) 10 mM EDDS, pH 7.2 (Buffer J) was prepared in a Sarstedt 50 mL conical tube. This solution (300 μL) was placed in a 1-mm pathlength CD cuvette and titrated with solutions of ~100 mM $YCl_3$, $LaCl_3$, $NdCl_3$, $SmCl_3$, $GdCl_3$, $TbCl_3$, or $HoCl_3$ derived by 10× dilution from ~1 M stock solutions, in 30 mM MOPS, 100 mM KCl, pH 7.2. CD spectra were acquired at 260-215 nm under the same conditions as above. Metal solutions were added in 1.5-4 μL increments, until the CD signal at 220 nm, adjusted for volume change during the titration, was no longer altered by metal addition (1:1 metal:ligand complex). The volume of the metal stock solution required to reach the equivalence point was calculated from the intersection of the linear regression line fitted to points in the first half of the titration and the average ellipticity from the first 3 points after signal was constant. Assuming an EDDS concentration in the commercial stock of 1 M, we determined the molar ellipticities at 220 nm ([θ] 220 nm, all in deg cm² dmol-1) to be: +2490 (EDDS), −9500 ($Y^{III}$-EDDS), −4300 (LaI-EDDS), −5630 ($Nd^{III}$-EDDS), −7750 (SmII-EDDS), −6420 ($Gd^{III}$-EDDS), −6980 ($Tb^{III}$-EDDS), and −9640 (Ho™-EDDS). To make the 1:1 metal: EDDS buffers, 10 mL of Buffer H was mixed with 200 μL ~1 M EDDS solution and the amount of metal 1 M stock determined from the titration to give 1:1 metal: ligand. The pH of the solution was adjusted to 7.2 using 25 μL of 5 M KOH and brought to a final volume of 20 mL with water, to make "high-Ln" buffer. Solutions were stable for ~1 day and were used immediately after mixing metal into a pre-prepared Buffer H-EDDS-KOH solution.

Preparation of LaMI-EGTA. Because LanM's $K_d$ for $La^{III}$ was too low to be measured accurately using EDDS solutions (except for fluorescence titrations), a solution of $La^{III}$-EGTA was prepared. A pH titration method analogous to that used to prepare $Ca^{II}$-EGTA could not be used due to the strong Lewis acidity of the Ln salts, which overwhelmed the pH changes from proton release from EGTA. Another approach was developed using the UV-vis signature of XO to standardize a metal stock solution to a ~1.0 M EGTA solution. A 10 mL stock of ~1.0 M EGTA was prepared in Milli-Q water with 2 equiv. (~20 mmol) KOH. This solution was brought to pH 7.2 and diluted with water to 10 mM. A ~1 M stock solution of LaCl₃ was made in Buffer H, with addition of a minimal volume of 6.0 N HCl, and the solution was sterile filtered to remove any precipitate. This solution was diluted to 10 mM. A cuvette contained 470 μL Buffer H, 25 μL ~10 mM EGTA, and 5 μL ~7 mM XO. The ~10 mM LaCl₃ solution was titrated into the cuvette in 1 μL increments, and $A_{579nm}$ was monitored. Because of the much higher $K_d$ for LaII—XO vs. $La^{III}$-EGTA, La: EGTA equivalency was taken to be the point at which the increase in $A_{579nm}$ exceeded 2% of the total change at the end of the titration. The final $La^{III}$-EGTA buffer (20 mL) contained: 10 mL 2× Buffer H, 200 μL ~1 M EGTA, and the appropriate amount of ~1 M La" stock determined from the titration to give equimolar amounts of metal and EGTA, and after pH adjustment to 7.2, it was brought to 20 mL with Milli-Q water. This protocol was also followed to make $Nd^{III}$-EGTA solutions used for CD titration of LanM (4P→4A).

$K_d$ determinations by CD spectroscopy. A concentrated solution of LanM (~2 mM) was diluted separately in high-Ln buffer and in Buffer J to 15 μM. These two protein solutions were mixed in different ratios to give various free metal concentrations (calculated as described below), with each sample being 200 μL, in Sarstedt tubes. The same ratios of high-Ln buffer and Buffer J (without protein) were mixed together to yield the blank samples for CD experiments. The samples were incubated at room temperature for ~1 h to allow for equilibration prior to collection of CD spectra at 25° C. The blank spectra at each high-Ln: Buffer J ratio were subtracted from the $Ln^{III}$-LanM spectra, and the $[\theta]_{222}$ nm was plotted vs. free metal concentration. For determination of the $K_d$ for $La^{III}$-LanM (4P→4A), the solutions did not equilibrate in 1 h, so solutions were incubated overnight prior to data collection. For determination of the $K_d$ for $Ca^{II}$-LanM, unbuffered $Ca^{II}$ was added in aliquots to 200 μL of 15 μM LanM. For titrations involving EGTA-buffered metals, a single blank spectrum was sufficient, as EGTA does not have a CD signal in this spectral region. All curve fitting was performed in Origin 2018 (OriginLab Corporation), to the Hill equation with one or two independent sets of sites.

Calculation of free metal concentrations for $K_d$ determinations. The concentration of free metal ion ($Ca^{II}$ or $Ln^{III}$), [$M_{free}$], in each mixture of "low metal" and "high metal" buffers was determined using the following equation:

$$[M_{free}] = (K_{d,M}[ML])/[L] \quad (1)$$

Where [L] is the concentration of all EDDS or EGTA species not bound to M, [ML] is the concentration of metal ion-bound EDDS or EGTA, and $K_{d,M}$ is the effective $K_d$ of the ligand for M, defined as:

$$K_{d,M} = [1 \pm 10^{(pKa1-pH)} + 10^{(pKa2-pKa1-2pH)}]/K_M \quad (2)$$

In eq. 2, $pK_{a1}$ and $pK_{a2}$ are the first and second $pK_{dS}$ of L, which were corrected for an ionic strength of 0.1 M by addition of 0.11 units to each published value. pH is the buffer pH, and KM is defined as:

$$K_M = [ML]/([M][L]) \quad (3)$$

Because the concentration of ligand (10 mM) was much greater than the protein concentration (15 μM), eq. 1 was approximated by eq. 4 for each sample, where Vhigh and Vlow are the volumes of the high and low metal solutions mixed together:

$$[M_{free}] = K_{d,M} V_{high}/V_{low} \quad (4)$$

It must be noted that the intrinsic $K_{dS}$ may be lower than the apparent $K_{dS}$ reported here. Furthermore, because rare earth ion-catalyzed hydrolysis (which would decrease free metal concentrations) was not considered in these calculations, it is likely that the true free metal concentrations in the titration experiments and therefore the true $K_{dS}$ are smaller than those calculated here, especially for the more Lewis-acidic later $Ln^{III}$s and $Y^{III}$ (i.e. the metal affinities of LanM and selectivity vs. other metal ions like $Ca^{II}$ are even higher than stated).

Error analysis for $K_d$ determinations. For most titrations, the errors between replicates using different protein samples or buffered high metal solutions were typically small (<1 pM). Therefore, we reasoned that the largest source of uncertainties in our $K_d$ measurements was likely to be judgment of the endpoint in the titration of EDDS with metal ion. For example, titration of 300 μL of ~10 mM EDDS with a ~100 mM GdCl₃ stock solution yielded an endpoint at 30.8-33.1 μL metal stock added, depending on the range of points included in the linear regression lines used to determine endpoint (see "Preparation of buffered $Ln^{III}$-EDDS solutions"). Similar uncertainties were exhibited in titrations with other metal ions. To determine the impact of these endpoint ranges on $K_d$ determination, we made "high-Gd" solutions based on each of these endpoints (30.8 and 33.1 μL) and performed titrations of LanM-His as described. The fits to these data yielded apparent $K_{dS}$ of 16 and 14 pM, respectively. Therefore, we concluded that the uncertainty in metal-EDDS titration endpoint determination was approximately +10%. This value taken to be similar for all Lns studied given the similar uncertainties in endpoint determination. Although La-EGTA and Nd-EGTA titrations did not use EDDS for standardization (as described above), we estimated that there was a similar uncertainty in judging the titration endpoint in this case as well. These calculated errors were combined with the errors between experimental replicates, and these combined values have been reported as the uncertainties.

Construction, expression, and purification of LanM (4P→4A). The quadruple mutant LanM P36A/P60A/P85A/P109A was obtained as a 380-bp gBlock gene fragment identical to the wt protein except that the CCG codons for P36 and P60 were mutated to GCG and the CCT codons for P85A and P109A were mutated to GCT. The gBlock was ligated into pET-28a using NdeI and EcoRI sites, as for wt LanM, yielding pET28a-His/TEV-LanM (4P→4A). This plasmid was used as template to generate LanM (4P→4A)-His, with a C-terminal $His_6$ tag, using primers LanM-for and LanM-His-rev. This protein was expressed and purified analogously to LanM-His, with similar yield.

Spectrofluorometry. Fluorescence experiments were carried out using a Varian Cary Eclipse spectrofluorometer at 23° C. The excitation wavelength was 278 nm, and emission data were collected at 300–400 nm, with 5 nm excitation and emission slits, 1 nm steps, and 0.5 s averaging time. All samples were 600 µL and were prepared in a semi-micro quartz fluorimeter cell with 10 mm path length (Starna Cells). For stoichiometric titrations of LanM-His with $La^{III}$ and $Gd^{III}$, the cuvette contained 15 µM LanM-His in Buffer B, into which 0–8 equiv. metal ion was titrated from a 15 mM stock solution prepared from the ~1 M solution standardized against EDDS as described above. For titrations to determine $K_{d,app}$ values, samples were prepared at various free $La^{III}$ concentrations as described for CD experiments, except that each sample was 600 µL, 10 µM LanM-His, and $La^{III}$-EDDS was used. Two scans were averaged for each titration point. All samples were analyzed following subtraction of a blank spectrum of Buffer B.

Isothermal titration calorimetry. Binding of $Ca^{II}$ to wt-LanM was analyzed by ITC using a MicroCal Auto-iTC200 instrument. All experiments were performed at 25° C., in Chelex-treated Buffer B from the dialysis procedure. All solutions were degassed prior to the experiments. The ITC cell contained 40 µM wt-LanM. The titrant syringe contained 4.0 mM $CaCl_2$) in the same buffer. Titration settings were the following: 600 rpm stirring speed, 60 s initial delay, 5 µcal/s reference power, and 180 s spacing between each injection. Titrations consisted of a first 0.2 µL injection followed by 48×0.8 µL injections. The heat of dilution was determined by titrating the identical metal solutions into cell containing buffer without protein. These data were subtracted from the heats of reaction prior to analysis. The resulting data were fitted using MicroCal Origin to a model, provided by the manufacturer, with two sets of non-interacting sites, to obtain for each set of sites, i, the number of sites ($n_i$), association constants ($K_i$), binding enthalpies ($\Delta H_i$), and entropy change ($\Delta S_i$), from which the free energy change ($\Delta G_i$) and could be calculated. Other models provided with the software package, with either sequential or non-sequential binding, did not yield fits that were judged to be acceptable.

General considerations for LaMP1 studies. Chemical reagents were obtained from Sigma-Aldrich, unless noted otherwise, at the highest purity available. All rare earth element salts (chloride or acetate) were at a minimum purity of 99.9% rare earth metal content. All were obtained from Sigma-Aldrich, except for $SmCl_3$ and $ScCl_3$ from Alfa Aesar, $TmCl_3$ was from Strem, and $YCl_3$ was from Acros. Primers were ordered from Integrated DNA Technologies (IDT). E. coli strains [5alpha and 10beta] for cloning and recombinant protein expression, respectively, as well as cloning reagents (restriction enzymes, Q5 DNA polymerase, OneTaq DNA polymerase, T4 DNA ligase) were obtained from New England Biolabs. PCR cleanup and miniprep kits were from Qiagen and Omega Bio-tek, and gel extraction utilized the Zymoclean gel DNA recovery kit from Zymo Research. Ni-NTA resin was purchased from Thermo Scientific. Protein gel electrophoresis was carried out using Life Tech 16% Tris-glycine gels and a mini gel apparatus. Automated protein chromatography used a GE Healthcare Biosciences Akta Pure fast protein liquid chromatography (FPLC) system. UV-visible absorption spectra were obtained on an Agilent Cary 60 UV-visible spectrophotometer using a quartz cuvette (Starna Cells). Well plate analyses were carried out using a Tecan Infinite M1000 Pro plate reader.

Construction of LaMP1 and LaMP1 (4P→4A). LanM and LanM (4P→4A) inserts were amplified from pET24a-LanM-TEV/His and pET28a-His/TEV-LanM (4P→4A), respectively, using primers ECFP-LanM-SphI-for and Citrine-LanM-SacI-rev. The PCR products were digested using SphI and SacI (10 U/ug) and purified. pBAD-D2 (Addgene #37470) was similarly digested and, and following agarose gel electrophoresis, the vector fragment was excised and purified. The inserts were ligated into the digested vector (5:1, insert: vector) using T4 DNA ligase according to the manufacturer's protocol. Transformants were screened for insert by colony PCR and the correct insert was confirmed by DNA sequencing at Penn State Genomics Core Facility using primers pBAD-F, pBAD-R, and ECFP-mid, yielding pBAD-LaMP1 and pBAD-LaMP1 (4P→4A).

Expression and purification of LaMP1 and LaMP1 (4P→4A). Chemically competent E. coli 10beta cells were transformed with pBAD-LaMP1 or pBAD-LaMP1 (4P→4A) and plated on LB-agar plates containing 100 µg/mL ampicillin (Amp) and grown at 37° C. A single colony was used to inoculate 100 mL LB (100 µg/mL Amp in all growth media) and grown for ~16 h at 37° C. with shaking at 200 rpm. Of this culture, 40 mL were used to inoculate one 1.5-L culture in a 6 L flask of LB media. The cultures were grown at 37° C. with shaking at 200 rpm. At $OD_{600nm}$ ~0.5, the culture was placed at 4° C. for 30 min, after which L-arabinose (Oakwood Chemical) was added to a final concentration of 500 µM. After further incubation at 23° C. with shaking at 200 rpm for 16 h, the cells were pelleted by centrifugation at 7000×g for 7 min at 4° C., yielding 6–7 g cell paste.

For sensor purification, all operations were performed at 4° C. Cell paste was resuspended in 5 mL/g of 50 mM sodium phosphate, 10 mM imidazole, 5% glycerol, pH 7.0 (Buffer A) containing 0.4 mM phenylmethanesulfonyl fluoride (PMSF). The suspension was passed through a French pressure cell twice at 14000 psi. Debris was pelleted by centrifugation at 40000 ×g for 30 min at 4° C. The supernatant was decanted and applied to a 1.5×4.5 cm (8.0 mL) Ni-NTA agarose column, pre-equilibrated in Buffer A. The column was washed with 15 CV of Buffer A, followed by elution with 3 CV 50 mM sodium phosphate, 250 mM imidazole, 5% glycerol, pH 7.0 (Buffer B). The eluted protein was concentrated to 1.5 mL using an Amicon Ultra 30-kDa MWCO centrifugal filter device. The protein was applied to a HiLoad 16/600 Superdex 75 pg column (GE Healthcare) using a 2 mL capillary loop, and the column was run with 1.2 CV 30 mM MOPS, 100 mM KCl, pH 7.2 (Buffer C) at 0.75 mL/min, with 1.5 mL fractions collected (1 mAU threshold in peak fractionation mode). Fractions containing LaMP1 or LaMP1 (4P→4A) were judged by $A_{280nm}$, $A_{434nm}$, $A_{515nm}$, and the fractions eluting at 45–58 mL [LaMP1] or 45–52 mL [LaMP1 (4P→4A)] were pooled and concentrated by centrifugal filtration to ~1.0 mL. Protein concentration was determined using 8515 nm=77000 $M^{-1}$ $cm^{-1}$. The purification yielded ~38 mg/L culture.

In vitro characterization of LaMP1 sensors. Ethylenediamine N,N'-disuccinic acid (EDDS)-buffered solutions of $Ln^{III}$s ($La^{III}$—$Er^{III}$) were prepared in Buffer C as described. For buffering of $La^{III}$ in the range of $10^{-10}$ to $10^{-6}$ M free metal ion concentration, trimethylenedinitrilotetraacetic acid (TMDTA) was used. LaMP1 was diluted to 500 nM in metalated and chelator-only buffers and these solutions were combined in various ratios to give 100 µL final volume for each titration point. Following 15-min incubation, fluorescence measurements were carried out in Greiner Cellstar 96-well half-area µClear plates, using 433 nm excitation, 450–550 nm emission, and a gain of 130. Unbuffered titrations were performed in 30 mM MOPS, 100 mM KCl, 20 mM acetate, pH 7.2 (Buffer D). FRET ratios were calculated from the intensities of the fluorescence emission peaks of ECFP (475 nm) and citrine (529 nm), as $F_{529nm}/F_{475nm}$.

Preparation of buffered $La^{III}$-TMDTA solutions. A 20 mL stock solution of 20 mM TMDTA was prepared by dissolving 0.404 mmol TMDTA (99%) (the extra 0.011% mass of TMDTA was included to compensate for 99% purity) and 1.01 mmol KOH in Buffer C to give a 10 mL total volume. The 1:1 $La^{III}$-TMDTA solution was prepared immediately prior to use by adding an equimolar quantity of $La^{III}$ from a 0.9 M $LaCl_3$ stock solution in Buffer C (calibrated by titration against EGTA as described) to 2.5 mL of the 20 mM TMDTA stock. The pH of the resulting solution was adjusted to 7.2 using KOH, and brought to a volume of 5 mL using Buffer C. The final solution was 30 mM MOPS, 100 mM KCl, 10 mM TMDTA, 10 mM $LaCl_3$, pH 7.2. This buffer was combined in various ratios with Buffer C containing 10 mM TMDTA prepared from the same TMDTA stock in order to produce a range of free $La^{III}$ concentrations. Free $La^{III}$ concentrations were calculated as described using 25° C., I=0.11, and pH 7.2.

The limit of detection assay was performed using 5 nM LaMP1 in Buffer C. The plate reader was set to a gain of 250 and flash frequency of 200 Hz. The buffer contribution to the signal was subtracted using a buffer blank.

TABLE 10

Plasmids used for Sensor studies.

| Name | Notes | Source |
| --- | --- | --- |
| pBAD-D2 | $Amp^R$ | Addgene #37470 |
| pET-24a-LanM-TEV/His | $Km^R$ | Present disclosure |
| pET-28a-His/TEV-LanM (4P→4A) | $Km^R$ | Present disclosure |
| pBAD-LaMP1 | LanM inserte | Present disclosure |
| pBAD-LaMP1(4P-4A) | LanM(4P→4A) inserted into | Present disclosure |

TABLE 11

Primers used for cloning and sequencing for sensor experiments*

| Name | Sequence | SEQ ID NO |
| --- | --- | --- |
| ECFP-LanM-SphI-F | 5'-ATAAGCATGCCAACTACGACTA CCAAAGTTGATATCG-3' | 31 |
| Citrine-LanM-SacI-R | 5'-AATAGAGCTCACGAATTAAGTT GACCAGGGC-3' | 32 |
| Sequencing primers | | |
| pBAD-F | 5'-ATGCCATAGCATTTTTATCC-3' | 33 |
| pBAD-R | 5'-GATTTAATCTGTATCAGG-3' | 34 |
| ECFP-mid | 5'-CAACCACTACCTGAGCAC-3' | 35 |

*Restriction sites are underlined

TABLE 12

DNA SEQUENCES OF SENSORS

```
>LaMP1 (SEQ ID NO: 4)
atggtgagcaagggcgaggagctgttcaccggggtggtgcccatcctggtcgagctggacggcgacgtaaacggccac
aggttcagcgtgtccggcgagggcgagggcgatgccacctacggcaagctgaccctgaagttcatctgcaccaccggc
aagctgcccgtgccctggcccaccctcgtgaccaccctgacctggggcgtgcagtgcttcagccgctaccccgaccac
atgaagcagcacgacttcttcaagtccgccatgcccgaaggctacgtccaggagcgtaccatcttcttcaaggacgac
ggcaactacaagacccgcgccgaggtgaagttcgagggcgacaccctggtgaaccgcatcgagctgaagggcatcgac
ttcaaggaggacggcaacatcctggggcacaagctggagtacaactacatcagccacaacgtctatatcaccgccgac
aagcagaagaacggcatcaaggcccacttcaagatccgccacaatcgaggacggcagcgtgcagctcgccgaccac
taccagcagaacacccccatcggcgacggccccgtgctgctgcccgacaaccactacctgagcacccagtccgccctg
agcaaagaccccaacgagaagcgcgatcacatggtcctgctggagttcgtgaccgccgccCGCATGCCAACTACGACT
ACCAAAGTTGATATCGCGGCGTTTGACCCGGACAAAGATGGGACCATCGATCTGAAAGAGGCTTTGGCGGCAGGTTCC
GCGGCCTTCGACAAGTTGGACCCGGATAAAGATGGTACTCTGGACGCCAAAGAGCTGAAGGGCCGCGTGTCTGAGGCA
GACCTTAAGAAGCTGGACCCTGACAATGACGGAACCCTGGACAAGAAAGAGTACTTAGCAGCGGTAGAGGCACAGTTT
AAGGCCGCTAACCCTGACAACGATGGCACTATTGACGCCCGTGAACTTGCAAGCCCAGCGGGGTCGGCCCTGGTCAAC
TTAATTCGTGAGCTCAtggtgagcaagggcgaggagctgttcaccggggtggtgcccatcctggtcgagctggacggc
gacgtaaacggccacaagttcagcgtgtccggcgagggcgagggcgatgccacctacggcaagctgaccctgaagttc
atctgcaccaccggcaagctgcccgtgccctggcccaccctcgtgaccaccttcggctacggcctgatgtgcttcgcc
cgctaccccgaccacatgaagcagcacgacttcttcaagtccgccatgcccgaaggctacgtccaggagcgcaccatc
ttcttcaaggacgacggcaactacaagacccgcgccgaggtgaagttcgagggcgacaccctggtgaaccgcatcgag
ctgaagggcatcgacttcaaggaggacggcaacatcctggggcacaagctggagtacaactacatcagccacaacgtc
tatatcatggccgacaagcagaagaacggcatcaaggtgaacttcaagatccgccacaatcgaggacggcagcgtg
cagctcgccgaccactaccagcagaacacccccatcggcgacggccccgtgctgctgcccgacaaccactacctgagc
acccagtccgccctgagcaaagaccccaacgagaagcgcgatcacatggtcctgctggagttcgtgaccgccgccggg
atcactctcggcatggacgagctatacaagtaa 4p4a Sensor (SEQ ID NO: 5)
atggtgagcaagggcgaggagctgttcaccggggtggtgcccatcctggtcgagctggacggcgacgtaaacggccac
aggttcagcgtgtccggcgagggcgagggcgatgccacctacggcaagctgaccctgaagttcatctgcaccaccggc
aagctgcccgtgccctggcccaccctcgtgaccaccctgacctggggcgtgcagtgcttcagccgctaccccgaccac
atgaagcagcacgacttcttcaagtccgccatgcccgaaggctacgtccaggagcgtaccatcttcttcaaggacgac
```

TABLE 12-continued

DNA SEQUENCES OF SENSORS

```
ggcaactacaagacccgcgccgaggtgaagttcgagggcgacaccctggtgaaccgcatcgagctgaagggcatcgac
ttcaaggaggacggcaacatcctggggcacaagctggagtacaactacatcagccacaacgtctatatcaccgccgac
aagcagaagaacggcatcaaggcccacttcaagatccgccacaacatcgaggacggcagcgtgcagctcgccgaccac
taccagcagaacaccccatcggcgacggccccgtgctgctgcccgacaaccactacctgagcacccagtccgccctg
agcaaagacccaacgagaagcgcgatcacatggtcctgctggagttcgtgaccgccgccCGCATGCCAACTACGACT
ACCAAAGTTGATATCGCGGCGTTTGACGCGGACAAAGATGGGACCATCGATCTGAAAGAGGCTTTGGCGGCAGGTTCC
GCGGCCTTCGACAAGTTGGACGCGGATAAAGATGGTACTCTGGACGCCAAAGAGCTGAAGGGCCGCGTGTCTGAGGCA
GACCTTAAGAAGCTGGACGCTGACAATGACGGAACCCTGGACAAGAAAGAGTACTTAGCAGCGGTAGAGGCACAGTTT
AAGGCCGCTAACGCTGACAACGATGGCACTATTGACGCCCGTGAACTTGCAAGCCCAGCGGGGTCGGCCCTGGTCAAC
TTAATTCGTGAGCTCAtggtgagcaagggcgaggagctgttcaccggggtggtgcccatcctggtcgagctggacggc
gacgtaaacggccacaagttcagcgtgtccggcgagggcgagggcgatgccagctacggcaagctgaccctgaagttc
atctgcaccaccggcaagctgcccgtgccctggcccaccctcgtgaccaccttcggctacggcctgatgtgcttcgcc
cgctaccccgaccacatgaagcagcacgacttcttcaagtccgccatgcccgaaggctacgtccaggagcgcaccatc
ttcttcaaggacgacggcaactacaagacccgcgccgaggtgaagttcgagggcgacaccctggtgaaccgcatcgag
ctgaagggcatcgacttcaaggagggcgacaccctggtgaaccgcatcgaggtacaactacaacagccacaacgtc
tatatcatggccgacaagcagaagaacggcatcaaggtgaacttcaagatccgccacaacatcgaggacggcagcgtg
cagctcgccgaccactaccagcagaacacccccatcggcgacggccccgtgctgctgcccgacaaccactacctgagc
taccagtccgccctgagcaaagacccaacgagaagcgcgatcacatggtcctgctggagttcgtgaccgccgccggg
atcactctcggcatggacgagctatacaagtaa
```

ECFP underlined,
citrine double-underlined

Sensor

Another aspect of the present disclosure includes a sensor for detecting a rare earth element. The sensor concept takes advantage of the high affinity and selectivity of LanM's metal binding sites for rare earth elements, and/or the large metal-dependent conformational change exhibited by the protein. In the particular embodiment described here, the sensor can be constructed to include a LanM as a linker between two fluorescent proteins such that the Förster Resonance Energy Transfer (FRET) efficiency between two fluorescent proteins is modulated when conformational changes occur in LanM upon binding to a rare earth element. The sensor protein is referred to herein as LaMP1. The two fluorescent proteins are selected such that the first fluorescent protein emits at a wavelength at which the second fluorescent protein is excited, and emits at a higher wavelength. For example, the first protein may be a cyan fluorescent protein and the second protein may be a yellow fluorescent protein which is excited by cyan. Thus, when the two proteins are sufficiently close and in a suitable orientation, the cyan emitted by the first protein is absorbed by the second protein which then emits yellow. On the other hand, when the two proteins are spaced apart from each other or in a less suitable orientation, the first protein emits cyan, but does not excite the second protein as efficiently, and a lesser yellow signal is obtained.

Figure 11:
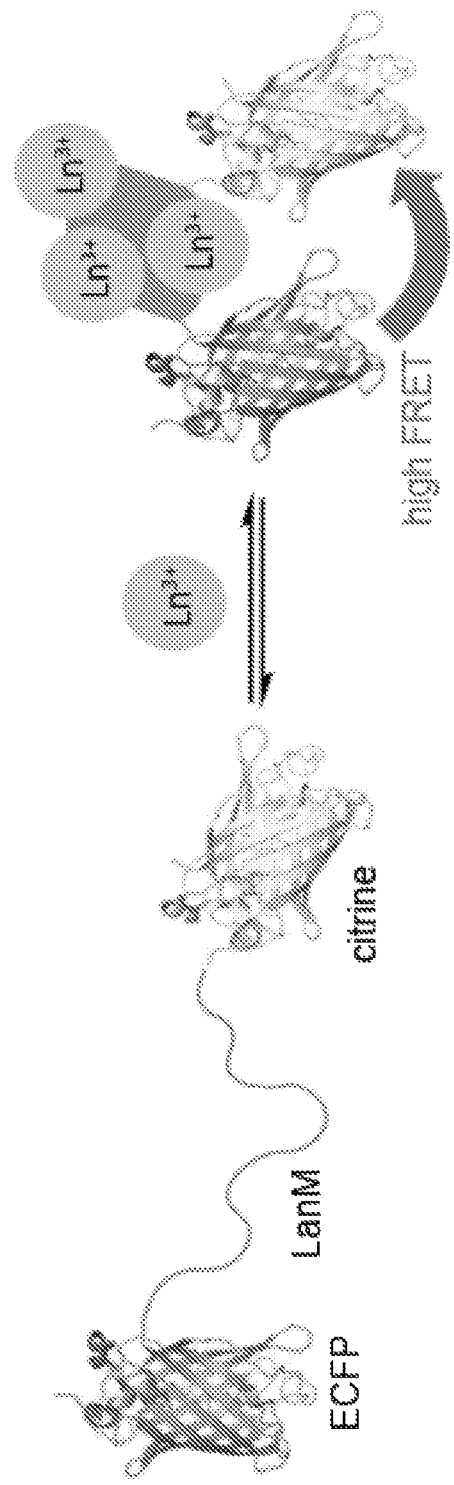
FIG. 11 shows design of a sensor (e.g., LaMP1) in an aspect of the present disclosure.
Figure 16:
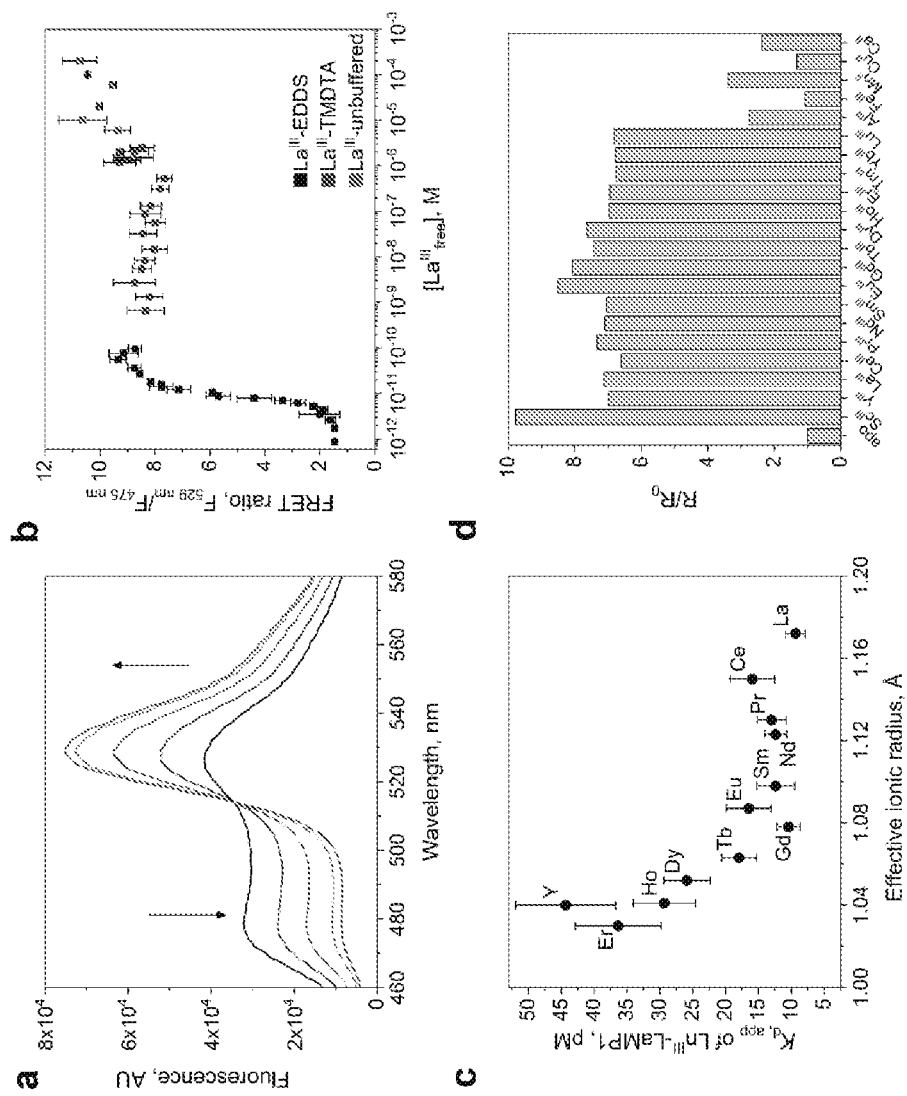
FIG. 16 shows characterization of fluorescence response, apparent $K_d$ values, and metal selectivity of the LanM-based FRET sensor, LaMP1.

Taking advantage of our discovery and characterization of LanM's rare earth element binding properties, as well as our NMR solution structure of the Y(III)-bound form of LanM, we used LanM as the basis for a ratiometric protein-based (genetically encoded) fluorescent sensor for rare earths, which we call LaMP1 (lanmodulin-based protein sensor 1). LaMP1 is the first of its kind for rare earths, and it suggests that this and related constructs may be broadly useful biotechnologies for rare earth detection in industrial, environmental, and biological samples. To construct LaMP1, we started with the calmodulin-based sensor D2, developed by Tsien and coworkers, consisting of a C-terminally truncated enhanced cyan fluorescent protein (ECFP) and citrine, a yellow fluorescent protein, as a FRET pair. We replaced the calmodulin and M13 peptide components of D2 with LanM (Ala22-Arg133), the full-length protein after cleavage of the signal peptide, yielding LaMP1 (FIG. 11). In in vitro assays, LaMP1 exhibited a robust, 7-fold ratiometric FRET response to all rare earth elements, with apparent dissociation constants ($K_{d,app}$) for $Ln^{III}$s and $Y^{III}$ in the picomolar range, consistently only ~2-fold weaker than those of native LanM (Table 13, FIG. 16). The $K_{d,app}$ of $La^{III}$-LaMP1 measured by circular dichroism spectroscopy agrees with the FRET-derived value, suggesting that LaMP1 undergoes a similar conformational change as LanM itself. Our method for titrating the chelator used for these determinations, ethylenediamine N,N'-disuccinic acid (EDDS), could not be used to calibrate solutions of Tm, Yb, and Lu; however, we anticipate $K_{d,app}$ values of 40–50 pM range based on the relationship between $K_{d,app}$ and ionic radius. The sensor also responds to $Sc^{III}$, but the $K_{d,app}$ was not determined (FIG. 16D). In the case of $La^{III}$, we tested fluorescence response over the full range of free metal concentrations from $10^{-13}$ M to $10^{-2}$ M, buffered using EDDS or trimethylenedinitrilotetraacetic acid (TMDTA) or without chelator. No significant additional fluorescence response was observed above $10^{-10}$ M until the unbuffered regime (>1 µM), which may correspond to metal binding to EF4 based on our previous analyses of LanM (FIG. 16B).

FIG. 11 shows design of LaMP1. The sensor comprises ECFP (1–228), LanM (22–133), and citrine. Fluorescent protein images were derived from PDB code 1CV7 (ECFP) using PyMOL. Table 13 shows titration data for $Ln^{III}$-LaMP1 and $Ca^{II}$-LaMP1 $K_{d,app}$ titrations (0.5 µM sensor, pH 7.2). Free metal concentrations were buffered using EDDS for Lns (La—Er) and Y. Data were fitted to the Hill equation for one set of sites.

TABLE 13

Apparent Kds, Hill coefficients (n), and fold changes in
FRET ratio from fitted fluorescence titrations of LaMP1
with buffered LnIIIs and CaII (25° C, pH 7.2). Uncertainties
were determined by combining standard deviations from three
titrations and uncertainties in calibration of metal-EDDS solutions,
as described in ref. 1. To the right of ErIII in the periodic table,
uncertainties in determining the endpoints of LnIII-EDDS
CD titrations were too great to reliably determine Kds.
Note that these data do not include the additional increase in FRET
ratio occurring in the micromolar range of metal ion concentration.

| Metal ion | $K_{d,app}$ (pM) | n | Fold change (R/R₀) |
|---|---|---|---|
| $La^{III}$ | 9.4 ± 1.5 | 3.5 ± 0.2 | 6.0 |
| $Ce^{III}$ | 16 ± 3 | 3.4 ± 0.1 | 6.7 |
| $Pr^{III}$ | 13 ± 2 | 4.0 ± 0.2 | 5.7 |

TABLE 13-continued

Apparent Kds, Hill coefficients (n), and fold changes in
FRET ratio from fitted fluorescence titrations of LaMP1
with buffered LnIIIs and CaII (25° C, pH 7.2). Uncertainties
were determined by combining standard deviations from three
titrations and uncertainties in calibration of metal-EDDS solutions,
as described in ref. 1. To the right of ErIII in the periodic table,
uncertainties in determining the endpoints of LnIII-EDDS
CD titrations were too great to reliably determine Kds.
Note that these data do not include the additional increase in FRET
ratio occurring in the micromolar range of metal ion concentration.

| Metal ion | $K_{d,app}$ (pM) | n | Fold change ($R/R_0$) |
|---|---|---|---|
| $Nd^{III}$ | 12 ± 2 | 3.4 ± 0.2 | 6.0 |
| $Sm^{III}$ | 12 ± 3 | 3.4 ± 0.1 | 5.7 |
| $Eu^{III}$ | 16 ± 3 | 3.5 ± 0.1 | 6.3 |
| $Gd^{III}$ | 10 ± 2 | 3.3 ± 0.1 | 6.3 |
| $Tb^{III}$ | 18 ± 3 | 4.4 ± 0.1 | 5.7 |
| $Dy^{III}$ | 26 ± 4 | 3.9 ± 0.1 | 6.5 |
| $Ho^{III}$ | 29 ± 5 | 4.0 ± 0.1 | 5.6 |
| $Er^{III}$ | 36 ± 7 | 4.0 ± 0.2 | 5.4 |
| $Y^{III}$ | 44 ± 8 | 4.4 ± 0.2 | 5.7 |
| $Ca^{II}$ | $(1.2 \pm 0.1) \times 10^9$ | 1.1 ± 0.1 | 2.9 |

FIG. 16 shows response of 500 nM LaMP1 to 0-4 (black-red) equiv. $La^{III}$ ($\lambda_{ex}$=433 nm). (B) FRET ratio ($F_{529nm}/F_{475nm}$) of LaMP1 as a function of free $La^{III}$ concentrations either EDDS- or TMDTA-buffered or unbuffered. (C) Plot of apparent $K_d$ of $Ln^{III}$-LaMP1 versus ionic radius for $La^{III}$—$Er^{III}$ and $Y^{III}$. (D) Metal selectivity of LaMP1. Fold response of 500 nM LaMP1 to 5 μM $La^{III}$—$Lu^{III}$; 10 μM $Sc^{II}$, $Y^{III}$, and $Fe^{III}$, 100 μM CuII; or 1 mM $Al^{III}$, $Mn^{II}$, and $Ca^{II}$.

Figure 12:
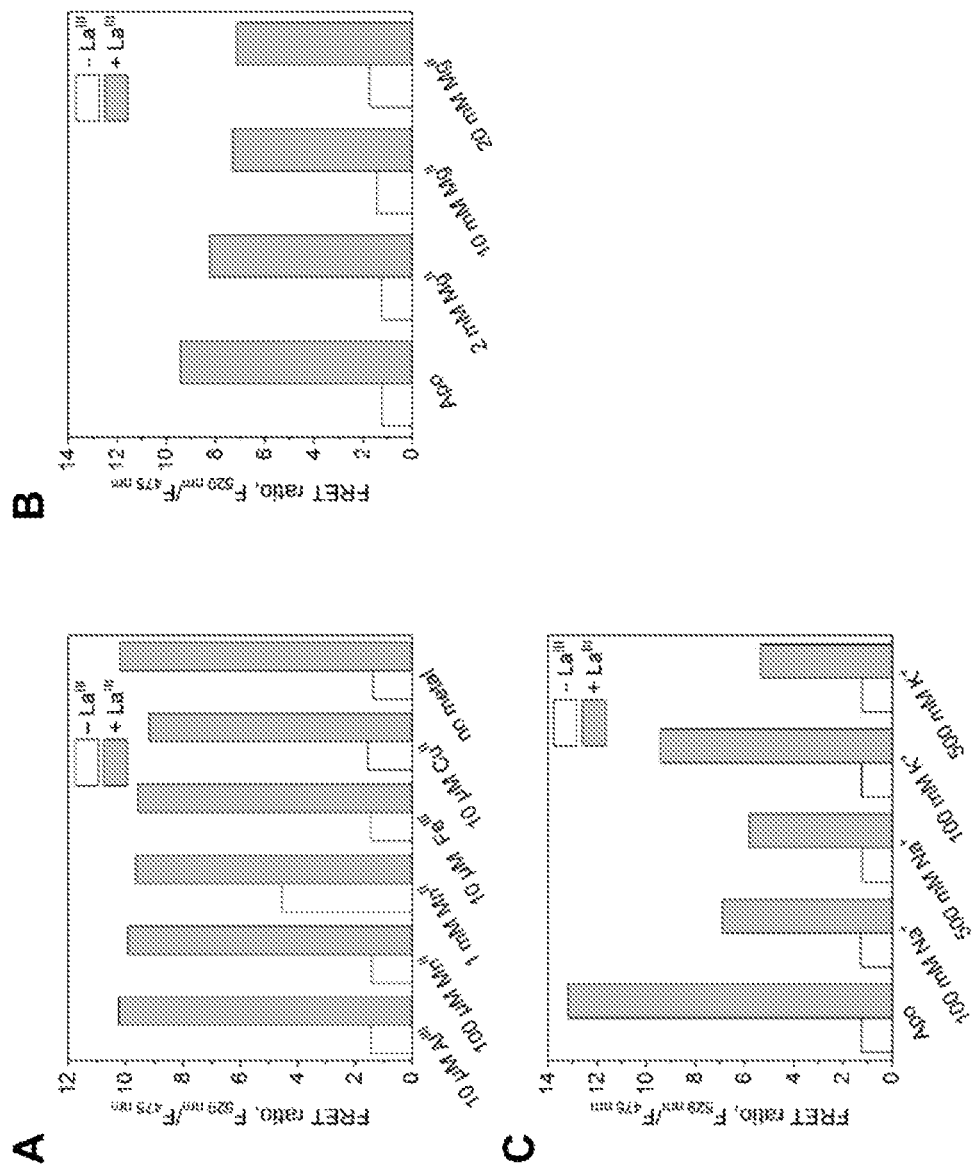
FIGS. 12A, 12B, 12C provides data which show the selectivity of LaMP1 for $Ln^{III}$s over selected common mono- di- and trivalent metal ions.

LaMP1 also exhibited fluorescence response to CaII, but with a $K_{d,app}$ of 1.2 mM, far above likely physiological levels, and a FRET response of just 3-fold (Table 13). We note, however, that this determination was limited by fluorescence quenching at $Ca^{II}$ concentrations >10 mM, which may have obscured a further FRET increase. We also tested LaMP1 against common metal ions-$Fe^{III}$, $Al^{III}$, $Mn^{II}$, and $Cu^{II}$-at concentrations that are potentially relevant to aqueous environmental samples such as mine leachates, and found little or no response (FIG. 16D). At higher concentrations, $Fe^{III}$ quenched fluorescence and the sensor showed modest response to $Al^{III}$ and $Mn^{II}$, but all were outcompeted by 5 μM $La^{III}$ (FIG. 12). Biologically relevant ions $Mg^{II}$, Na+, and K+ also minimally interfere (FIG. 12). Therefore, like LanM itself, LaMP1 exhibits high selectivity for $Ln^{II}$ and $Y^{III}$ over $Ca^{II}$ and other common metal ions.

FIG. 12 shows the selectivity of LaMP1 for $Ln^{III}$'s over selected common mono-di- and trivalent metal ions. (A) LaMP1 (0.5 μM) was incubated with the indicated metal ions, which would be potential interferences in environmental samples, in the absence (white bars) or presence (shaded bars) of 5 μM La™. (B) LaMP1 (0.5 μM) was incubated with various concentrations of $MgCl_2$ in Buffer C, in the absence (white bars) or presence (shaded bars) of 4 equiv. $La^{III}$ (Apo=no $Mg^{II}$). While LaMP1 exhibited a slight response to $Mg^{II}$ in the absence of $La^{III}$ and a slight interference in the presence of $La^{III}$, bacterial $Mg^{II}$ levels are generally held to be tightly regulated around 1-2 mM and therefore little interference is likely in vivo. C) Effect of Na+ and K+ on LaMP1 response (30 mM MOPS, pH 7.0, with buffers supplemented by the indicated concentrations of NaCl or KCl. Chloride is known to quench YFP fluorescence by ~25% at 100 mM Cl−, pH 7.0. Therefore, the observed interference is likely due to Cl binding, rather than Na+ or K+ binding.

Figure 13:
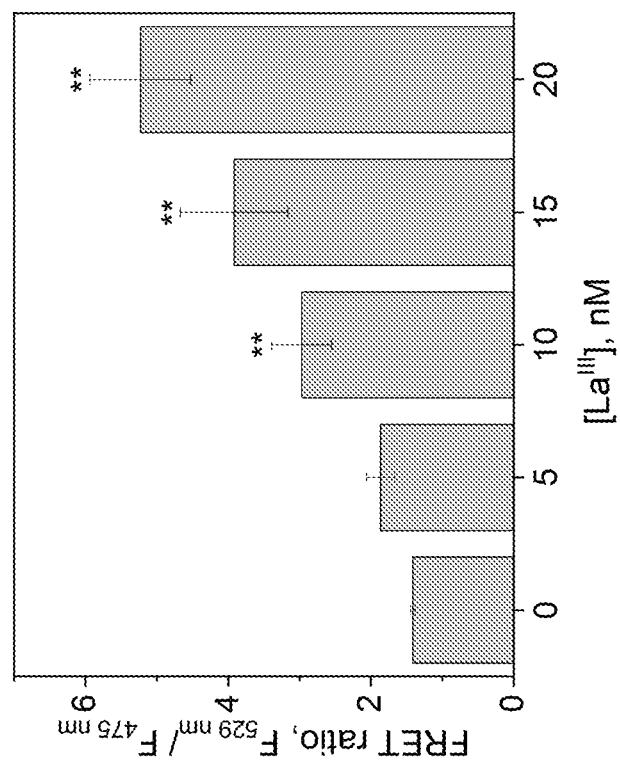
FIG. 13 shows determination of the limit of detection of LaMP1 in fluorescence plate reader measurements.

LaMP1's limit of detection in plate reader fluorescence assays (5 nM LaMP1) was 10 nM La "I, within 1 min (FIG. 13). LaMP1's performance compares favorably with previously reported approaches to selectively detect Lns. He and co-workers engineered a bacterial two-component system to detect Lns via incorporation of a lanthanide binding tag peptide sequence. After 6 h of growth, this system exhibits 3-fold fluorescence response to 1 μM Tb" and a smaller but significant response to 200 nM $Tb^{III}$, but also responds 2-fold to 50 μM $Ca^{II}$. Skovran, Martinez-Gomez, and co-workers have recently reported an M. extorquens strain with a fluorescent protein gene under control of the xoxl promoter, which responds to 2.5 nM La" but requires several hours of incubation; furthermore, this promoter only responds to La—Sm. A colorimetric method based on the arsenazo-III dye has a detection limit of ~500 nM but only responds reliably to La—Eu. Therefore, LaMP1 is a uniquely rapid, selective, and highly sensitive tool for detecting all REEs.

FIG. 13 shows determination of the limit of detection of LaMP1 in fluorescence plate reader measurements (** p<0.01).

The pH dependence of LanM's metal binding affinity was investigated using EGTA-buffered $Pr^{III}$ solutions at pH 6.0 and LaMP1. The apparent $K_d$ value for this titration was 26 pM, with a FRET change ($R/R_0$) of 2.7. The small effect of pH on apparent $K_d$ (compare to FIG. 16C) suggests that LanM will retain protein stability and high affinity for REEs at lower pHs, until protonation of the carboxylate ligands responsible for metal coordination, which likely occurs at pH ~3. This functionality at acidic pHs is important for potential REE sensing, extraction, and separation applications. The smaller FRET change at pH 6.0 than at pH 7.2 may be related to partial protonation of the citrine chromophore (pKa~5.7), which would reduce citrine fluorescence while ECFP fluorescence would be unaffected at this pH, or a slightly different conformational change.

Figure 14:
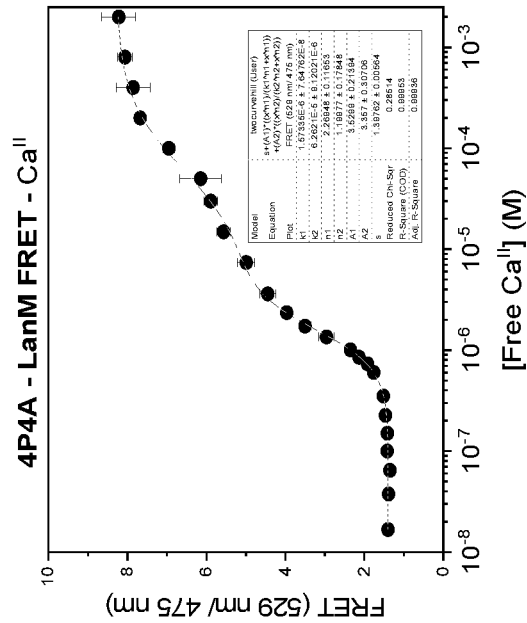
FIG. 14 shows $K_{d,app}$ determination for LaMP1 (4P→4A) using $La^{III}$ and $Ca^{II}$.
Figure 14:
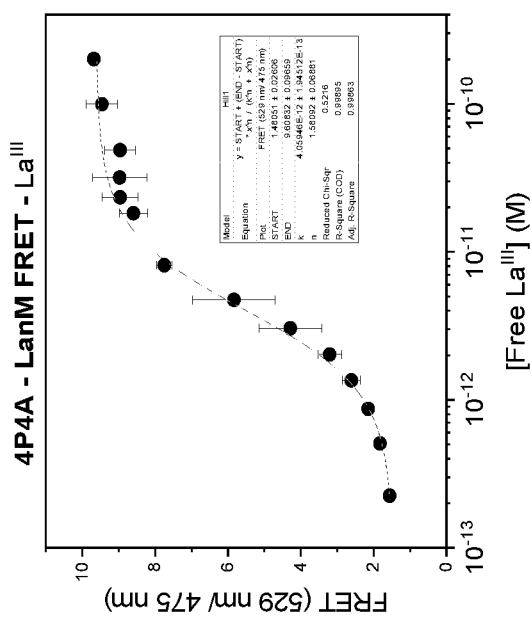
Figure 15:
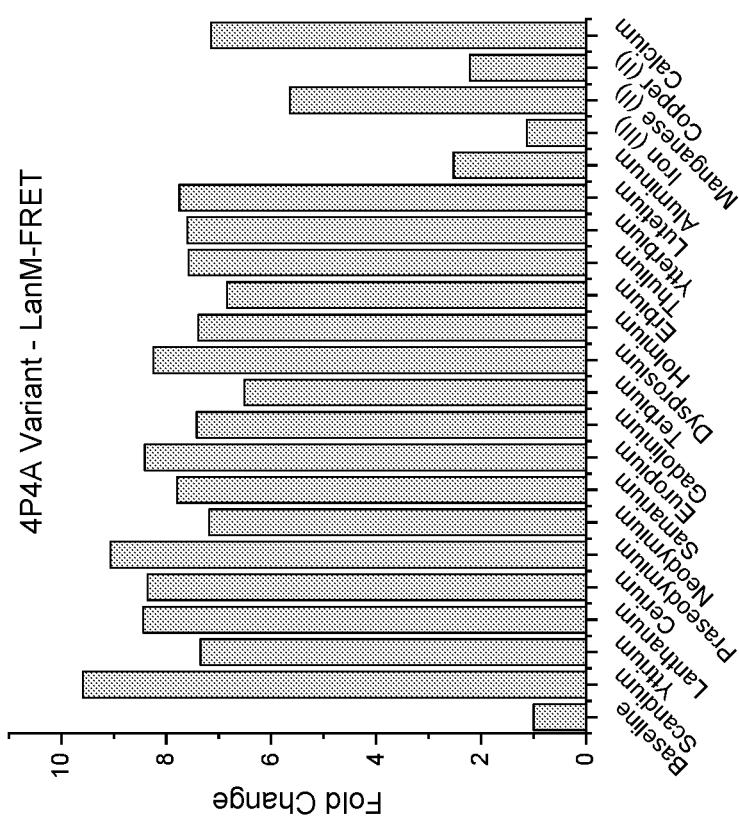
FIG. 15 shows the fold FRET change of LaMP1 (4P→4A) in the absence of added metal ions (baseline) and in the presence of 5 μM $Ln^{III}$s, 10 μM $Sc^{III}$, $Y^{III}$, and $Fe^{III}$, 1 mM $Al^{III}$, $Mn^{II}$, and $Ca^{II}$; or 100 μM $Cu^{II}$.

We also generated a 4P→4A analog of LaMP1. Mirroring the properties of LanM (4P→4A) versus LanM, the fluorescence response of LaMP1 (4P→4A) was similar to that of LaMP1 and exhibited a slightly lower $K_{d,app}$ for $La^{III}$ (FIG. 14), but its response to $Ca^{II}$ was distinct, in two phases with $K_{d1,app}$=1.6±0.1 μM and $K_{d2,app}$=63±9 μM (FIG. 14). LaMP1 (4P→4A) also exhibited somewhat larger responses to Mn1 and CuII than did LaMP1 (FIG. 15). The minimum FRET ratios and overall FRET response for the two sensors are nearly identical. Due to its responsiveness to lower concentrations of $La^{III}$ and likely also all other rare earth elements, LaMP1 (4P→4A) may also be a useful tool for detection of rare earth elements in aqueous samples.

FIG. 14 shows $K_{d,app}$ determination for LaMP1 (4P→4A) using $La^{III}$ and $Ca^{II}$. FIG. 15 shows the fold FRET change of LaMP1 (4P→4A) in the absence of added metal ions (baseline) and in the presence of 5 μM $La^{III}$—$Lu^{III}$, 10 μM $Y^{III}$ and $Fe^{III}$; 1 mM, $Mn^{II}$ and $Ca^{II}$; or 100 μM $Cu^{II}$.

Site-directed mutagenesis to demonstrate the versatility of the LanM scaffold for re-engineering of metal selectivity Nomenclature scheme examples: 4P2A=the P residue at position 2 is mutated to A in all four EF hands (in some of the FIG. s herein, this construct is also called "4P→4A," as it was in the original LanM characterization manuscript; 3D9H=the D residue at position 9 is mutated to H in the first three EF hands. The 4P2A version of the LaMP1 sensor was generated to test responsiveness of this construct with a range of lanthanides. (If two values are listed, the response is biphasic.)

TABLE 14

Apparent $K_{ds}$ for LaMP1(4P→4A)
(also called LaMP1-4P2A)
for selected $Ln^{III}$s, at pH 7.2

| Ln(III) | $K_{d,app}$ |
|---|---|
| La(III) | 8 pM |
| Nd(III) | 2 pM |
| Gd(III) | ~100 fM, ~1 pM |
| Ho(III) | ~20 fM, ~1 pM |

The sensor response splits into 2 phases to the right of Nd. Our biochemical characterization of the protein and sensor support the hypothesis that this 2-phase response may be a result of EF4 pairing less well with EF1 for the smaller, later lanthanides, resulting in a first response (FRET ratio 1.2 to ~3.5, ~3-fold change overall) due to metal binding and conformational change in EF2/3, followed by a second response up to a FRET ratio of ~9 due to metal binding to EF1. This suggests that removal of the EF1/4 pair would result in a single-phase response (see below).

The results with this construct also show a decrease in apparent $K_d$ for LaMP1-4P2A from 8 pM for La to 20 fM for Ho. The ≥3 order of magnitude change in apparent $K_d$ across the lanthanide series (La—Lu) suggests that this construct, and derivatives thereof, may be better suited than wild-type LanM itself for protein-based separations applications.

We also carried out a more extensive mutagenesis study using LaMP1 as the starting point to demonstrate the feasibility of altering metal selectivity of this protein, with metal titrations carried out under the same conditions as those described elsewhere in this disclosure:

TABLE 15

| Construct | Ca(II) $K_{d,app}$ | n | R/R₀ | Mn(II) $K_{d,app}$ | n | R/R₀ |
|---|---|---|---|---|---|---|
| WT | 1.4 mM | 1.1 | 3.2 | 745 µM | 1.9 | 4.8 |
| 4P2A | 1.5 µM, 100 µM | 2.2 | 3.3, 2.8 | 73 µM | 1.2 | 4.2 |
| 4P2A/D9H | 91 µM | 1.7 | 4 | 200 µM | 1.4 | 3.5 |
| 4P2A/D9Q | 36 µM | 2 | 3.2 | 255 µM | 1.9 | 2.8 |
| 4D9N | 238 µM | 1.5 | 3.5 | 298 µM | 1.3 | 3.3 |
| 3D9Q | 459 µM | 2.5 | 3.5 | 510 µM | 1.6 | 3 |
| 3D9H | 430 µM | 1.9 | 3.3 | 279 µM | 1.5 | 3.1 |
| 3E12D | 308 µM | 1.9 | 1.6 | 199 µM | 1.1 | 1.6 |
| 3D9Q/3E12D | 122 µM | 1.8 | 1.5 | 48 µM | 1.8 | 1.5 |
| 3D9H/3E12D | 151 µM | 1.2 | 3.5 | 21 µM | 1.2 | 2.9 |
| 3D9H/3E12Q | 713 µM | 1.8 | 2.9 | 427 µM | 1.3 | 2.9 |
| 3D9H/N87G | 215 µM | 1.5 | 2.2 | 152 µM | 1.2 | 2.4 |
| 3D9H/3E12D/N87G | 64 µM | 1.5 | 2 | 17 µM | 0.9 | 2 |
| *3D9H/3E12D/377S* | *514 µM* | *1.9* | *3* | *115 µM* | *1.9* | *2.5* |

Italicized constructs are likely to be the most useful in in-cell imaging applications. Selected constructs were assayed with other potentially interfering metals (Co (II) was used as a surrogate for Fe (II)). NS=no response detected at 2 mM. ND=not determined.

TABLE 16

| Construct | Co(II) $K_{d,app}$ | n | R/R₀ | Zn(II) $K_{d,app}$ | n | R/R₀ | Mg(II) $K_{d,app}$ | n | R/R₀ |
|---|---|---|---|---|---|---|---|---|---|
| 3E12D | 1.4 mM | 2.5 | 1.3 | ~3 mM | | ~2 | NS | NS | NS |
| 3D9Q/3E12D | 74 µM | 1.4 | 1.1 | NS | NS | NS | NS | NS | NS |
| *3D9H/3E12D* | *393 µM* | *1.6* | *2.7* | *10 µM, 325 µM* | *2.5, 2.5* | *2, 1.6* | *1.8 mM* | *1.6* | *2.3* |
| 3D9H/3E12D/N87G | 383 µM | 1.1 | 1.5 | 10 µM, >2 mM | | 1.2, ~2 | 821 µM | 1.6 | 1.3 |
| *3D9H/3E12D/377S* | *1.2 mM* | *2* | *3* | *25 µM* | *0.8* | *2* | *>2 mM* | *ND* | *ND* |

The properties of the 3D9H/3E12D and 3D9H/3E12D/3T7S constructs suggest that they can be used as selective sensors for Mn (II) within cells (the main interference, Zn, is generally present in cells at free concentrations far lower than µM, so they are unlikely to respond to Zn in cells). The responsiveness of 3D9H/3E12D to La $(^{III})$ is ~30 µM, far above a free concentration that would be physiologically relevant, and far above the $K_d$ of the wild-type sensor for La$^{III}$. Therefore, most pertinent to this application, in demonstrating the ability to rationally, substantially alter metal binding selectivity of LanM, these data describe a method for re-engineering LaMP1's and thus also LanM's metal selectivity for potentially any desired inorganic ion.

Minimal LanM constructs: As described above, the propensity for mutations to lead to biphasic responses motivates the development of constructs that exhibit a single response for sensing, capture, and separations applications. This minimal construct may also potentially be able to bind rare earths at a higher mg metal per g protein ratio than the wildtype protein. Based on our NMR structure of Y(III)-bound LanM, we determined that removal of EF1 and EF4 might yield a sensor that retains similar to wt apparent $K_d$, but with a monophasic response and more amenable to protein engineering. For our initial experiments, we hypothesized that the residues of LanM/LaMP1 following EF4 are likely important for hydrophobic packing, and so they should be retained even if EF4 is removed. We note that other constructs could be tested lacking these C-terminal residues, or an analogous construct lacking EF2 and EF3 could also be designed to yield a construct with a single metal-binding site in EF1, or derivatives with other segments of the protein removed could be made.

In order to test the effects of N-terminal truncations, LanM was initially truncated at the 30$^{th}$ and 48$^{th}$ residues.

These and other LanM truncations were placed into the LaMP1 sensor scaffold to quickly determine effects on metal binding. The Δ30 mutant truncates the protein immediately prior to EF1, whereas the Δ48 mutant truncates after this metal binding site. Both mutants were expected to have a functional EF2/3 pair. The sequences below represent the LanM portion inserted between the ECFP/citrine FRET pair.

>wild-type LanM
(SEQ ID NO: 41)
PTTTTKVDIAAFDPDKDGTIDLKEALAAGSAAFDKLDPDKDGTLDAKELK

GRVSEADLKKLDPDNDGTLDKKEYLAAVEAQFKAANPDNDGTIDARELAS

PAGSALVNLIREL

>LanM-Δ30
(SEQ ID NO: 42)
DIAAFDPDKDGTIDLKEALAAGSAAFDKLDPDKDGTLDAKELKGRVSEAD

LKKLDPDNDGTLDKKEYLAAVEAQFKAANPDNDGTIDARELASPAGSALV

NLIREL

>LanM-Δ48
(SEQ ID NO: 43)
LAAGSAAFDKLDPDKDGTLDAKELKGRVSEADLKKLDPDNDGTLDKKEYL

AAVEAQFKAANPDNDGTIDARELASPAGSALVNLIREL

Characterization of these constructs with EDDS-buffered Pr(III) solutions showed that the Δ30 variant displayed an apparent $K_d$ almost identical to wt (~10 pM), but a FRET change of 3. For the Δ48 variant, the apparent $K_d$ was ~500 pM with the same FRET change. Ca (II) response was less than 2-fold, with an apparent $K_d$ of ~8 mM. The lower FRET changes than in wt LaMP1 suggest different relative orientations of the fluorescent proteins and/or destabilization of the EF1/4 pair. We are currently investigating truncations made in between these positions to minimize protein size while retaining low $K_d$,app.

The effects of EF4 removal were tested using the constructs below. All of these constructs exhibited the same apparent $K_d$, ~50 pM, in an initial response with a 3-fold FRET change, using EDDS-buffered Pr(III) solutions.

>LanM-ΔN108-E119_GSG
(SEQ ID NO: 44)
PTTTTKVDIAAFDPDKDGTIDLKEALAAGSAAFDKLDPDKDGTLDAKEL
KGRVSEADLKKLDPDNDGTLDKKEYLAAVEAQFKAAGSGLASPAGSALV
NLIREL

>LanM-ΔN108-E119_GGSGG
(SEQ ID NO: 118)
PTTTTKVDIAAFDPDKDGTIDLKEALAAGSAAFDKLDPDKDGTLDAKEL
KGRVSEADLKKLDPDNDGTLDKKEYLAAVEAQFKAAGGSGGLASPAGSA
LVNLIREL

>LanM-ΔN108-E125_GSG
(SEQ ID NO: 45)
PTTTTKVDIAAFDPDKDGTIDLKEALAAGSAAFDKLDPDKDGTLDAKEL
KGRVSEADLKKLDPDNDGTLDKKEYLAAVEAQFKAAGSGSALVNLIREL

>LanM-ΔN108-E125_GGSGG
(SEQ ID NO: 46)
PTTTTKVDIAAFDPDKDGTIDLKEALAAGSAAFDKLDPDKDGTLDAKEL
KGRVSEADLKKLDPDNDGTLDKKEYLAAVEAQFKAAGGSGGSALVNLIR
EL

Constructs in which the truncations of EF1 and EF4 are combined are in progress.
However, the following example has been made and preliminary tests have been carried out:
>LanM-Δ48_ΔN108-E119_GGSGG
(SEQ ID NO: 47)
LAAGSAAFDKLDPDKDGTLDAKELKGRVSEADLKKLDPDNDGTLDKKEY
LAAVEAQFKAAGGSGGLASPAGSALVNLIREL This construct behaves essentially identically to the LanM-Δ48 construct. These results show that our mechanistic understanding of the function of this protein allow us to design significant mutations and deletions that retain metal-binding function, at least in EF2/3. These and related constructs may be useful for REE detection, capture, and separation applications. These results also suggest that similar experiments can be used to create other derivatives with a range of metal binding functions (different metal stoichiometries, metal affinities, and metal selectivities).

Other sensing modalities: Some of the limitations of fluorescence-based detection platform for rapid analysis of rare earths in arbitrary environmental samples are pH (at least for the ECFP/citrine FRET pair) and strongly absorbing/scattering samples (e.g. acid mine drainage, samples containing particle suspensions). Furthermore, while portable fluorescence spectrometers are available, detection using more widely available instrumentation like digital cameras or phones would be ideal. Bioluminescence-based sensing offers a solution to these challenges. We are pursuing approaches to turn LanM's selective conformational response to rare earths into a bioluminescent output using bioluminescence resonance energy transfer (BRET)), an analogous concept as FRET but using a luminescent rather than fluorescent donor. One possible approach uses bioluminescent donor such as NanoLuc and either sulfo-Cy3 (conjugated to a cysteine residue) or a fluorescent protein such as tdTomato as a BRET acceptor (see constructs below). Approaches with other BRET pairs can also be designed.

>Bioluminescent LaMP2: NanoLuc + LanM
(underlined) + cysteine for conjugation
to sulfoCy3-maleimide
(SEQ ID NO: 48)
mvftledfvgdwrqtagynldqvlegggvsslfqnlgvsvtpigrivlsg englkidihviipyeglsgdgmgqiekifkvvypvddhhfkvilhygtiv idgvtpnmidyfgrpyegiavfdgkkitvtgtlwngnkiiderlinpdgs llfrvtingvtgwrlaerilapttttkvdiaafdpdkdgtidlkealaag saafdkldpdkdgtldakelkgrvseadlkkldpdndgtldkkeylaave aqfkaanpdndgtidarelaspagsalvnlirc >Bioluminescent LaMP3: NanoLuc + LanM
(underlined) + tdTomato (uppercase)
(SEQ ID NO: 49)
mvftledfvgdwrqtagynldqvlegggvsslfqnlgvsvtpigrivlsg englkidihviipyeglsgdgmgqiekifkvvypvddhhfkvilhygtiv idgvtpnmidyfgrpyegiavfdgkkitvtgtlwngnkiiderlinpdgs llfrvtingvtgwrlaerilapttttkvdiaafdpdkdgtidlkealaag saafdkldpdkdgtldakelkgrvseadlkkldpdndgtldkkeylaave aqfkaanpdndgtidarelaspagsalvnlirelMVSKGEEVIKEFMRFK

```
-continued
VRMEGSMNGHEFEIEGEGEGRPYEGTQTAKLKVTKGGPLPFAWDILSPQF

MYGSKAYVKHPADIPDYKKLSFPEGFKWERVMNFEDGGLVTVTQDSSLQD

GTLIYKVKMRGTNFPPDGPVMQKKTMGWEASTERLYPRDGVLKGETHQAL

KLKDGGHYLVEFKTIYMAKKPVQLPGYYYVDTKLDITSHNEDYTIVEQYE

RSEGRHHLFLGHGTGSTGSGSSGTASSEDNNMAVIKEFMRFKVRMEGSMN

GHEFEIEGEGEGRPYEGTQTAKLKVTKGGPLPFAWDILSPQFMYGSKAYV

KHPADIPDYKKLSFPEGFKWERVMNFEDGGLVTVTQDSSLQDGTLIYKVK

MRGTNFPPDGPVMQKKTMGWEASTERLYPRDGVLKGETHQALKLKDGGHY

LVEFKTIYMAKKPVQLPGYYYVDTKLDITSHNEDYTIVEQYERSEGRHHL

FLYGMDELYK
```

These results show that LanM and its derivatives can be engineered to have altered metal selectivity via rational approaches. Higher throughput methods such as directed evolution could also be used using LaMP1 or a derivative as the readout for the purposes of engineering. These studies have focused on mutations at the metal-binding sites, but residues outside the metal-binding sites can also be targeted. In theory, this protein could be used to develop sensors/binding proteins for any metal ion (or even possibly any inorganic anion) of interest. Of particular interest is the development of proteins for selective binding of actinides, such as uranyl ($UO_2^{2+}$), or tetravalent metals like Th (IV). Our data show that the second, ninth, and $12^{th}$ positions in the EF hands seem to be particularly useful at altering metal binding selectivities without disrupting conformational response, although other positions within the EF hands and between EF hands can also be changed to alter affinities and cooperativities. For example, in order to selectively bind and sense uranyl, one method involves taking advantage of the EF hand carboxylates in the equatorial plane and modifying the axial carboxylates (residues at positions 1 and 9) to hydrogen bonding donors (e.g. Ser, Thr, Asn, or main chain amides) for interaction with the unique oxo groups of uranyl.

Based on our analysis, we found that a highly selective metal-binding has certain characteristics. In particular, an isolated metal-binding protein having a certain number of EF hand motifs and certain residues with a certain spacer leads to a protein with high tri- and/or tetravalent cation selectivity as disclosed herein. In an embodiment, an isolated metal-binding protein can include 2, 3 or 4 EF hand motifs, at least one of the EF hand motifs having at least 2 carboxylate residues, wherein at least 2 adjacent of the EF hand motifs are separated by 10-15 amino acid residues such as by 11, 12, 13, 14 and 15 amino acid residues, e.g., between and including 12-13 amino acid residues. For example, the protein can include at least 1, and preferably at least two 2, EF hand motifs of the form:

[SEQ ID NO: 3]
(D/N)-X1-(D/N)-X2-(D/N)-X3-X4-X5-X6-X7-X8-(E/D)

where each X1 through X8 are independently any residue (i.e., not necessarily the same residue in each position). At least two adjacent EF hands are separated by $10^{-15}$ residues such as, for example, 12-13 amino acid residues. In an embodiment, X1 is P (Proline). In certain aspects, X6 and/or X8 can be D or E. In certain aspects, glycine (G) is preferred, but not required at X3. Advantageously, metal-binding proteins of the present disclosure can be purified to at least about 70%, such as at least about 75%, 80%, 85%, 90%, 95%, pure form.

For example, in an embodiment, the protein can include 2, 3 or 4 EF hand motifs comprising the above form (SEQ ID NO:3) and each adjacent pair of EF hand motif separated by $10^{-15}$, e.g., 12-13, amino acids. Other permutations are contemplated. Various examples of amino acid sequences for EF hand motifs are given in Table 17 below:

TABLE 17

Various sequences of EF hand:

| SEQ ID NO: | Sequence |
|---|---|
| 51 | DPDKDGTIDLKE |
| 52 | DPDKDGTIDAKE |
| 53 | DPDNDGTIDKKE |
| 54 | NPDKDGTIDARE |
| 55 | NKDNDDSLEIAE |
| 56 | DIDKDGRVSVEE |
| 57 | DKDNDGTLDREE |
| 58 | DKNGDGFIDKEE |

For example, in an embodiment, the protein can include 2 EF hand motifs comprising SEQ ID NO:3 and separated by 12-13 amino acids, or the protein can include 3 EF hand motifs comprising SEQ ID NO:3 with each adjacent motifs being separated by 12-13 amino acids, or the protein can include 4 EF hand motifs comprising SEQ ID NO:3 with each adjacent motifs being separated by 12-13 amino acids. Other permutations are contemplated.

Another aspect of the present disclosure includes a method for separating rare earth or actinide elements, compounds or salts thereof (e.g., lanthanides) from a medium, e.g., a solution, a suspension, or a colloid. The method includes contacting a medium containing a trivalent cation with a metal-binding protein to bind the trivalent cation; and isolating the metal-binding protein having the trivalent cation bound thereto. The metal-binding protein can advantageously have a higher selective affinity for trivalent cations over non-trivalent cations, wherein the trivalent cations are selected from the group consisting of trivalent cations from a rare earth element, a compound thereof, a salt thereof, an actinide, a compound thereof, a salt thereof, and combinations thereof. In some aspect of the present disclosure, the method includes contacting a medium containing one or more rare earth elements, compounds or salt thereof (e.g. a lanthanide or a salt thereof) and/or one or more actinide elements, compounds or salt thereof with a metal-binding protein having a high selective affinity for the rare earth or the actinide over a non-rare earth or non-actinide. The method can also include isolating the metal-binding protein to which the rare earth or actinide element, compound or salt thereof have bound (e.g., a lanthanide (3+) ion); and optionally separating the one or more rare earths or actinides from the metal-binding protein.

In an embodiment, the metal-binding protein may be immobilized to a substrate by, for example, biotinylating the protein and surface treating the substrate with avidin. In some embodiments, the protein is immobilized using click chemistry, e.g., azide-alkyne cycloaddition, such as by labeling the protein with an azide or alkyne and reacting it with an alkyne or azide, respectively, on the immobilization surface (e.g., a bead of a resin). In some embodiments, the medium including trivalent cations from rare earth or actinide element, compound or salt thereof is contacted with the substrate on which the metal-binding protein is immobilized. The trivalent cations from the rare earth or actinide element, compound or salt thereof are then allowed to bind with the metal-binding protein (e.g., but allowing certain time to be passed, or by applying an electrical field to promote movement of the cations toward the substrate). The medium is then removed, and the substrate to which the trivalent cations are bound is treated to separate the trivalent cations. The surface treatment may include, in various embodiments, treatment with a low pH solution, or treatment with chelators such as, for example, EGTA, EDTA, citrate, EDDS, etc.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An isolated metal-binding protein comprising (i) a sequence of SEQ ID NO:41 or (ii) a sequence having at least 80% identity to SEQ ID NO:41,
   wherein the isolated metal-binding protein is immobilized on a substrate;
   wherein the isolated metal-binding protein has an apparent $K_d$ value for a trivalent rare earth element at least 10,000-fold smaller than its apparent $K_d$ value for calcium.

2. The isolated metal-binding protein of claim 1, wherein the apparent $K_d$ value for a trivalent rare earth element of the isolated metal-binding protein is about 1 pM to about 50 pM at pH 7.2.

3. The isolated metal-binding protein of claim 1, wherein when the isolated metal-binding comprises (ii), one or both of the amino acids in positions 21 and 24, positions 45 and 48, positions 70 and 73, and/or positions 94 and 97 are D or E, wherein positions 21, 24, 45, 48, 70, 73, 94, and 97 correspond to the amino acid residue positions of SEQ ID NO:41.

4. The isolated-metal binding protein of claim 1, wherein when the isolated metal-binding protein comprises (ii), the amino acid in position 14, position 38, position 63, and/or position 87 is P, wherein positions 14, 38, 63, and 87 correspond to the amino acid residue positions of SEQ ID NO:41.

5. An isolated metal-binding protein comprising (i) a sequence of SEQ ID NO:41 or (ii) a sequence having at least 80% identity to SEQ ID NO:41,
   wherein the isolated metal-binding protein is immobilized on a substrate;
   wherein the isolated metal-binding protein has an apparent $K_d$ value for a trivalent rare earth element that is at least 10,000 fold smaller than its apparent $K_d$ value for calcium;
   wherein the isolated metal-binding protein comprising (ii) comprises two or more metal-binding motifs and at least one of the metal-binding motifs comprises at least 3 carboxylate residues, and wherein adjacent metal-binding motifs are separated by $10^{-15}$ amino acid residues.

6. The isolated metal-binding protein of claim 5, wherein the apparent $K_d$ for a trivalent rare earth element of the isolated metal-binding protein is about 1 pM to about 50 pM at pH 7.2.

7. The isolated metal-binding protein of claim 5, wherein when the isolated metal-binding protein comprise (ii), one or both of the amino acids in one or both of the amino acids in positions 21 and 24, positions 45 and 48, positions 70 and 73, and/or positions 94 and 97 are D or E, wherein positions 21, 24, 45, 48, 70, 73, 94, and 97 correspond to the amino acid residue positions of SEQ ID NO:41.

8. The isolated metal-binding protein of claim 5, wherein when the isolated metal-binding protein comprise (ii), the amino acid in position 14 of SEQ ID NO:41, position 38 of SEQ ID NO:41, position 63 of SEQ ID NO:41, and/or position 87 of SEQ ID NO:41 is P, wherein positions 14, 38, 63, and 87 correspond to the amino acid residue positions of SEQ ID NO: 41.

9. The isolated metal-binding protein of claim 5, wherein (ii) has at least 85% identity to SEQ ID NO:41.

10. The isolated metal-binding protein of claim 5, wherein (ii) has at least 90% identity to SEQ ID NO:41.

11. The isolated metal-binding protein of claim 5, wherein (ii) has at least 95% identity to SEQ ID NO:41.

12. The isolated metal-binding protein of claim 5, wherein the metal-binding motif has the following sequence: (D or N)—$X_1$-(D or N)—$X_2$-(D or N)—$X_3$—$X_4$—$X_5$—$X_6$—$X_7$—$X_8$-(E or D), wherein $X_1$ through $X_8$ are each independently any canonical amino acid.

13. The isolated metal-binding protein of claim 12, wherein the metal-binding motif has the following sequence:

```
                    (SEQ ID NO: 51)
DPDKDGTIDLKE;

(SEQ ID NO: 52)
DPDKDGTLDAKE;

(SEQ ID NO: 53)
DPDNDGTLDKKE;

(SEQ ID NO: 54)
NPDKDGTIDARE;

(SEQ ID NO: 55)
NKDNDDSLEIAE;

(SEQ ID NO: 56)
DIDKDGRVSVEE;

(SEQ ID NO: 57)
DKDNDGTLDREE; or (SEQ ID NO: 58)
DKNGDGFIDKEE.
```

14. A method for separating a rare earth or actinide, the method comprising:
   contacting a medium containing a trivalent cation with a sample comprising the isolated metal-binding protein of claim 1 to bind the trivalent cation; and separating the metal-binding protein having the trivalent cation bound thereto from the medium,
wherein the metal-binding protein has a higher selective affinity for the trivalent over non-trivalent or non-tetravalent cations, wherein the trivalent cation is selected from the group consisting of trivalent rare earth elements, a compound thereof, a salt thereof, an actinide, a compound thereof, a salt thereof, and combinations thereof.

15. The method of claim 14, further comprising separating the trivalent cation from the metal-binding protein having the trivalent cation bound thereto.

16. The method of claim 15, wherein separating the trivalent cation comprises treating the separated metal-binding protein having the trivalent cation by a dilute acid or a solution comprising a metal chelator.

17. The method of claim 16, wherein the metal chelator includes an EDTA, EGTA, EDDS, citrate, or combinations thereof.

18. The method of claim 14, wherein the apparent $K_d$ value for a trivalent cation is at least 1,000,000-fold smaller than its apparent $K_d$ value for calcium.

* * * * *